US012348161B2

(12) United States Patent
Preindl et al.

(10) Patent No.: US 12,348,161 B2
(45) Date of Patent: Jul. 1, 2025

(54) MOTOR CONTROL USING PIECEWISE AFFINE MODEL

(71) Applicants: Tau Motors, Inc., Redwood City, CA (US); The Trustees of Columbia University in the City of New York, New York, NY (US)

(72) Inventors: Matthias Preindl, New York, NY (US); Bernard William Steyaert, New York, NY (US); Ethan Bagget Swint, Redwood City, CA (US); Nick Marshall Vazquez, Redwood City, CA (US); Walter Wesley Pennington, III, Menlo Park, CA (US)

(73) Assignees: TAU MOTORS, INC., Redwood City, CA (US); THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 18/730,268

(22) PCT Filed: Jan. 27, 2023

(86) PCT No.: PCT/US2023/011786
§ 371 (c)(1),
(2) Date: Jul. 18, 2024

(87) PCT Pub. No.: WO2023/147088
PCT Pub. Date: Aug. 3, 2023

(65) Prior Publication Data
US 2025/0096709 A1    Mar. 20, 2025

Related U.S. Application Data

(60) Provisional application No. 63/479,352, filed on Jan. 10, 2023, provisional application No. 63/420,360, (Continued)

(51) Int. Cl.
*H02P 21/18*    (2016.01)
*H02P 21/00*    (2016.01)

(52) U.S. Cl.
CPC ...... *H02P 21/0017* (2013.01); *H02P 2207/01* (2013.01); *H02P 2207/05* (2013.01)

(58) Field of Classification Search
CPC .. H02P 21/18; H02P 21/0017; H02P 2207/01; H02P 2207/05
See application file for complete search history.

(56) References Cited

U.S. PATENT DOCUMENTS 5,907,228 A    5/1999   Thomas et al.
7,243,006 B2   7/2007   Richards
(Continued)

OTHER PUBLICATIONS

Arora et al., "Review of Design and performance of permanent magnet synchronous motor", IJIEEE. Oct. 2015; 3 (10): pp. 20-28.
(Continued)

*Primary Examiner* — Cortez M Cook
(74) *Attorney, Agent, or Firm* — Quarles & Brady, LLP

(57) ABSTRACT

Disclosed are systems and methods for motor control using piecewise affine modelling. An electronic controller may determine current values for a motor in a rotational reference frame. Each current value may be associated with a dimension of a set of dimensions of the rotational reference frame. The electronic controller may further determine, based on the current values, a flux linkage value for each of the set of dimensions of the rotational reference frame using a piecewise affine map. The electronic controller may further
(Continued)

determine a target flux linkage value for each of the set of dimensions of the rotational reference frame. The electronic controller may then control a power switching network coupled between a power supply and the motor based on the flux linkage values and the target flux linkage values.

47 Claims, 29 Drawing Sheets

Related U.S. Application Data filed on Oct. 28, 2022, provisional application No. 63/409,418, filed on Sep. 23, 2022, provisional application No. 63/345,879, filed on May 25, 2022, provisional application No. 63/304,527, filed on Jan. 28, 2022.

(56) References Cited

U.S. PATENT DOCUMENTS

| | | |
|---|---|---|
| 7,772,790 B2 | 8/2010 | Nashiki |
| 8,786,230 B2 | 7/2014 | Lee et al. |
| 8,829,831 B2 | 9/2014 | Yoo |
| 9,007,004 B2 | 4/2015 | Hunter |
| 9,219,441 B2 | 12/2015 | Yasui et al. |
| 9,323,254 B2 | 4/2016 | Furutani et al. |
| 9,854,012 B2 | 12/2017 | Na et al. |
| 10,725,440 B1 | 7/2020 | Grand et al. |
| 11,074,378 B1 | 7/2021 | Yamada et al. |
| 2006/0055363 A1 | 3/2006 | Patel et al. |
| 2008/0129243 A1 | 6/2008 | Nashiki |
| 2014/0306641 A1 | 10/2014 | Igarashi et al. |
| 2020/0177117 A1* | 6/2020 | Preindl .............. H02P 21/18 |
| 2020/0280276 A1 | 9/2020 | Thyagarajan et al. |

OTHER PUBLICATIONS

Ayala et al., "Modelling the Flux-Linkage in Permanent Magnet Synchronous Machines," 2019 IEEE International Electric Machines & Drives Conference (IEMDC), San Diego, CA, USA, 2019, pp. 112-118, doi: 10.1109/IEMDC.2019.8785247.

Bedetti et al., "Stand-still self-identification of flux characteristics for synchronous reluctance machines using novel saturation approximating function and multiple linear regression", IEEE Trans Ind Appl. Jul. 2016; 52(4): pp. 3083-3092.

Brosch et al., "Data-driven recursive least squared estimation for Model predictive current control of permanent magnet synchronous motors", IEEE TPEL. Feb. 2021; 36(2): pp. 2179-2190.

Constaintin Carpiuc et al., "Modeling of synchronous electric machines for real-time simulation and automotive applications", Journal of the Franklin Institute, vol. 354, Issue 14, Sep. 2017, pp. 6258-6281.

Doria-Cerezo et al., "Passivity-based control of a wound-rotor synchronous motor" The Institution of Engineering and Technology, vol. 4, Issue 10, Oct. 2010, p. 2049-2057.

Doria-Cerezo et al., "Control of a Stand-Alone Wound Rotor Synchronous Generator: Two Sliding Mode Approaches via Regulation of the d-Voltage Component," in IEEE Transactions on Control Systems Technology, vol. 20, No. 3, pp. 779-786, May 2012, doi: 10.1109/TCST.2011.2142310 . . . .

Haghgooei et al., "Magnetic Model Identification of Wound Rotor Synchronous Machine Using a Novel Flux Estimator", IEEE. Jun. 2021; 57(5): pp. 5389-5399.

Jebai et al., "Sensorless position estimation and control of permanent-magnet synchronous motors using a saturation model", International Journal of Control, 2015, 89(3), 535-549.

Kaimori et al., Behavior Modeling of Permanent Magnet Synchronous Motors Using Flux Linkages for Coupling with Circuit Simulation, IEEJ Journal of Industry Appl., vol. 7 (2018) Issue 1.

Nasar, Research Initiation: Analysis and Design of Flux Reversal Machines, Award Abstract #9802454, Aug. 7, 1998.

Nie et al., "Deadbeat-Direct Torque and Flux Control of Wound Field Synchronous Machine at Low Sampling to Fundamental Frequency Ratios", IEEE Transactions on Industry Applications, vol. 55, No. 4, pp. 3813-3822, Jul.-Aug. 2019, doi: 10.1109/TIA.2019.2914681.

Ramu, Research Initiation: Sensor-less Operation of Permanent Magnet Synchronous Motor Drives for Variable Speed Applications in Robotics, Aerospace Actuators and Spindle Drives, Award Abstract # 8809551, Jul. 1, 1988.

Roy et al., "Development of Non-linear State-space Affine Model of PMSM and Analysis of Its Dynamic Behavior Encompassing the Possibility of Chaos", 2022 IEEE International Conference on Electronics, Computing and Communication Technologies (CONECCT), Bangalore, India, 2022, pp. 1-5.

Uzel et al., "Gradient descent maximum torque control up to the base speed of wound rotor synchronous motors," 17th International Conference on Mechatronics—Mechatronika (ME), Prague, Czech Republic, 2016, pp. 1-6.

Yang et al., "Multiple-vector-based predictive direct current control for a wound rotor synchronous machine drive", IEEE. Oct. 2016; 16447462.

Pillay et al., "Application Characteristics of Permanent Magnet Synchronous and Brushless dc Motors for Servo Drive", IEEE, Transactions on Industry Applications. vol. 27. No. 5., Oct. 1991.

International Search Report and Written Opinion as issued in corresponding PCT Application No. PCTUS2023/011786, issued Jun. 15, 2023.

Alessandri et al., "Receding-horizon estimation for switching discrete-time linear systems", IEEE Trans. Autom. Control 2005, 50, 1736-1748. https://doi.org/10.1109/TAC.2005.858684.

Armando et al., "Experimental Identification of the Magnetic Model of Synchronous Machines," IEEE Trans. Ind. Appl., vol. 49, No. 5, pp. 2116-2125, Sep. 2013.

Armando et al., "Flux linkage maps identification of synchronous AC motors under controlled thermal conditions," in 2017 IEEE Int. Electr. Mach. Drives Conf. (IEMDC), pp. 1-8, May 2017.

Aurenhammer, "Voronoi diagrams, a survey of a fundamental geometric data structure," ACM Comput. Surv., vol. 23, No. 3, p. 345.405, Sep. 1991.

Bilgin et al., "Making the Case for Electrified Transportation", IEEE Trans. Transp. Electrif. 2015, 1, 4-17. https://doi.org/10.1109/TTE.2015.2437338.

Borrelli et al., "Predictive control for linear and hybrid systems," 2017.

Brelje et al., "Electric, hybrid, and turboelectric fixed-wing aircraft: A review of concepts, models, and design approaches", Prog. Aerosp. Sci. 2019, 104, 1-19. https://doi.org/10.1016/j.paerosci.2018.06.004.

Brent, "An algorithm with guaranteed convergence for finding a zero of a function," Comput. J., vol. 14, pp. 422-425, 1971.

Canay, "Causes of discrepancies on calculation of rotor quantities and exact equivalent diagrams of the synchronous machine," vol. PAS-88, pp. 1114-1120.

Chen et al., "Analysis of Flux-Linkage Characteristics of Switched Reluctance Linear Generator," IEEE Trans. Appl. Supercond., vol. 24, No. 3, pp. 1-5, Jun. 2014.

CHEN et al., "Electromagnetic Analysis of Flux Characteristics of Double-Sided Switched Reluctance Linear Machine," IEEE Trans. Appl. Supercond., vol. 26, No. 4, pp. 1-7, Jun. 2016.

T. H. Cormen, C. E. Leiserson, R. L. Rivest, and C. Stein, Introduction to Algorithms, 2nd ed. 1em plus 0.5em minus 0.4em The MIT Press, 2001.

Dai et al., "Development of PMSM Drives for Hybrid Electric Car Applications", IEEE Trans. Magn. 2007, 43, 434-437. https://doi.org/10.1109/TMAG.2006.887718.

De Santiago et al., "Electrical Motor Drivelines in Commercial All-Electric Vehicles: A Review," IEEE Trans. Veh. Technol., vol. 61, No. 2, pp. 475-484, Feb. 2012.

(56) References Cited

OTHER PUBLICATIONS

Eull et al., "A review of virtual-flux model predictive control and receding horizon estimation in motor drives," in 2021 IEEE Transportation Electrification Conference and Expo (ITEC), pp. 439-444, 2021.
Eull et al., "Bidirectional nonisolated fast charger integrated in the electric vehicle traction drivetrain," IEEE Transactions on Transportation Electrification, vol. 8, http://dx.doi.org/10.1109/TTE.2021.3124936DOI 10.1109/TTE.2021.3124936, No. 1, pp. 180-195, 2022.
Fernanez et al., "Permanent Magnet Temperature Estimation in PM Synchronous Motors Using Low-Cost Hall Effect Sensors", IEEE Trans. Ind. Appl. 2017, 53, 4515-4525. https://doi.org/10.1109/TIA.2017.2705580.
Fernanez et al., "Impact of Machine Magnetization State on Permanent Magnet Losses in Permanent Magnet Synchronous Machines", IEEE Trans. Ind. Appl. 2019, 55, 344-353. https://doi.org/10.1109/TIA.2018.2867326.
Haghgooei et al., "Online Stator Flux Estimation for a Wound Rotor Synchronous Machine (WRSM)," in Ind. Appl. Soc. IEEE-IAS Annu. Meet., pp. 1-6, Oct. 2020, ISSN: 2576-702X.
He et al., "A divide-and-conquer approach to determine the pareto frontier for optimization of protein engineering experiments," Proteins, vol. 80, http://dx.doi.org/10.1002/prot.23237DOI 10.1002/prot.23237, pp. 790-806, Mar. 2012.
Herceg et al., "Multi-parametric toolbox 3.0," in 2013 European Control Conference (ECC), pp. 502-510, 2013.
Ichikawa et al., "Sensorless control of permanent-magnet synchronous motors using online parameter identification based on system identification theory", IEEE Trans. Ind. Electron. 2006, 53, 363-372. https://doi.org/10.1109/TIE.2006.870875.
Jones et al., "Multiparametric linear complementarity problems," in Proceedings of the 45th IEEE Conf. on Decision and Control, pp. 5687-5692, 2006.
Kang et al., "Analysis of irreversible magnet demagnetization in line-start motors based on the finite-element method", IEEE Trans. Magn. 2003, 39, 1488-1491. https://doi.org/10.1109/TMAG.2003.810330.
Kim et al., "Copper-Loss-Minimizing Field Current Control Scheme for Wound Synchronous Machines," IEEE Trans. Power Electron, vol. 32, No. 2, pp. 1335-1345, Feb. 2017.
Kutkut et al., "Analysis of winding losses in high frequency foil wound inductors," in IAS '95. Conference Record of the 1995 IEEE Industry Applications Conference Thirtieth IAS Annual Meeting, vol. 1, http://dx.doi.org/10.1109/IAS.1995.530388DOI 10.1109/IAS.1995.530388, pp. 859-867 vol. 1, 1995.
Li et al., "General Formulation of Kalman-Filter-Based Online Parameter Identification Methods for VSI-Fed PMSM," IEEE Trans. Ind. Electron., vol. 68, No. 4, pp. 2856-2864, Apr. 2021.
Liu et al., "Identification of Flux Linkage Map of Permanent Magnet Synchronous Machines Under Uncertain Circuit Resistance and Inverter Nonlinearity," IEEE Trans. Industr. Inform., vol. 14, No. 2, pp. 556-568, Feb. 2018.
Luo et al., "Elimination of harmonic currents using a reference voltage vector based-model predictive control for a six-phase pmsm motor," IEEE Transactions on Power Electronics, vol. 34, No. 7, pp. 6960-6972, 2019.
Miao et al., "Mtpa fitting and torque estimation technique based on a new flux-linkage model for interior-permanent-magnet synchronous machines," IEEE Transactions on Industry Applications, vol. 53, http://dx.doi.org/10.1109/TIA.2017.2726980DOI 10.1109/TIA.2017.2726980, No. 6, pp. 5451-5460, 2017.
Nachtsheim et al., "Physically inspired neural network for modeling induction machine nonlinear magnetic saturation," in 2022 IEEE Transportation Electrification Conference and Expo (ITEC), pp. 874-881, 2022.
Pang et al., "Calculation of Cross-Coupling Inductance and Electromagnetic Torque in Wound-Rotor Synchronous Starter/Generator," IEEE Trans. Ind. Electron, vol. 66, No. 7, pp. 5115-5123, Jul. 2019.
V. Pareto, Manual of political economy (manuale di economia politica). 1em plus 0.5em minus 0.4em New York: Kelley, 1971 (1906), translated by Ann S. Schwier and Alfred N. Page.
Preindl et al., "Model predictive direct torque control with finite control set for pmsm drive systems, part 1: Maximum torque per ampere operation," IEEE Transactions on Industrial Informatics, vol. 9, No. 4, pp. 1912-1921, 2013.
Preindl et al., "Optimal state reference computation with constrained mtpa criterion for pm motor drives," IEEE Trans. Power Electron., vol. 30, No. 8, pp. 4524-4535, 2015.
Preindl et al., "Robust control invariant sets and lyapunov-based mpc for ipm synchronous motor drives," IEEE Transactions on Industrial Electronics, vol. 63, http://dx.doi.org/10.1109/TIE.2016.2527722DOI 10.1109/TIE.2016.2527722, No. 6, pp. 3925-3933, 2016.
Retif et al., "New hybrid direct-torque control for a winding rotor synchronous machine," in 2004 IEEE 35th Annual Power Electronics Specialists Conference (IEEE Cat. No. 04CH37551), vol. 2, http://dx.doi.org/10.1109/PESC.2004.1355634DOI 10.1109/PESC.2004.1355634, pp. 1438-1442 vol. 2, 2004.
Rodriguez et al., "State of the art of finite control set model predictive control in power electronics," IEEE Transactions on Industrial Informatics, vol. 9, No. 2, pp. 1003-1016, 2013.
Rossi et al., "Wound Rotor Salient Pole Synchronous Machine Drive for Electric Traction," in Conf. Rec. IEEE Ind. Appl. Conf., IAS Annu. Meet., vol. 3, pp. 1235-1241, Oct. 2006, iSSN: 0197-2618.
P. Samuel and S. Levy, Projective Geometry, ser. Undergraduate Texts in Mathematics. 1em plus 0.5em minus 0.4em Springer New York, 1988.
Sayed et al., "Review of Electric Machines in More-/Hybrid-/Turbo-Electric Aircraft", IEEE Trans. Transp. Electrif. 2021, 7, 2976-3005. https://doi.org/10.1109/TTE.2021.3089605.
Seilmeier et al., "Identification of steady-state inductances of PMSM using polynomial representations of the flux surfaces," in IECON—39th Annu. Conf. IEEE Ind. Electron. Soc., pp. 2899-2904, Nov. 2013, iSSN: 1553-572X.
Steyaert et al., "Piecewise affine maximum torque per ampere for the wound rotor synchronous machine," in 2022 IEEE Transp. Electr. Conf. and Expo (ITEC), pp. 356-363, 2022.
S. D. Sudhoff, Transformer Design, pp. 205-253, 2014.
Wang et al., "Offline Parameter Self-Learning Method for General-Purpose PMSM Drives With Estimation Error Compensation," IEEE Trans. Power Electron., vol. 34, No. 11, pp. 11 103-11 115, Nov. 2019.
Wang et al., "Fast model predictive control using online optimization," IEEE Trans. Control Syst. Technol., vol. 18, No. 2, pp. 267-278, 2010.
Wlas et al., "Neural-Network-Based Parameter Estimations of Induction Motors," IEEE Trans. Ind. Electron., vol. 55, No. 4, pp. 1783-1794, Apr. 2008.
Zhang et al., "Maximum Torque per Ampere Control with Inductance and Field Current Estimation for Wound-Rotor Synchronous Starter/Generator," in 23rd Int. Conf. Electr. Mach. Syst. (ICEMS), pp. 172-176, Nov. 2020.
Nasar, Award Abstract #9802454, Analysis and Design of Flux Reversal Machines, Aug. 7, 1998.
Boldea et al., "Analysis and Design of Flux—Reversal Linear Permanent Magnet Oscillating Machine," IEEE Xplore 1998.

* cited by examiner

FIG. 5 Mesh of simplices $i_j \in i_M$ in current space (left), and mesh of simplices $\lambda_j \in \lambda_M$ (right) in flux space

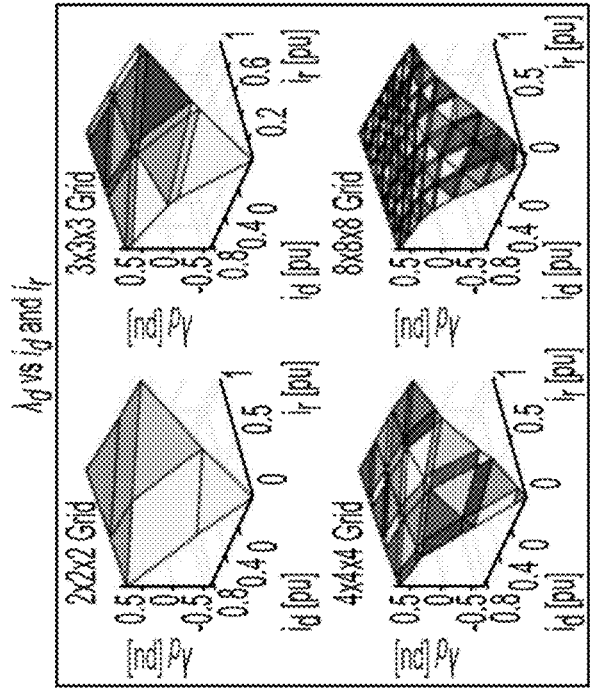
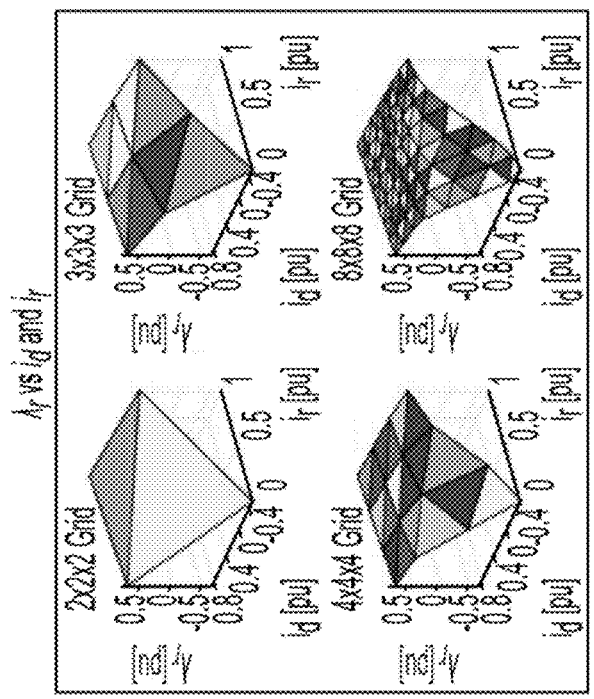
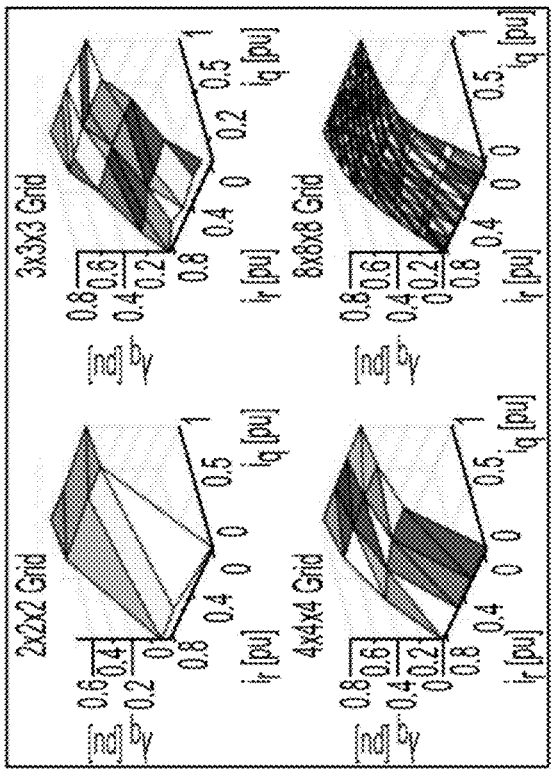
FIG. 8A
FIG. 8B
FIG. 8C

MOTOR CONTROL USING PIECEWISE AFFINE MODEL

CROSS-REFERENCE TO RELATED APPLICATIONS

This application represents the U.S. national stage entry of International Application No. PCT/US2023/011786 filed Jan. 27, 2023, which claims priority to U.S. Provisional Application No. 63/304,527, filed on Jan. 28, 2022, to U.S. Provisional Application No. 63/345,879, filed May 25, 2022, to U.S. Provisional Application No. 63/409,418, filed Sep. 23, 2022, to U.S. Provisional Application No. 63/420,360, filed Oct. 28, 2022, and to U.S. Provisional Application No. 63/479,352, filed Jan. 10, 2023, each of which is hereby incorporated by reference in its entirety.

STATEMENT REGARDING FEDERALLY SPONSORED RESEARCH

N/A

BACKGROUND

Electric machines (e.g., electric motors) produce torque using magnetic fields and currents and use ferromagnetic materials to maximize and channel magnetic flux. In particular, modern electric machine designs may aim at minimizing core materials to reduce motor weight and cost. This relationship between flux and the current that generates the flux is generally non-linear and exhibits saturation and cross saturation. This relationship may be modeled using magnetic models (MMs), which are also referred to as flux linkage maps. Digital controllers for electric machines may use an MM, even if just a linearized one. The accuracy and performance of these controllers can significantly depend on the accuracy of the MM for some machines and applications. MMs can be categorized into static (offline) and dynamic (online) methods, and can include other nonlinear drive-system effects such as, for example, switching harmonics, switching dead times, iron losses, and machine temperature. Offline MMs may use one or a combination of Finite Element Analysis (FEA), analytical calculations, and experimental values to measure inductances at various operating points. The discrete values obtained by these methods may be linked together using a variety of methods. Online MMs may use a combination of online-estimated parameters from real-time measurements and an offline MM to produce a dynamic MM. Such dynamic MM models may have the ability to adapt to temperature, switch dead time, PWM harmonics, aging, and partial faults in real time. Examples of online estimation techniques used in dynamic MMs include Extended Kalman Filters, observer-based LPV, neural networks, and Taylor Series approximations.

SUMMARY

Both offline and online MM methods are subject to computational and memory constraints of the digital signal processor (DSP) that is used for control of the electric motors. Electric motors of various types have been produced and used in many industries and contexts. The complexity of the control technique may vary depending on the type of motor. As one example type of motor, a synchronous motor is an alternating current (AC) motor having a stator that is driven by AC supply signals (e.g., one signal for each phase of the stator) to cause rotation of a rotor. More particularly, the AC supply signals in stator windings of the stator generate magnetic fields that interact with a magnetic field or fields of the rotor to cause rotation of the rotor. The rotation of the rotor is generally synchronous with the frequency of the AC supply current. The rotor may be a permanent magnet rotor, a wound field rotor, or a hybrid rotor including both wound fields and permanent magnets. In the case of a permanent magnet rotor, one or more permanent magnets of the rotor generate the magnetic field or fields of the rotor. In the case of a wound field rotor, current is supplied to one or more field windings of the rotor to generate the magnetic field or fields of the rotor. In the case of the hybrid rotor, both permanent magnets and wound fields receiving current generate the magnetic field or fields of the rotor.

Controlling the application of current to the stator windings and, in the case of a wound field rotor, rotor windings, at the particular time and amplitude to efficiently drive a synchronous motor can be challenging. For example, a motor controller may control an inverter to provide an AC signal to each phase of the motor based on current rotor position and other characteristics of the motor. The physics of the magnetic fields of each stator winding interacting with the rotating rotor can lead to complex mathematics problems that are challenging to create and solve to address factors that lead to efficient driving of the motor, and these challenges can be exacerbated in the case of a wound field synchronous (WFS) motor because of the added wound field rotor. A WFS motor may also be referred to as a wound rotor synchronous machine (WRSM), a wound field synchronous machine (WFSM), a wound rotor synchronous generator (WRSG), a wound field synchronous generator (WFSG), as well as several other names.

In some systems, motor controllers operate using a rotating reference frame to simplify the motor control. For example, motor characteristics (in a stationary reference frame) may be measured and transformed into a direct-quadrature-Null (DQN) space, or DQN+rotor (R) space or reference frame (also referred to as the DQNR, RDQNull, and RDQØ reference frame), using a transform based on the Clarke and Park transforms. In other words, the motor characteristics (e.g., stator currents, rotor currents, and rotor position) can be transformed into a D-axis value, a Q-axis value, an N-axis (or 0-axis) value, and an R (rotor field) value. By using a rotating reference frame where the stator rotates at the frequency of the AC signals, the AC signals can be treated as direct current signals (i.e., the D, Q, N, and R values), which can simplify the calculations used to determine control signals. Desired DQN and R values may be calculated based on the determined DQN and R values, and then transformed back into stator and rotor control values in the stationary reference frame to control the motor. In some examples, the rotor field dimension of this reference frame is referred to using the variable "F" or "f" (i.e., for rotor field) instead of "R" or "r."

Relative to permanent magnet (PM) synchronous motors, in RDQN control schemes for WFS motors, the rotor provides an extra state cross-coupling between the (stator) D-axis and R (rotor field), in addition to a state of coupling between the (stator) D-axis and Q-axis that may exist in both PM synchronous and WFS motors. In other words, for both PM synchronous and WFS motors, changes to the D-axis impact the Q-axis and changes to the Q-axis impact the D-axis. However, for WFS motors, an additional control complexity is present in that changes to the D-axis impact R, and changes to R impact the D-axis. The cross-coupling between the D-axis and R components stems, at least in some cases, from the inherent air gap between the stator and rotor. These cross-couplings increase the complexity and present challenges to designing motors and motor controllers for high performance applications of WFS motors.

Some embodiments disclosed herein address these or other issues. For example, some embodiments disclosed herein are directed to motor control using piecewise affine (PWA) modelling. Such motor control may enable an offline MM-based motor control that reduces the use of computational and memory resources of a motor controller (e.g., a DSP) while providing improved motor control accuracy, relative to other offline MM-based motor control techniques. Although primarily described herein with respect to WFS or permanent magnet synchronous (PMS) motors, motor control using PWA modeling is also applicable to other motor types, including other brushless motors with permanent magnet rotors, induction motors, universal motors, reluctance motors (synchronous and switched), and the like. Further, as is well known, an electric machine serving as an electric motor that outputs mechanical power from input electric power may also operate in reverse and serve as an electric generator that outputs electric power from input mechanical power. Accordingly, for ease of description, the electric machines described herein will generally be referred to as electric motors, but are meant to also encompass electric generators and devices that may operate as both an electric motor and an electric generator. That is, the motor control techniques described herein may also be applied to controlling the electric motors operating as generators. The term "electric machine" may also be used to generically refer to either or both of an electric motor and an electric generator.

In one embodiment, a motor control system is provided. The motor control system includes a power switching network configured to be coupled to a power supply; a motor coupled to the power switching network; and an electronic controller. The electronic controller is configured to: determine current values for the motor in a rotational reference frame, each current value associated with a dimension of a set of dimensions of the rotational reference frame; determine, based on the current values, a flux linkage value for each dimension of the set of dimensions of the rotational reference frame using a piecewise affine map; determine a target flux linkage value for each dimension of the set of dimensions of the rotational reference frame; and control the power switching network based on the flux linkage values and the target flux linkage values.

In another embodiment, a method of controlling a motor is provided. The method includes: determining, by an electronic controller, current values for a motor in a rotational reference frame, each current value associated with a dimension of a set of dimensions of the rotational reference frame; determining, based on the current values, a flux linkage value for each of the set of dimensions of the rotational reference frame using a piecewise affine map; determining, by the electronic controller, a target flux linkage value for each of the set of dimensions of the rotational reference frame; and controlling, by the electronic controller, a power switching network coupled between a power supply and the motor based on the flux linkage values and the target flux linkage values.

In another embodiment, a motor system is provided. The motor system includes an electronic controller including a processor and a memory. The electronic controller is configured to: obtain a data set of current-flux linkage pairs for operational points of an electric motor; apply a domain decomposition algorithm to the data set to generate current simplices and flux linkage simplices; and store the current simplices and flux linkage simplices in a memory.

In another embodiment, a method of controlling a motor is provided. The method includes obtaining, by an electronic controller, a data set of current-flux linkage pairs for operational points of an electric motor; applying, by the electronic controller, a domain decomposition algorithm to the data set to generate current simplices and flux linkage simplices; and storing, by the electronic controller, the current simplices and flux linkage simplices in a memory.

In another embodiment, a motor system is provided. The motor system includes a power switching network configured to be coupled to a power supply, a motor coupled to the power switching network, and an electronic controller. The electronic controller is configured to: determine current values for the motor in a rotational reference frame, each current value associated with a dimension of a set of dimensions of the rotational reference frame; determine, based on a desired control parameter, a target motor control parameter value for each dimension of the set of dimensions of the rotational reference frame using a first piecewise affine map defining a minimum power loss per torque (MPLPT) function; and control the power switching network based on the current values and the target motor control parameter values.

In another embodiment, a method of controlling a motor is provided. The method includes: determining, by an electronic controller, current values for a motor in a rotational reference frame, each current value associated with a dimension of a set of dimensions of the rotational reference frame; determining, by the electronic controller and based on a desired control parameter, a target motor control parameter value for each dimension of the set of dimensions of the rotational reference frame using a first piecewise affine map; and controlling, by the electronic controller, a power switching network based on the current values and the target motor control parameter values.

In another embodiment, a motor system is provided. The motor system includes a power switching network configured to be coupled to a power supply; a motor coupled to the power switching network; and an electronic controller. The electronic controller is configured to: determine current values for the motor in a rotational reference frame, each current value associated with a dimension of a set of dimensions of the rotational reference frame; determine, based on a desired control parameter, a target motor control parameter value for each dimension of the set of dimensions of the rotational reference frame; and control the power switching network based on the current values and the target motor control parameter values by using a piecewise affine map that was defined by offline solving of a constrained finite time optimal control algorithm using sample inputs.

In another embodiment, a method is provided. The method includes determining, by an electronic controller, current values for a motor in a rotational reference frame, each current value associated with a dimension of a set of dimensions of the rotational reference frame; determining, by the electronic controller and based on a desired control parameter, a target motor control parameter value for each dimension of the set of dimensions of the rotational reference frame; and controlling, by the electronic controller, a power switching network based on the current values and the target motor control parameter values by using a piecewise affine map that was defined by offline solving of a model predictive control algorithm using sample inputs.

The foregoing and other aspects and advantages of the present disclosure will appear from the following description. In the description, reference is made to the accompanying drawings that form a part hereof, and in which there is shown by way of illustration one or more embodiment. These embodiments do not necessarily represent the full scope of the invention, however, and reference is therefore made to the claims and herein for interpreting the scope of the invention. Like reference numerals will be used to refer to like parts from Figure to Figure in the following description.

BRIEF DESCRIPTION OF THE DRAWINGS

FIGS. 8A-C illustrate examples of PWA maps that are generated from data sets of regularly sampled current grids that are downsampled to various extents.

DESCRIPTION

Figure 1:
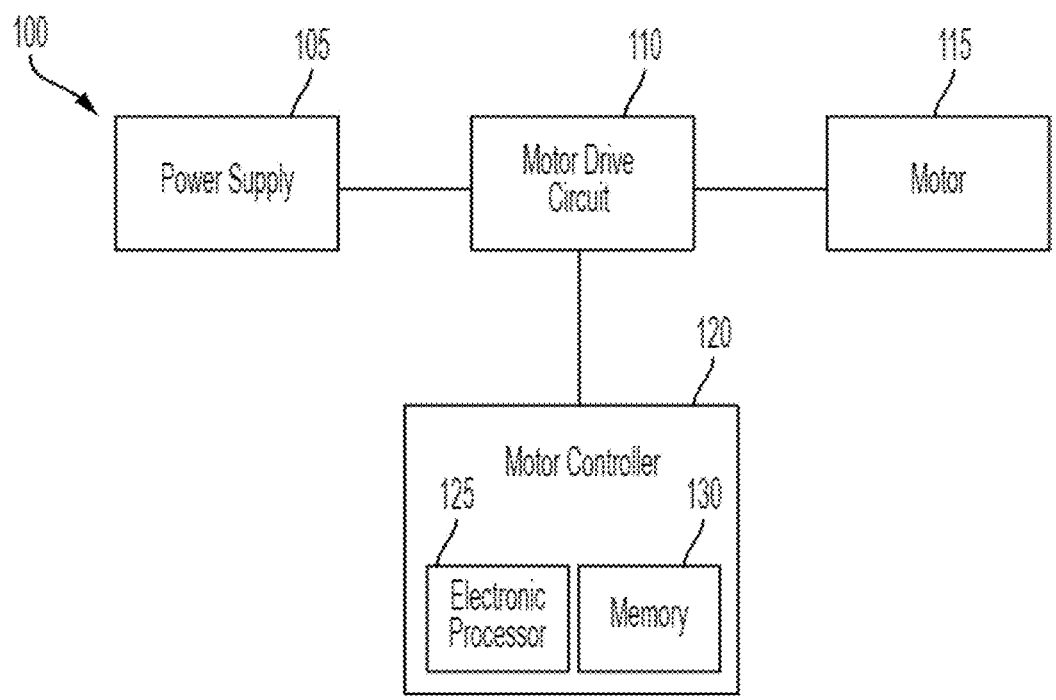
FIG. 1 illustrates a motor system according to some embodiments.

One or more embodiments are described and illustrated in the following description and accompanying drawings. These embodiments are not limited to the specific details provided herein and may be modified in various ways. Furthermore, other embodiments may exist that are not described herein. Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "comprising," "including," "containing," "having," and variations thereof herein is meant to encompass the items listed thereafter and equivalents thereof as well as additional items. Additionally, the terms "connected" and "coupled" are used broadly and encompass both direct and indirect connecting and coupling, and may refer to physical or electrical connections or couplings. Furthermore, the phase "and/or" used with two or more items is intended to cover the items individually and together. For example, "a and/or b" is intended to cover: a; b; and a and b.

"Flux linkage," as used herein, may be described as the change in magnetic field that can be detected as a voltage between two ends of a conductive element. Additionally, unless otherwise noted, the term "flux" is used herein as abbreviated or shorthand notation for "flux linkage" when discussing the relationship between the magnetic field and electrical circuit within an electromagnetic mechanical machine.

Inductance, as used herein, is a quantity derived from the relationship between the flux linkage across an electrical element and the current through that electrical element. Being a non-linear relationship, such inductance may be described as the instantaneous change in flux linkage with respect to current (also referred to as "incremental inductance"); as relative to the total flux linkage (k) at some current (i), where λ/i is the "apparent inductance"; or as relative to the total field energy at some current (i), which is determined by $$L_{EE} = \frac{2}{i_f^2} \int_{i=0}^{i_f} \lambda(i) di$$

(also referred to as "energy-equivalent inductance").

FIG. 1 illustrates a motor system 100, according to some embodiments. The motor system 100 includes a power supply 105, a motor drive circuit 110, an electric machine 115 (also referred to as an electric motor or motor 115), and a motor controller 120. The power supply 105 provides direct current (DC) power to the motor drive circuit 110. Generally, when the motor 115 is being driven as a motor, the motor controller 120 is configured to control the motor drive circuit 110 to apply power from the power supply 105 to the motor 115 to drive rotation of the motor 115. Similarly, when the motor 115 is being operated as a generator, the motor controller 120 is configured to control the motor drive circuit 110 to apply electric power from the motor 115 to the power supply 105

In some embodiments, the power supply 105 includes a DC power source that provides the DC power to the motor drive circuit 110. The DC power source may be, for example, one or more batteries, photovoltaic cells, or the like. In some embodiments, the power supply 105 includes an AC/DC rectifier that receives alternative current (AC) power from an AC power source, which may be a utility grid or external generator. In these embodiments, the AC/DC rectifier outputs the DC power to the motor drive circuit 110. In some embodiments, the AC power source is part of the power supply 105 (e.g., in the case of an on-site wind turbine or generator). In some embodiments, the power supply 105 includes both the DC power source and the AC/DC rectifier, and the DC power from the power supply 105 to the motor drive circuit 110 is provided from one or both sources.

The motor controller 120 includes an electronic processor 125 and a memory 130 (collectively, processing circuitry). Generally, the motor controller 120 monitors characteristics of the motor 115 based on signals received from one or more motor sensors and, based on these characteristics, provides control signals to the motor drive circuit 110. The memory 130 includes one or more of a read only memory (ROM), random access memory (RAM), or other non-transitory computer-readable media. The electronic processor 125 is configured to, among other things, receive instructions and data from the memory 130 and execute the instructions to, for example, carry out the functionality of the motor controller 120 described herein. For example, the memory 130 includes control software defining, among other things, control techniques for the motor 115. As described in further detail below, generally, the electronic processor 125 may be configured to execute the control software to monitor characteristics of the motor 115, receive operational parameters (e.g., motor commands from an input device (not shown)), and to drive the motor drive circuit 110 in accordance with the operational parameters and monitored characteristics. The input device may be or include, for example, an accelerator pedal of an electric vehicle, a trigger, a dial, a keypad, laptop, smartphone, or the like that outputs one or more operational parameters to the motor controller 120 (e.g., encoded in an analog or digital signal). Example operational parameters that may be input and received by the motor controller 120 include torque commands and/or speed commands.

Although the motor controller 120, the electronic processor 125, and the memory 130 are each illustrated as a respective, single unit, in some embodiments, one or more of these components is a distributed component. For example, in some embodiments, the electronic processor 125 includes one or more microprocessors and/or hardware circuit elements, the memory 130 includes one or more memories, and/or the motor controller 120 includes one or more motor controllers (e.g., each with respective processors and memories).

In some embodiments, the motor 115 includes a stator assembly and a rotor assembly. The motor 115 may be synchronous motor, for example, a wound field synchronous (WFS) motor, a permanent magnet synchronous (PMS) motor, or a hybrid synchronous motor with a rotor having both wound field(s) and permanent magnet(s). In such examples, the stator assembly includes a stator core and a plurality of stator windings on the stator core that are selectively driven with current to induce magnetic fields that rotate the rotor assembly. The stator core may be, for example, a lamination stack formed by a plurality of laminations. The lamination stack may include a generally annular profile with teeth extending radially inward (in the case of an outer stator) or radially outward (in the case of an inner stator). The stator windings may be wrapped around the teeth or may include conductors that otherwise fill the slots between teeth (i.e., the windings may, in some examples, not actually be wound around another object). In the case of a WFS or hybrid synchronous motor, the rotor assembly includes a rotor core and one or more field windings that are selectively driven with current to induce magnetic fields that interact with the magnetic fields of the stator assembly to rotate the rotor assembly. The rotor core may be, for example, a lamination stack formed by a plurality of laminations. The lamination stack may include a generally annular profile with teeth extending radially inward (in the case of an outer rotor) or radially outward (in the case of an inner rotor). The rotor windings may be wrapped around the teeth or may include conductors that otherwise fill the slots between teeth. In embodiments in which the motor 115 is a hybrid synchronous motor, the rotor assembly includes a combination of a permanent magnets and field windings. In embodiments in which the motor 115 is a PMS motor, the rotor assembly includes one or more permanent magnets and is without rotor field windings. Although the motor 115 is described herein primarily as a synchronous motor, in some examples, the motor 115 is of another type, such as an induction motor, a universal motor, a switched reluctance motors, or another type. Although this example of the motor 115 is described as including teeth, in some examples, the motor 115 does not include teeth, for example, when implemented as a slotless motor.

More generally, regardless of the particular form or type, the motor 115 (or, electromagnetic mechanical machine), utilizes one or more controllable magnetic fields that are constructed, or energized, in such a manner as to provide a force or torque between two or more components. The force or torque may arise from the interaction of two or more magnetic fields (at least one of which is controllable) such that the relative motion of one component results in a lower energy state due to reduced interference between the fields. The force or torque may also arise from a circuit that a given magnetic field, or combination of fields, must take through the materials of two or more components, such that the relative motion of one or more components results in a lower energy state due to lower reluctance of the magnetic circuit, where reluctance is the ratio of magnetomotive force to the magnetic field strength.

In some embodiments, including embodiments of the motor including a rotor with a rotor winding (e.g., WFS motors and hybrid synchronous motors), the motor drive circuit 110 includes a stator drive circuit coupled to one or more stator windings of the motor 115 and a rotor drive circuit coupled to one or more rotor windings of the motor 115. In some embodiments, including embodiments of the motor 115 without a rotor winding (e.g., PMS motors), the motor drive circuit 110 includes a stator drive circuit coupled to one or more stator windings of the motor 115, but does not include a rotor drive circuit.

The stator drive circuit includes, for example, a plurality of power switching elements connected in a bridge configuration. The power switching elements are semiconductor switching devices such as, for example, a field effect transistor (FET) (e.g., a metal-oxide-semiconductor field effect transistors (MOSFETs)), a bipolar junction transistor (BJT), or insulated gate bipolar transistor (IGBT). The stator drive circuit may include an output terminal for each phase of the stator assembly of the motor 115. For example, in embodiments of the stator assembly having three phases, the stator drive circuit may include three output terminals, each connected to a terminal of a respective phase of the stator assembly. The stator drive circuit receives DC power from the DC power supply 105 and control signals from the motor controller 120. The control signals, which may be pulse-width modulated control signals having respective duty cycles, control the power switching elements to turn on and off in a coordinated manner to drive the stator windings of the motor 115. For example, the motor controller 120, via the control signals, may control the stator drive circuit to generate a sinusoidal drive signal at each output terminal to drive each phase of the stator assembly of the motor 115 with a respective sinusoidal drive signal. Accordingly, the stator drive circuit may also be referred to as a DC-to-AC inverter. Each phase of the stator assembly of the motor 115 may be associated with one or more stator windings.

The rotor drive circuit, when present, includes, for example, a further one or more power switching elements. The power switching elements of the rotor drive circuit may also be connected in a bridge configuration. The rotor drive circuit may include an output terminal pair coupled across each controllable rotor winding of the rotor assembly of the motor 115. The rotor drive circuit receives DC power from the DC power supply 105 and control signals from the motor controller 120. The control signals, which may be pulse-width modulated control signals having respective duty cycles, control the power switching elements of the rotor drive circuit to turn on and off in a coordinated manner to drive the rotor windings of the motor 115. For example, the motor controller 120, via the control signals, may control the rotor drive circuit to generate a DC voltage across each rotor winding. In some examples, the rotor drive circuit includes a single power switching element, single passive element (e.g., a diode), or a plurality of passive elements (e.g., a plurality of diodes) arranged to control the current through the rotor winding(s).

The rotor drive circuit provides a power coupling between the power supply 105, which is stationary (i.e., non-rotating), and the one or more windings of the rotor assembly, which rotates. Thus, the rotor drive circuit may include a stationary portion and a rotary portion. For example, the rotor drive circuit may include a slip ring and brushes that provides a conductive connection between the stationary portion and the rotary portion. In some embodiments, the rotor drive circuit includes another power coupling type.

In some examples, the rotor drive circuit is or includes a DC-to-DC converter that steps down or steps up DC voltage received from the DC power supply 105 to a desired voltage level for the rotor winding(s).

Motor System with a Piecewise Affine (PWA) Map-Based Control

Figure 2:
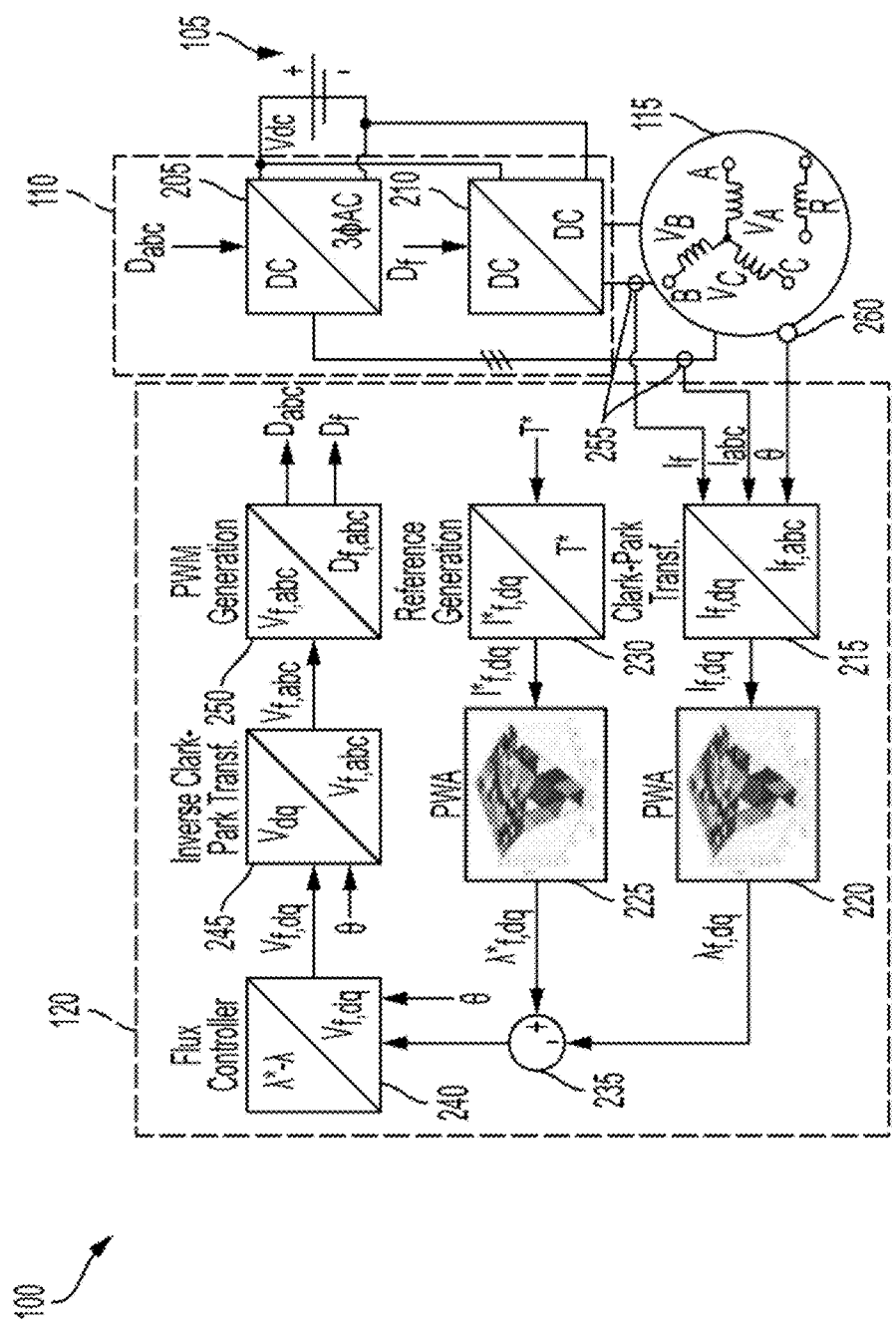
FIG. 2 illustrates an example of the motor system of FIG. 1 including a controller implementing a current-to-flux piecewise affine (PWA) map according to some embodiments.

FIG. 2 illustrates a particular example of the motor system 100, according to some embodiments. For example, the motor controller 120 is illustrated as a collection of functional blocks with respective inputs and outputs. Each of the functional blocks may be implemented by a dedicated hardware circuit of the electronic processor 125 of the controller 120, by a block of software or instructions stored in the memory 130 and executed by the electronic processor 125, or a combination thereof. The motor drive circuit 110 is further illustrated as including a stator drive circuit 205 and a rotor drive circuit 210. The motor drive circuit 110, stator drive circuit 205, and the rotor drive circuit 210 may each be referred to individually or collectively as a power switching network. A power switching network, such as these circuits, may be configured to switch voltage, current, and/or power. The motor 115 is illustrated as a WFS motor having a three-phase stator with phases (A, B, C) and a rotor field winding (R). As previously noted, in other examples, the motor 115 is a permanent magnet synchronous motor, a hybrid synchronous motor, or another motor type. When the motor 115 is a permanent magnet synchronous motor, the rotor field winding (R) is not included in the motor 115 and, accordingly, the rotor drive circuit 210 may not be included, the motor controller 120 may not sense or control current through the rotor field winding (R), and the control blocks of the motor controller 120 may not receive, process, or generate rotor field components.

In FIG. 2, the functional blocks of the motor controller 120 include a Clark-Park current transform block 215, piecewise affine (PWA) current-to-flux linkage maps 220 and 225, reference generation block 230, a difference operation block 235, a flux controller 240, an inverse Clark-Park voltage transform block 245, and a pulse width modulation (PWM) generation block 250. In other examples, one or more of the functional blocks are combined together or distributed into sub-blocks. An example of operation of the motor system 100 and the motor controller 120 of FIG. 2 is provided below with respect to FIG. 3.

Figure 3:
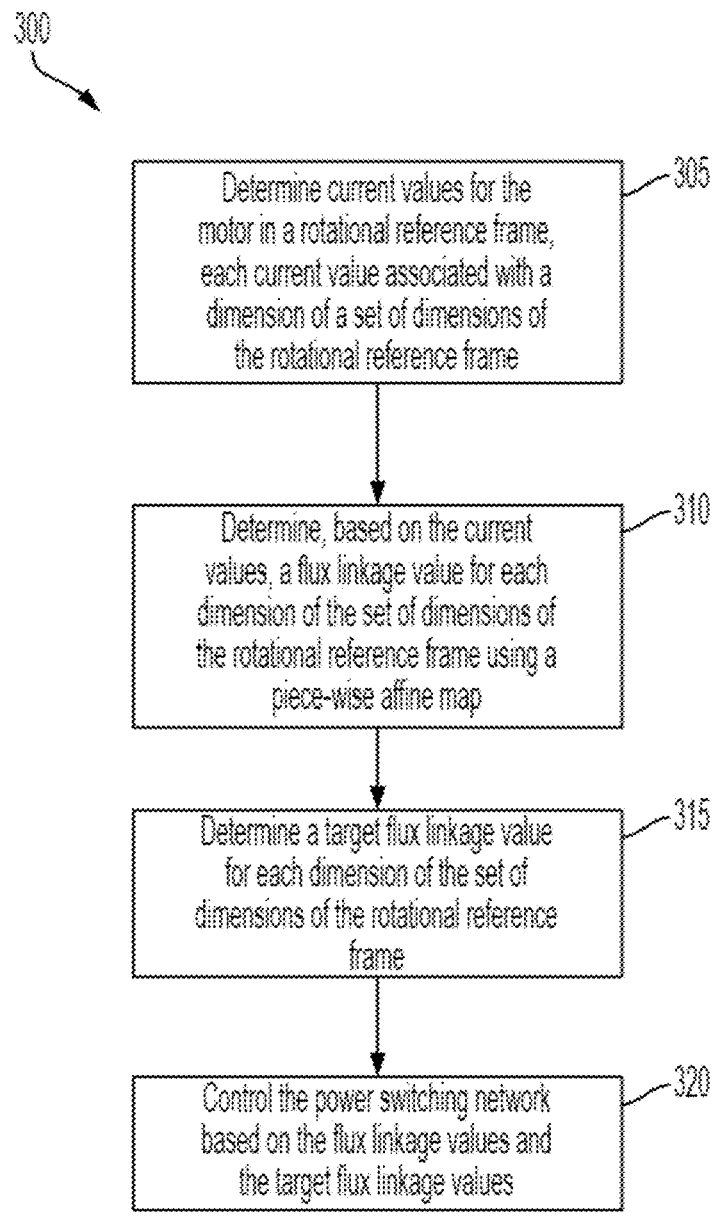
FIG. 3 illustrates a process for controlling a motor using a PWA map according to some embodiments.

FIG. 3 illustrates a process 300 for controlling a motor using piecewise affine modelling. The process 300 is described as being carried out by the motor system 100 of FIG. 2. However, in some embodiments, the process 300 may be implemented by another motor system, for example, motor system 900, 1600, and/or 1800. Additionally, although the blocks of the process 300 are illustrated in a particular order, in some embodiments, one or more of the blocks may be executed partially or entirely in parallel, may be executed in a different order than illustrated in FIG. 3, or may be bypassed.

In block 305, the motor controller 120 determines current values for the motor 115 in a rotational reference frame, such as the RDQN reference frame. Each current value is associated with a dimension (or axis) of a set of dimensions of the RDQN reference frame. Here, the set of dimensions includes the R (or field (f)), D, and Q dimensions (e.g., $I_f$, $I_d$, $I_q$, also referenced as $I_{f,dq}$). As used herein, the variables F, f, R, and r are used interchangeably to refer to rotor field characteristics. For example, rotor field current may be expressed as $I_r$ or as $I_f$, and rotor field flux linkage may be expressed as $\lambda_r$ or as $\lambda_f$.

For example, to implement block 305, the motor controller 120 may determine electrical operational characteristics of the motor 115 in a stationary reference frame; determine a rotational position of the motor 115 (e.g., of the rotor of the motor 115); and transform the electrical operational characteristics and the rotational position to the current values for the motor 115 in the rotational reference frame. For example, to determine the electrical operational characteristics of the motor 115 in the stationary reference frame and the rotational position of the rotor, the controller 120 may receive current measurements from current sensors 255 configured to sense current of each phase of the stator windings (e.g., $I_a$, $I_b$, $I_c$, also collectively referred to as $I_{abc}$) and current of the rotor winding(s) (e.g., $I_f$, sometimes referred to as $I_r$) of the motor 115. The controller 120 may also receive rotational position measurements ($\theta$) from a rotational position sensor 260 configured to measure the rotational position of the rotor. In some examples, the controller 120 may determine current and rotational motor position using other techniques. For example, the controller 120 may use a "sensorless" design to determine the rotor position, for example, by inferring rotor position by detecting zero-crossings, peaks, and/or valleys of back electromotive force (emf) signals on the stator windings. Further, the controller 120 may calculate the current values from voltage measurements on the stator windings and/or rotor winding(s) provided by voltage sensors. To transform the electrical operational characteristics and the rotational position to the current values for the motor in the rotational reference frame, the motor controller 120 may perform, via Clark-Park transform block 215, a Clark-Park transform on the determined current $i_{abc}$ and rotational position ($\theta$) of the motor 115.

In block 310, the motor controller 120 is configured to determine, based on the current values, a flux linkage or inductance value for each dimension of the set of dimensions of the rotational reference frame using a piecewise affine map. For example, the motor controller 120 is configured to determine flux linkage values $\lambda_{f,dq}$ using PWA current-to-flux linkage map 220 or to determine inductance values $L_{f,dq}$ using a PWA current-to-inductance map 2320, described in further detail below with respect to FIG. 23. The set of dimensions may or may not include the null dimension and, accordingly, the motor controller 120 may or may not determine a flux linkage value for a null axis of the rotational reference frame. A piecewise affine (PWA) map (e.g., PWA map 220), as used in block 310, is a nonlinear current-to-flux linkage map that is divided into M domains each with a corresponding affine function that provides a one-to-one mapping of current values to flux linkage values. The affine function of each of the M domains may be linear (i.e., the current-flux linkage relationship may be linearized in each of the M domains). In other embodiments, however, the affine function corresponding to each of the M domains may be quadratic, spline, etc. Further, each of the M domains corresponds to a simplex (e.g., generated using domain decomposition or Delaunay triangulation as described in further detail below). One example of a current-to-flux linkage PWA map is as follows:

$$\lambda = f(i) \approx f_{PWA}(i) = \begin{cases} L_1 i + \psi_1, & i \in \mathcal{J}_1, \\ L_2 i + \psi_2, & i \in \mathcal{J}_2, \\ \ldots \\ L_M i + \psi_M, & i \in \mathcal{J}_M, \end{cases}$$

where $\lambda$ is flux linkage, i is current, $L_j$ is $\Delta\lambda/\Delta i$ (i.e., the slope of flux linkage with respect to current), $\psi_j$ is flux that is a constant of integration, and $I_j$ is the simplex (or domain). Additionally, Volt*seconds (Vs) may be the unit for both $\psi_j$ and $\lambda$.

The current-to-flux linkage PWA map 220 may also correspond to a flux linkage-to-current PWA map that is the inverse of the current-to-flux linkage PWA map 220, although this inverse PWA map may not be explicitly utilized by the motor controller 120 in the process 300. One example of this inverse (flux linkage-to-current) PWA map is:

$$i = g(\lambda) \approx g_{PWA}(\lambda) = \begin{cases} L_1^{-1}(\lambda - \psi_1), & \lambda \in \Lambda_1, \\ L_2^{-1}(\lambda - \psi_2), & \lambda \in \Lambda_2, \\ \ldots \\ L_M^{-1}(\lambda - \psi_M), & \lambda \in \Lambda_M, \end{cases}$$

where $i = gi = g \circ f(i) f(i)$.

In some embodiments, using a PWA map (e.g., the PWA map 22) to determine flux linkage value based on a current value includes a two-step process. First, the motor controller 120 identifies on which simplex (or domain) of the PWA map the current value resides. Second, the motor controller 120 uses the particular affine function associated with the identified simplex to calculate the flux linkage.

With respect to the first step, the motor controller 120 may identify the simplex (or domain) of the PWA map on which the current value resides using various techniques. In one example, the motor controller 120 may iteratively check simplices (e.g., one by one) to determine whether the current value resides thereon, and continue to do so until the simplex having the current value is identified. Mathematically, this check may be described as projecting the coordinate(s) of current(s) into the local coordinate system of the simplex as a local coordinate vector and, when the components of the local coordinate vector are all be between 0 and 1, a point is considered contained within a simplex. The check for each simplex may include multiplying the current value by a particular transformation matrix associated with the simplex and: (a) if the output is >1, the input current does not reside on it, and (b) if the output is <1, the input current does reside on the simplex. Here, the transformation matrix may identify the n+1 points that create the simplex, where one selected point ($p_0$) creates the origin of the simplex, and each of the other points ($p_1$ to $p_n$) in the simplex can be expressed as one of N vectors $p_{x0}$ relative to the origin (where N=n, and for x=1 to N). In this example, the N vectors include vector $p_{10}=p_1-p_0$, vector $p_{20}=p_2-p_0$, ... vector $p_{N0}=p_n-p_0$. The collection of relative vectors, that is the set of vectors $p_{10}$, $p_{20}$ ... $p_{N0}$, form the columns of the transformation matrix. A test vector, $p_t$, can then be transformed into the local coordinate system by multiplying the inverse of the transformation matrix by $p_{t0}$. In some examples, the test vector may be expressed in the current space, for example, with $i_r$, $i_d$, $i_q$ and units of Amp-turns, or in the flux linkage space, for example, with $\lambda_r$, $\lambda_d$, $\lambda_q$ and units of Volt-seconds per turn). Although this function and matrix is described with respect to a PWA map used to convert current to flux linkage, a matrix using the same format and formula may be used with respect to a PWA map used to convert from flux linkage to current (with different values, but an operational point (e.g., pointN) is the same point in both matrices). In some examples, such an operational point may be expressed via six components to specify current through each coil of the motor and flux linkages of each coil of the motor (e.g., $i_r$, $i_d$, $i_q$, $\lambda_r$, $\lambda_d$, $\lambda_q$). However, because only three of these six variables may be specified independently, shorthand notation with three variables may be used (e.g., $i_r$, $i_d$, $i_q$ or $\lambda_r$, $\lambda_d$, $\lambda_q$).

In other embodiments, different techniques may be used to identify the simplex, such as k-d trees, cosine similarity, a radial basis function, gaussian function, neural net algorithm, a classifier algorithm, and the like.

With respect to the second step, once the particular simplex (or domain) is identified, the motor controller 120 uses the particular affine function associated with the identified simplex (or domain) to calculate the flux linkage. For example, with reference to the above example current-to-flux linkage PWA map 220, if the motor controller 120 identifies the simplex 12 in the first step, then the motor controller 120 obtains the coefficients $L_2$ (a 3D slope matrix) and $\psi_2$ (a 3D intercept matrix) for the associated affine function $L_2 i + \psi_2$ to calculate flux linkage (i.e., flux linkage ($\lambda$)=$L_2 i + \psi_2$). For example, the motor controller 120 applies the current values to the affine function to calculate the flux linkage. Here, this may include the motor controller 120 multiplying the current values by the 3D slope matrix $L_2$, and adding the 3D intercept matrix $\psi_2$, to arrive at the flux linkage values. The 3D intercept matrix ($\psi$) may be considered a vector that represents the origin of the simplex represented in flux linkage space. The matrix L may be the product of the local coordinate transformation matrix from both current space and flux linkage space (e.g., L=$t_\lambda$*inverse ($t_i$)).

In block 315, the motor controller 120 is configured to determine a target value for each dimension of the set of dimensions of the rotational reference frame. For example, the motor controller 120 is configured to determine target values in the form of target flux linkage values $\lambda^*_{f,dq}$ or in the form of target current values $i^*_{f,dq}$. The motor controller 120 may or may not determine a flux linkage value for a null axis of the rotational reference frame. To determine the target flux linkage values, the motor controller 120 may determine a desired control parameter (e.g., motor torque (T*) or motor speed (not shown)) for the motor 115. The desired control parameter (e.g., motor torque (T*) or speed) may also be referred to as a motor command, and may be provided by an input device as described above. The motor controller 120 may then, using the reference generation block 230, transform the desired control parameter to target current values for the motor in the rotational reference frame (e.g., $I^*_{f,dq}$). For example, the motor controller 120 may use the reference generation block 230 in the form of a lookup table (e.g., stored in the memory 130) that maps potential values for the desired control parameter T* to the target current values. The lookup table may be populated in advance based on experimental data. The motor controller 120 may then determine, based on the target current values, the target flux linkage value for each dimension of the set of dimensions of the rotational reference frame using the piecewise affine (PWA) map 225. The motor controller 120 may use the PWA map 225 to determine the target flux linkage values based on the target current values in a similar manner as the PWM map 220 is used to determine the flux linkage values based on the current values. The two PWA maps 220 and 225 illustrated in FIG. 2 may be duplicate PWA maps, or the motor controller 120 may use one PWA map for both the actual values and the target values (i.e., although two PWA maps are illustrated, in some embodiments, one shared PWA map is included instead). In other examples, the target current values output by the reference generation block 230 are used as the target values, as explained in further detail below with respect to FIG. 23.

In block 320, the motor controller 120 is configured to control the power switching network based on the flux linkage or inductor values and the target values (e.g., target flux linkage values or target current values). See discussion below with respect to FIG. 23 for a discussion of control based on inductor values and target current values. Returning to FIG. 2, however, in some embodiments, the motor controller 120 may generate control signals in the stationary reference frame to drive the motor 115 based on a difference between the target flux linkage value and the flux linkage value for the dimension. For example, the motor controller 120 may, using the difference block 235, determine a difference between each flux linkage value and target flux linkage value for each respective dimension of the set of dimensions of rotational reference frame (e.g., R, D, and Q dimensions, optionally Null dimension). This difference value and the rotational position of the motor (θ) may be provided to the flux controller 240. The flux controller 240 may be, for example, a proportional integral derivative (PID) controller, a PI controller, a lookup table, a model-based controller (e.g., implementing model predictive control (MPC), as described in further detail below), or another control device. The motor controller 120 (e.g., via the flux controller 240) may then generate a voltage command for each dimension of the set of dimensions of the rotational reference frame based on the difference value and the rotational position. For example, the flux controller 240 may output voltage commands $V_f$, $V_d$, and $V_q$ (also referred to collectively as $V_{f,dq}$).

The motor controller 120 may then transform the voltage commands from the rotational reference frame to the stationary reference frame. For example, the motor controller 120, using the inverse Clark-Park transform block 245, may perform an inverse Clark-Park transform on the voltage commands $V_{f,dq}$ to generate voltage commands $V_f$, $V_a$, $V_b$, and $V_c$ (also referred to collectively as $V_{f,abc}$) in the stationary reference frame.

The motor controller 120 may then, using PWM generation block 250, generate a pulse width modulated control signal for each dimension of the stationary reference frame to control the power switching network to drive a stator of the motor. For example, the PWM generation block 250 may implement, and the motor controller 120 may access, respective lookup tables for each of the stator phases and the rotor field winding, where the motor controller 120 provides a voltage command to the respective lookup tables of the PWM generation block 250 (e.g., $V_a$ to the lookup table for stator phase A, $V_b$ to the lookup table for stator phase B, $V_c$ to the lookup table for stator phase C, and $V_f$ to the lookup table for the rotor field winding). The PWM generation block 250, via the lookup tables, may return control signal parameters (e.g., a duty cycle) for each stator phase and the rotor field winding.

Ultimately, then, as part of block 320, the motor controller 120 may provide control signals to the drive circuit 110 including stator drive control signals $D_a$, $D_b$, $D_c$ (also collectively referred to as $D_{abc}$) and rotor drive control signals $D_f$ (sometimes referred to as $D_r$) in accordance with the control signal parameters (e.g., at the particular duty cycles indicated by the voltage commands). These control signals may be applied to control terminals of power switching elements of the stator drive circuit 205 and rotor drive circuit 210 of the motor drive circuit 110. For example, the control signals $D_{abc}$ may be provided to the stator drive circuit 205 to control the power switching elements thereof, and the control signal $D_f$ may be provided to the rotor drive circuit 210 to control the power switching elements thereof.

When in a motor operational mode, based on the control signals, the motor drive circuit 110 is controlled to apply power from the power supply 105 to the motor 115 to drive rotation of the motor 115. Similarly, when in a generator operational mode, based on the control signals, the motor drive circuit 110 is controlled to apply electric power from the motor 115 to the power supply 105 (e.g., to charge the power supply) and/or to another electrical load.

Generating a Piecewise Affine (PWA) Map

In some embodiments, a PWA map as generated and used herein is based on a state-space model of the motor ultimately to be controlled. For example, in the case of a WFS motor that is neutral-point isolated (thus, having generally no 0-axis flux and current) and without damper windings, voltage equations for a state-space model are:

$$\dot{\lambda}_r = u_r - R_r i_r = \bar{u}_r,$$

$$\dot{\lambda}_d = \omega \lambda_q + u_d - R_s i_d = \omega \lambda_q + \bar{u}_d,$$

$$\dot{\lambda}_q = -\omega \lambda_d + u_q - R_s i_q = -\omega \lambda_d + \bar{u}_q,$$

where "˙" is the d/dt operator; $\lambda_r$ is the rotor flux linkage (i.e., field flux linkage); $\lambda_d$ and $\lambda_q$ are the d-axis and q-axis stator flux linkages, respectively; i and v are the currents and voltages of the appropriate dimension; $R_r$ and $R_s$ are the rotor and stator resistances, and $\omega$ is the synchronous speed, i.e. the electrical velocity of the machine. Furthermore, we introduce the voltages $\bar{v}$ ($\bar{u}_r$) that are the terminal voltages compensated by the winding resistive voltage drop. This concept can be generalized to include compensation for inverter nonlinear behavior such as switch on-voltage drops and dead times. For other motor types, a similar state model may be defined with modified equations to account for differences in the motors, including for motors with higher dimensions.

The torque of the machine, T, is defined by:

$$T = p i_{rdq} J \lambda_{rdq},$$

where p is the number of pole pairs, and J is the cross-coupling matrix:

$$J = \begin{bmatrix} 0 & 0 & 0 \\ 0 & 0 & -1 \\ 0 & 1 & 0 \end{bmatrix}.$$

The machine currents map onto machine flux with a nonlinear map $$\lambda_r = f_r(i_r, i_d, i_q),$$
$$\lambda_d = f_d(i_r, i_d, i_q),$$
$$\lambda_q = f_q(i_r, i_d, i_q),$$

That captures magnetic coupling between axis, magnetic saturation, and cross-saturation. These equations can be written as a standard state-space systems using vector notation $$\dot{\lambda} = A\lambda + B\bar{v},$$
$$i = g(\lambda),$$

where the state is the flux $\lambda = [\lambda_r, \lambda_d, \lambda_q]^T \in \Lambda$, the input is the compensated voltage $\bar{v} = [\bar{v}_r, \bar{v}_d, \bar{v}_q]^T \in V$, and the measurement is the current $i = [i_r, i_d, i_q]^T \in I$. The linear dynamic model is defined by the matrices $$A = \begin{bmatrix} 0 & 0 & 0 \\ 0 & 0 & \omega \\ 0 & -\omega & 0 \end{bmatrix}, B = I = \begin{bmatrix} 1 & 0 & 0 \\ 0 & 1 & 0 \\ 0 & 0 & 1 \end{bmatrix}.$$

The output function $g: \lambda \to i$ is the inverse of the nonlinear flux map $f(\cdot) = [f_r(\cdot), f_d(\cdot), f_q(\cdot)]^T$, and $f: i \to \lambda$.

Figure 4:
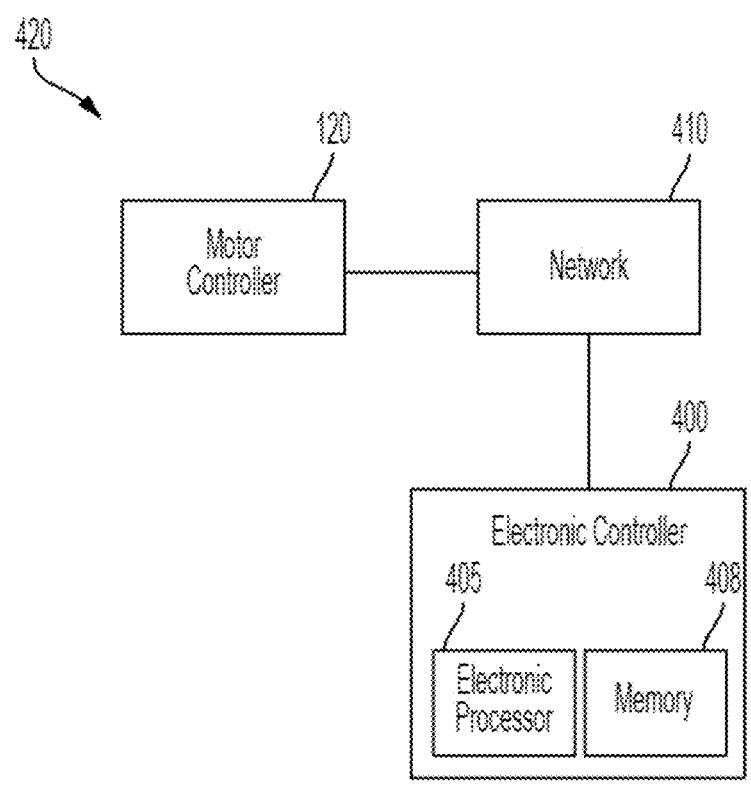
FIG. 4 illustrates a configuration system according to some embodiments.

As described herein, a PWA map may be generated to express the nonlinear current-to-flux map $f(\cdot)$ and a PWA map may be generated to express the nonlinear flux-to-current map $g(\cdot)$. In some embodiments, a multi-step process is implemented to generate such a PWA map. The resulting PWA map may be used, for example, in the process 300. The multi-step process may be executed by an electronic controller 400 including a processor 405 and a memory 408, as illustrated in FIG. 4. The electronic controller 400 may be a computing device, such as a server, a local computing device, a cloud-based system that includes a collection of sub-computing devices, or the like. This electronic controller 400 may be separate from the motor controller 120. In some examples, the electronic controller 400 may be communicatively coupled with the motor controller 120 via a network 410 (e.g., one or more of a local area network, a wide area network, a cellular network, a telecommunications network, etc.). In some examples network 410 is communicatively coupled to the motor controller 120 temporarily, in advance of operation of the motor controller 120 to control a motor (e.g., the motor 115). For example, the communicative coupling may be used by the electronic controller 400 to configure the motor controller 120 to have and/or implement a PWA map (e.g., PWA map 220 and/or 225) generated by the electronic controller 400. The motor controller 120 may, in some examples, disconnect from the electronic controller 400 after a configuration stage to implement offline operation using the PWA map(s) 225 and/or 225. The elements of FIG. 4 may be referred to as a configuration system 420.

The processor 405 and memory 408 may be similar to the processor 125 and memory 130 of the motor controller 120 described above, although, at least in some embodiments, they may have increased processing power and memory capabilities relative to the motor controller 120 that may have space and power constraints. Additionally, although described in the singular, the electronic controller 400 may include one, two, or more controllers (e.g., each with a processor and memory) operating in a distributed manner. Similarly, the processor 405 and memory 408 of electronic controller 400 may include one, two, or more respective processors and memories operating in a distributed manner.

The resulting PWA map generated by the electronic controller 400 may be received by and stored on a motor controller (e.g., on the memory 130 of the motor controller 120), enabling the motor controller to control a motor while offline (e.g., not connected to remote processing systems) in a manner as described above with respect to the process 300.

In some embodiments, to generate a PWA map for use in controlling an electric motor (e.g., the motor 115), such as described in the process 300, the electronic controller 400 (1) obtains a data set of current-flux linkage pairs for operational points of the electric motor; (2) applies a domain decomposition algorithm to the data set to generate current simplices and flux linkage simplices, and (3) creates a PWA map (or function) (e.g., $f_{PWA}$ or $g_{PWA}$) using the simplices.

With respect to the first step, to obtain the data set of current-flux linkage pairs for operational points of the electric motor, the electronic controller 400 (or another electronic controller) may perform a simulation for the motor (e.g., using finite element analysis) to generate the data set; may, through experimentation, estimate or calculate flux linkage based on observations of voltage and current over time, and potentially other system parameters, for example, resistances, torques, rotational speeds, or the like, to generate the data set; or may generate the data set through a combination of simulation and experimentation. As one example, in the RDQN space, the data set may include current-flux linkage pairs expressed as $(i_r, i_d, i_q; \lambda_r, \lambda_d, \lambda_q)$. In this example, where the system may intend to have zero current under nominal operation, the null dimension (N) may be ignored. The size of the data set may depend on the number of operational points of the motor that are taken into consideration. The more operational points, the larger the data set. In some embodiments, the operational points may be selected to be operational points of interest for the motor or those operational points that make up the entire or a substantial portion of the operational domain of the motor. See additional description below regarding selection of operational points.

Turning to the second step, the electronic controller 400 applies the domain decomposition algorithm to the data set to generate current simplices and flux linkage simplices. Stated another way, the electronic controller 400 generates current simplices and flux linkage simplices based on a domain decomposition technique. Various domain decomposition algorithms or techniques, also referred to as domain subdivision algorithms, may be applied to generate the current simplices and flux linkage simplices. For example, the domain decomposition algorithm or technique may be Delaunay triangulation. In another example, the domain decomposition algorithm or technique may be an irregularly sampled, but rectangular, decomposition, for example, a quad tree algorithm, a box tree algorithm (also referred to as oct tree), or KD-tree algorithm (depending upon the number of independent dimensions). In another example, the domain decomposition algorithm is an alpha shape algorithm or technique. Delaunay triangulation is a known mathematical meshing algorithm or technique, and quad tree, box tree, KD-tree, and alpha shape are also known domain decomposition algorithms or techniques. In some examples, the electronic controller 400 applies the domain decomposition to the current points (that make up the current-flux linkage pairs of the operational points) from the previous step to generate the current simplices, and applies the domain decomposition to the flux linkage points (that make up the current-flux linkage pairs of the operational points) from the previous step to generate the flux linkage simplices.

In some examples, to calculate the Delaunay triangulation for a set of current points (e.g., for N current points), first a Voronoi diagram of the current points may be constructed. The Voronoi diagram splits the current space into N Voronoi cells, where all points in a Voronoi cell are closer to a single point of the original set of current points than any other point. To obtain the Delaunay triangulation, one may find the dual of the Voronoi diagram. Generally, the Delaunay triangulation maximizes the minimum angle in the simplices it creates, thus reducing "skinny" simplices. Such skinny simplices may be undesirable in this context. Here, "skinny" simplices may be described by their aspect ratio. In other words, a simplex having an aspect ratio above a threshold amount may be considered "skinny," while a simplex having an aspect ratio below the threshold amount may be considered "not skinny." The aspect ratio of a simplex can be enforced by the sampling of the space, or the construction of the Delaunay, when desired.

For the resulting current simplices generated, each simplex is connected at a shared boundary to another simplex so that all simplices are connected within the domain, and no simplex overlaps another simplex within the domain. Additionally, the simplices may be defined such that they are closed domains on one side and open domains on the other such that any arbitrary point in the domain will belong to one and only one simplex within the Delaunay construction (even if it is on a boundary). In an example using a three-phase WFSM, assuming the RDQ domain without position (theta) dependency, each simplex may be a tetrahedron (a three-dimensional shape). If theta (θ) is included in the domain (e.g., a RDQθ domain), each simplex may be a four-dimensional shape. Accordingly, each simplex may be n-dimensions, where n is the number of variables or dimensions of the domain.

The flux linkage simplices are similar to the current simplices. That is, for resulting flux linkage simplices generated, each simplex is connected at a shared boundary to another simplex so that all simplices are connected within the domain, and no simplex overlaps another simplex within the domain. Additionally, the simplices may be defined such that they are closed domains on one side and open domains on the other such that any arbitrary point in the domain will belong to one and only one simplex within the Delaunay construction (even if it is on a boundary). Further, each simplex may be n-dimensions, where n is the number of variables or dimensions of the domain.

In some embodiments, of the resulting simplices, each current simplex is associated with just one flux linkage simplex (and vice-versa) and, further, each coordinate in each current simplex is associated with just one coordinate in the associated flux linkage simplex (and vice-versa). In other words, for each coordinate in current space there is one and only one coordinate in flux linkage space.

Figure 5:
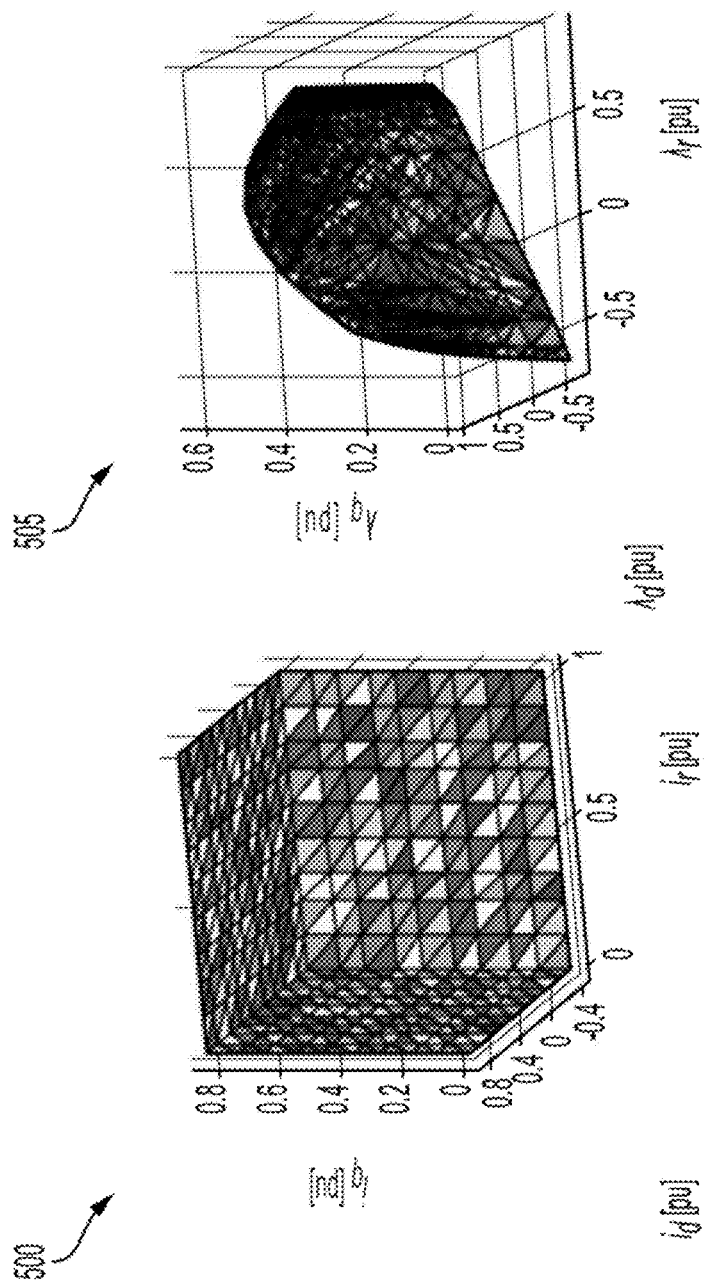
FIG. 5 illustrates two plots for an example data set of current-flux linkage pairs in the RDQ domain for a three-phase wound field synchronous motor (WFSM).

FIG. 5 includes two plots for an example data set of current-flux linkage pair in the RDQ domain for a three-phase WFSM. On the left side of FIG. 5, a first plot 500 of each of the current simplices generated by the Delaunay triangulation algorithm executed on the example data set is illustrated. On the right side of FIG. 5, a second plot 505 of each of the flux linkage simplices generated by the Delaunay triangulation algorithm executed on the example data set is illustrated. Each current simplex of the first plot 500 corresponds to a flux linkage simplex on the second plot 505 (and vice-versa) and, further, each coordinate in each current simplex is associated with just one coordinate in the associated flux linkage simplex (and vice-versa).

Turning to the third step of PWA map generation, the electronic controller 400 creates a PWA map (or function). For example, a particular PWA map may map current to flux linkages ($f_{PWA}(i)$) (e.g., PWM map 220 or 225 of FIG. 2) or may map flux linkages to current ($g_{PWA}(\lambda)$). The PWA map divides an original domain into M subsets, with each subset defined as a simplex. A simplex is the simplest possible polytope in any D-dimensional space. For example, a simplex for three-dimensions, as in the example WFS motor, has the form of a tetrahedron. A D-dimensional simplex can be defined as the convex hull of its D+1 vertices (called the V-notation); alternatively, a simplex can be defined by its by its faces defined as affine inequalities (called the H-notation). For example, $$I_j = H(\{i_{jo}, i_{j1}, \ldots, i_{jD}\})$$

where $i_{jo}, i_{j1}, \ldots, i_{jD} \in I_P$. Each current simplex Ij forms a domain of an affine map that maps into the flux simplex, $$\Lambda_j = H(\{\lambda_{jo}, \lambda_{j1}, \ldots, \lambda_{jD}\})$$

where $\lambda_{jo}, \lambda_{j1}, \ldots, \lambda_{jD} \in \Lambda_P$. The general position of the defining set of measurement points implies that the vertices of each simplex are linearly independent and full dimension (not degenerate).

Continuing with the example of a tetrahedron simplex, each tetrahedron $I_j$ is defined by four vertices. Let one vertex $i_{jo}$ be the support vector such that the origin can be moved $\bar{\imath} = i - i_{jo}$. In the shifted dimension, the simplex is defined by $$\bar{I}_j = H(0, \bar{\imath}_{j1}, \ldots, \bar{\imath}_{jD}),$$

where $\bar{\imath}_{jk} = i_{jk} - i_{jo}$ with k={1, . . . , D} span the simplex. Furthermore, we shift the flux space by the corresponding flux vector $\bar{\lambda} = \lambda - \lambda_{jo}$ that results in the simplex $$\bar{\Lambda}_j = H(0, \bar{\lambda}_{j1}, \ldots, \bar{\lambda}_{jD})$$

where $\bar{\lambda}_{jk} = \lambda_{jk} - \lambda_{jo}$ where k={1, . . . , D} span the simplex.

The nonzero vertices can be interpreted as a basis and since an affine map is an isomorphism, the relative position of a vector in the current and flux simplex is the same:

$$\bar{\imath} = a_1 \bar{\imath}_{j1} + \ldots + a_D \bar{\imath}_{jD}$$

The a coefficients can be obtained similar to how space vector modulation (SVM) computes relative on-times. Further, $\bar{\imath}$ is projected onto the basis of $\bar{I}_j$:

$$p_{jk} = proj_{\bar{\imath}_{jk}} \bar{\imath} = \frac{\bar{\imath}_{jk} \cdot \bar{\imath}}{\|\bar{\imath}_{jk}\|}$$

And obtain the relative length of the vector by dividing the magnitude of the projections with the magnitude of the basis vectors:

$$a_{jk} = \frac{\|p_{jk}\|}{\|\bar{\imath}_{jk}\|}.$$

To find the flux vector λ, we multiply $a_k$ with the basis vectors of $\bar{\Lambda}_j$:

$$\bar{\lambda} = a_1 \bar{\lambda}_{j1} + \cdots + a_D \bar{\lambda}_{jD}.$$

Then, the motor flux results from shifting the origin.

These preceding four equations can be simplified using vector notation, where the bases of $\bar{I}_j$ and $\bar{\Lambda}_j$ are the matrices:

$$M_{\bar{I}_j} = [\bar{\imath}_{j1}, \ldots, \bar{\imath}_{jD}],$$

$$M_{\bar{\Lambda}_j} = [\bar{\lambda}_{j1}, \ldots, \bar{\lambda}_{jD}],$$

and a=$[a_1, \ldots, a_D]^T$. Then, $\bar{\imath} = M_{\bar{I}_j} a$ and $\bar{\lambda} = M_{\bar{\Lambda}_j} a$. Because the simplices are not degenerate, the bases are nonsingular, resulting in the linear relationship:

$$M_{I_j}^{-1}i = M_{\Lambda_j}^{-1}\lambda,$$

which can be used to map current to flux and vice versa. Substituting the original coordinates provides:

$$M_{\Lambda_j}^{-1}(\lambda - \lambda_{j_0}) = M_{\mathcal{I}_j}^{-1}(i - i_{j_0}),$$

which results in the affine map $$\lambda = L_J i + \psi_J,$$

where $L_J = M_{\Lambda_j} M_{I_j}^{-1}$ and $j = \lambda_{j_0} - L_J i_{J0}$.

Rewriting in RDQ notation, the equation relating current to flux linkage for the WFS motor without saturation has the form:

$$\lambda_{rdq} = L_{rdq} i + \psi_{rdq}$$

where $L_{rdq} \in \mathbb{R}_{3\times3}^+$ is the inductance matrix and $\psi_{rdq}$ is the flux-offset vector:

$$L_{rdq} = \begin{bmatrix} L_{rr} & L_{rd} & L_{rq} \\ L_{dr} & L_{dd} & L_{dq} \\ L_{qr} & L_{qd} & L_{qq} \end{bmatrix}, \psi_{rdq} = \begin{bmatrix} \psi_r \\ \psi_d \\ \psi_q \end{bmatrix}$$

The diagonal terms of L are the self-inductances of the rotor ($L_{rr}$) and stator ($L_{dd}$, $L_{qq}$), while the non-diagonal terms are the mutual inductances between the three axes. Typically, $L_{rq}$, $L_{dq}$, $L_{qr}$, $L_{qd}$ and are negligible, while $L_{dr}$ and $L_{rd}$ create the cross-coupling effect.

Selection of Operational Points and PWA Map Optimization

In some examples, a regularly spaced grid of operational points is used in the first step of PWA map generation. Generally, the more operational points selected in the first step, the more simplices generated in the second step, and the larger and/or more complex the PWA map. As the PWA map increases in size and/or complexity, the accuracy of the PWA map may improve until reaching an approximate peak. In some examples, the electronic controller may downsample the operational points such that fewer than the total number of available operational points are used to generate the PWA map. Such downsampling may, generally, reduce the size and/or complexity of the PWA map, and may result in a reduction in accuracy. Depending on the amount of downsampling, the amount of operational points available, and the like, the reduction may be minimal or at least within design tolerance for a particular system. Accordingly, the number of operational points used to generate a PWA map may be a balance between the size and/or complexity of the PWA map versus the desired accuracy of the PWA map.

In some examples, an irregularly spaced grid of operational points is used in the first step of PWA map generation. An irregularly spaced grid of operational points may enable a reduction of points in some portions of the operational domain of the motor (e.g., where the current-flux linkage relationship is more linear), an increase in points in other portions of the operational domain of the motor (e.g., where the current-flux linkage relationship is more non-linear), or both. Selectively reducing operational points, particularly where the current-flux linkage relationship may be more linear, can minimize or limit any reduced accuracy from removing operational points, while improving memory and processing efficiencies based on a smaller and/or less complex PWA map. Similarly, selectively adding operational points, particularly where the current-flux linkage relationship may be more nonlinear, can maximize or improve accuracy of the PWA map, with minimal or reduced impact on memory and processing efficiencies. As a result, the PWA map generated using an irregularly spaced grid of operational points can provide high accuracy, high responsiveness, and low computational requirements compared to PWA maps generated using regularly spaced grid of operational points.

Figure 6:
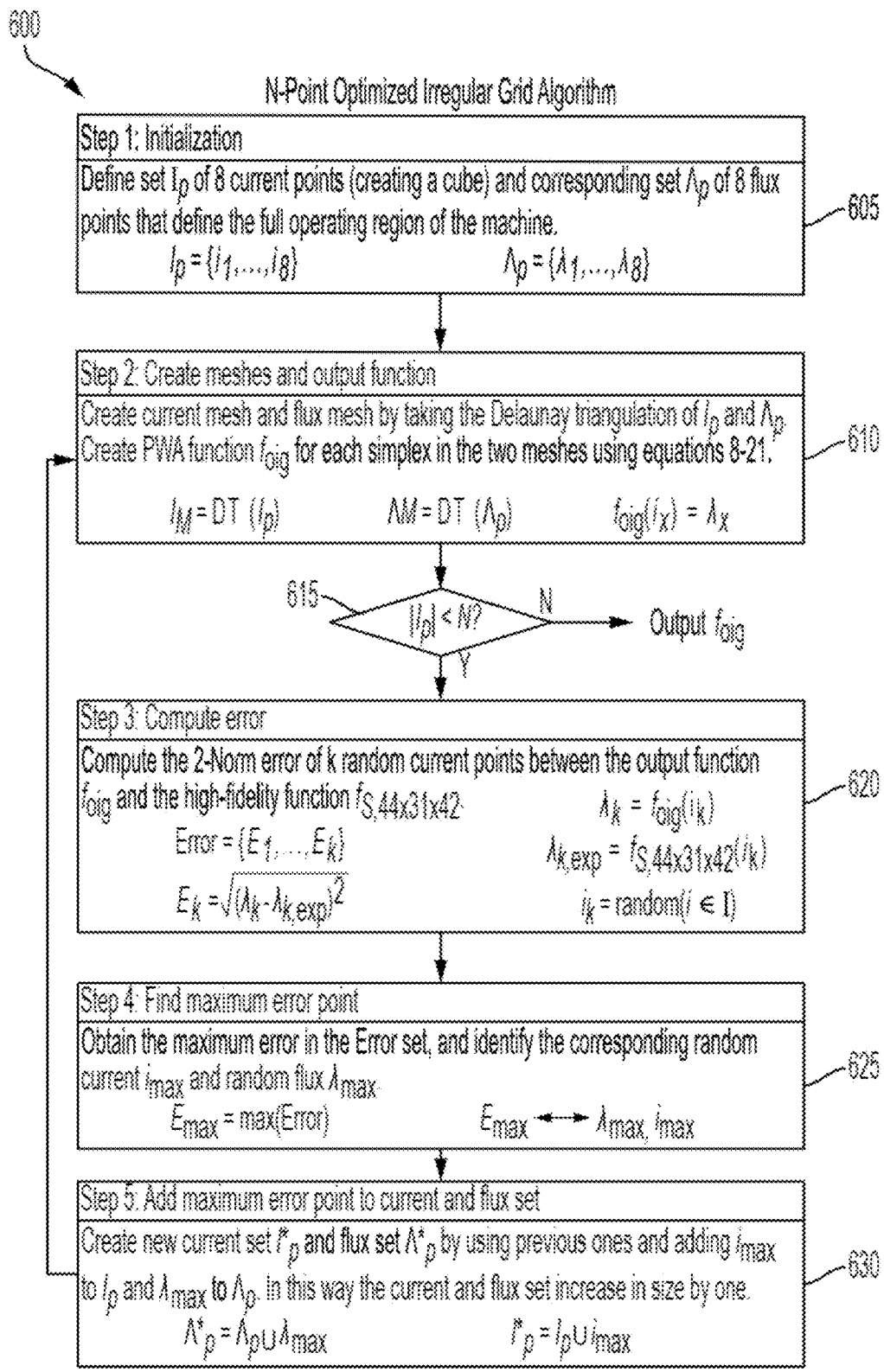
FIG. 6 illustrates a process to generate a PWA map using an irregularly spaced grid of operational points.
Figure 7A:
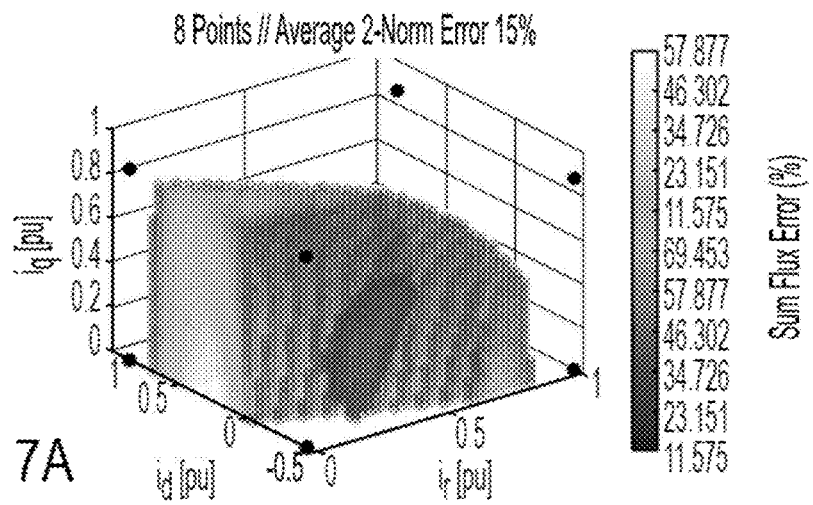
FIGS. 7A-7F illustrate respective heat maps of a 2-Norm error for PWA maps generated using the process of FIG. 6.
Figure 7B:
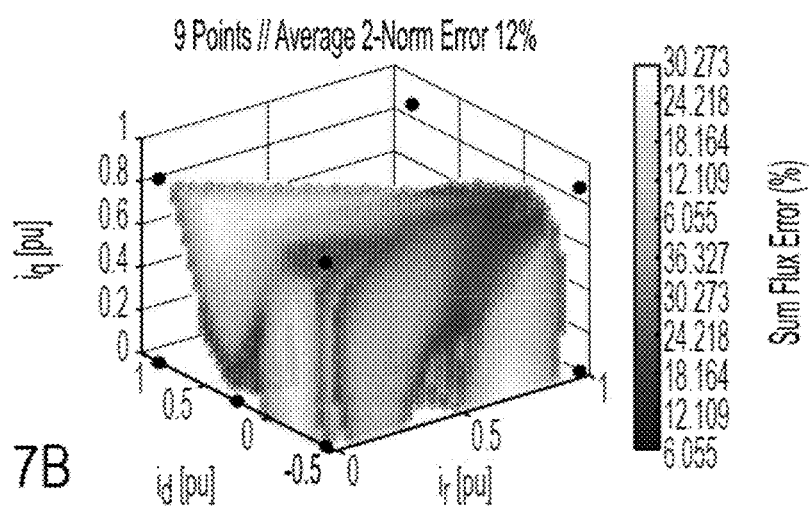
Figure 7C:
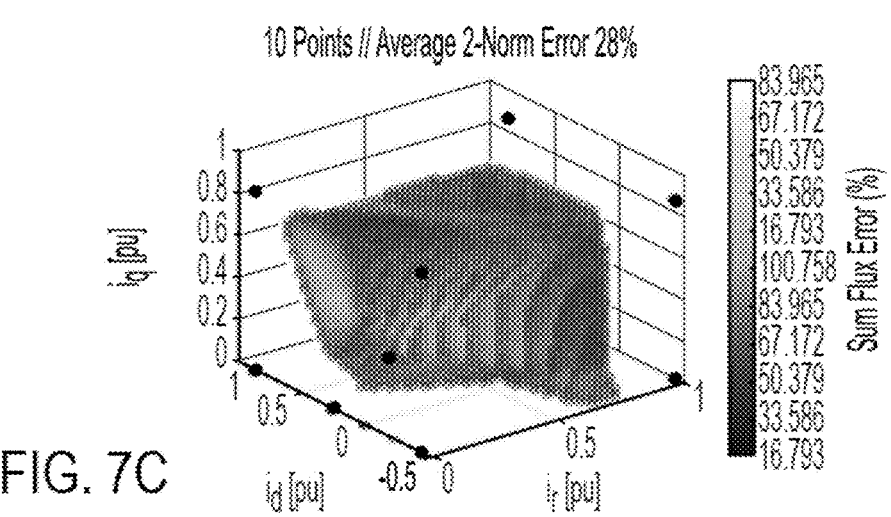
Figure 7D:
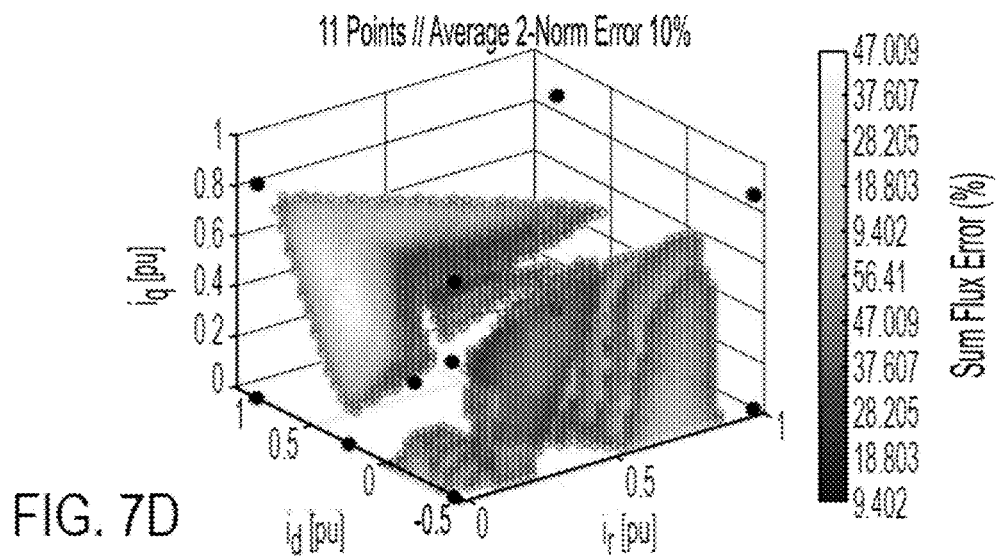
Figure 7E:
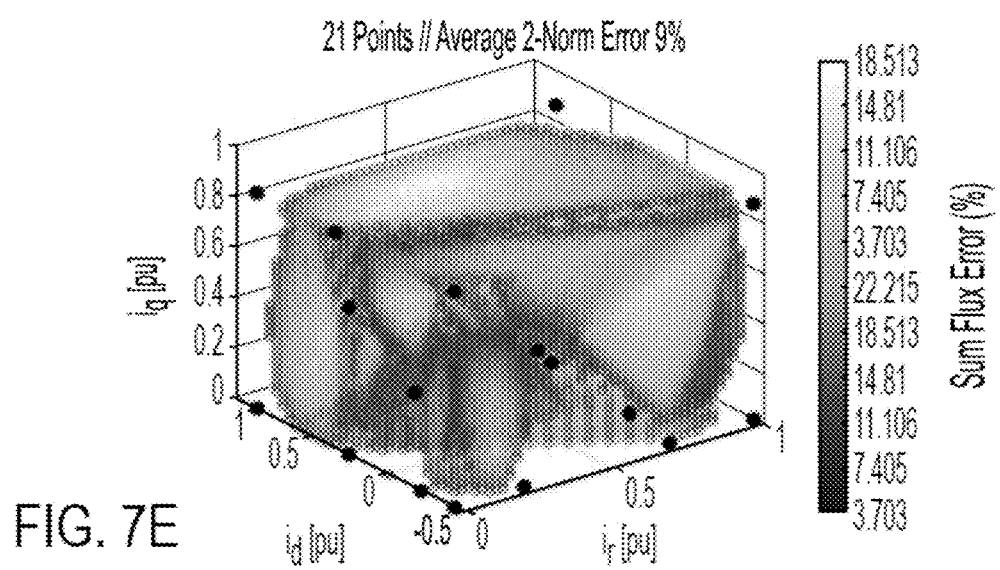
Figure 7F:
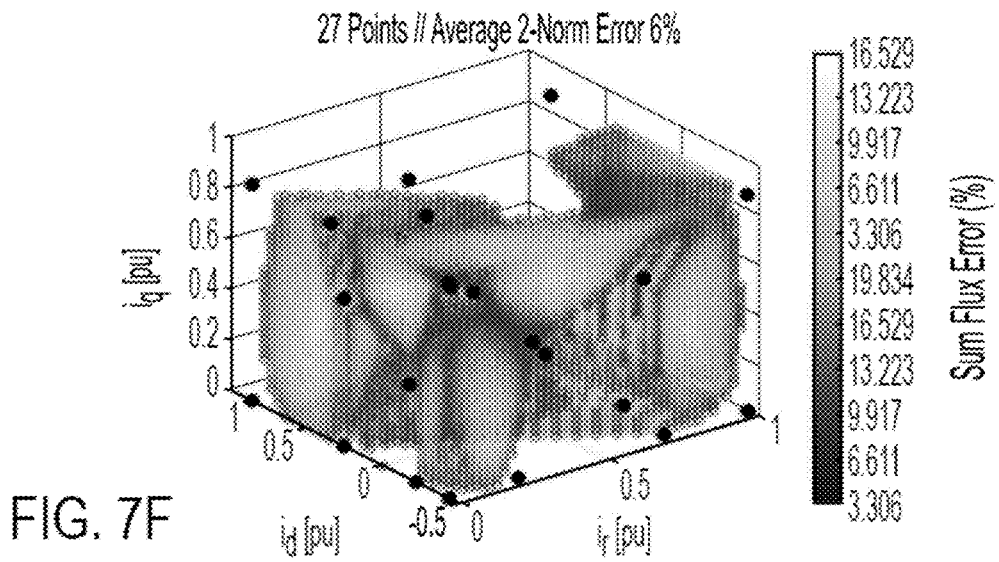

Multiple techniques may be used to generate a PWA map using an irregularly spaced grid of operational points. For example, FIG. 6 illustrates a first process 600 to generate a PWA map, $f_{oig}$, using an irregularly spaced grid of operational points. The PWA map $f_{oig}$ may be a current-to-flux PWA map, although a similar process may be used to generate a flux-to-current PWA map as well. In this example, the electronic controller (e.g., electronic controller 400) may start with an initial set of operational points, iteratively generate PWA maps and, for each PWA map, detect a portion of the operational domain with high or the highest error rates (e.g., from a random sampling), and add operational points for that portion to be used in the next successive PWA map to be generated. As shown in FIG. 6, this iterative process may be repeated until the operational points reaches a predetermined threshold N (i.e., until |Ip|>=N). In other examples, the process may be repeated until a PWA map reaches a desired accuracy (e.g., an average of k error values I is less than threshold value).

More particularly, in block 605, the electronic controller 400 may define an initial set current points and corresponding flux points that define the full operating region of the machine (e.g., the motor 115). The electronic controller 400 may obtain the initial set from a memory (e.g., the memory 408) or an external memory or input/output interface. In the illustrated example, the initial set includes eight current points and eight flux points making up eight current-flux operation point pairs; however, in other examples, the initial set includes a different number (more or less) of current-flux operation point pairs. Additionally, in some examples, the initial set of current and flux points may define an operating region of the machine that is less than the full operating range.

In block 610, the electronic controller 400 creates a PWA function $f_{oig}$ for the sets of current and flux points. For example, the electronic controller 400 creates current mesh and flux mesh by executing the domain decomposition (e.g., Delaunay triangulation algorithm) on the initial set of current points and corresponding flux points, and defining the PWA function for each simplex in the two meshes, using the above-described techniques.

In block 615, the electronic controller 400 determines whether the PWA map generation process 600 is complete. For example, the electronic controller 400 may compare the number of operational points (e.g., current points $I_p$) to a predetermined threshold N. In response to the number of operational points being at or above the predetermined threshold, the electronic controller 400 may determine that the PWA map generation process 600 is complete, and may output or store (e.g., in the memory 408 or 130) the PWA map $f_{oig}$ generated from the most recent execution of block

610. In response to the number of operational points being less than the predetermined threshold, the electronic controller 400 may process to block 620. In other examples, the electronic controller 400 may determine that the PWA map generation process 600 is complete based on another criteria, for example, whether the PWA map most recently generated reaches a desired accuracy (e.g., an average of k error value(E) is less than threshold value), the number of iterations reaches an iteration threshold, or the like.

In block 620, the electronic controller 400 computes an error between the PWA map most recently generated and a high-fidelity function. The high-fidelity function may serve as a baseline on which to judge the accuracy of a PWA map. For example, the electronic controller 400 may compare a 2-Norm error ("Error") of k random current points between the output function (PWA map) $f_{oig}$ and a high-fidelity function (e.g., $f_{S,44\times31\times42}$), where:

$$\text{Error} = \{E_1, \ldots, E_k\}$$
$$E_k = \sqrt{(\lambda_k - \lambda_{k,exp})^2}$$
$$\lambda_k = f_{oig}(i_k)$$
$$\lambda_{k,exp} = f_{S,44\times31\times42}(i_k)$$
$$i_k = \text{random}(i \in I)$$

In block 625, the electronic controller 400 determines the maximum error in the error set (Error), for example, by comparing each of the resulting values in the Error set, and identifies the random current $i_{max}$ and random flux $\lambda_{max}$ corresponding to the maximum error (e.g., from the calculations in the previous block 620 associated with the maximum error).

In block 630, the electronic controller 400 adds a maximum error point to the current and flux set. For example, the electronic controller 400 creates a new current set and new flux set by using the previous current set and previous flux set and adding $i_{max}$ to the current set and $\lambda_{max}$ to the flux set. In this way, the current set and flux set each increase in size by one point. The electronic controller 400 then returns to block 610 to create an updated PWA function based on the new current set and flux set. The steps 610-630 may be repeated until the electronic controller 400 determines, in block 615, that the PWA generation process 600 is complete.

FIGS. 7A-7F illustrate heat maps of a 2-Norm error for PWA maps generated using the process of FIG. 6. In the example illustrated, an additional operational point is added in each successive PWA map generated by an iteration of the process. The error heat maps are associated with a select subset of the iterations of the process that are illustrative of the trend of decreasing average error as the number of points increases. The illustrated heat maps start at 8 points and increase to 27 points, where the points are shown as black dots within the diagrams, and the average error present generally reduces as operational points are added (from 15% to 6%). The title of each heat map includes the number of points and the average error. In particular, FIG. 7A includes 8 points and an average error of 15%, FIG. 7B includes 9 points and an average error of 12%, FIG. 7C includes 10 points and an average error of 28%, FIG. 7D includes 11 points and an average error of 10%, FIG. 7E includes 21 points and an average error of 9%, FIG. 7F includes 27 points and an average error of 6%. The error scale of each heat map varies as shown by the vertical error key on the right side of each heat map, with the maximum error for the heat map at the top of the key (e.g., 57.877% in FIG. 7A).

In another example technique used to generate a PWA map ($f_{oig}$) using an irregularly spaced grid of operational points, the electronic controller may start with a large initial set of operational points and successively remove operational points, rather than starting with a small initial set and adding operational points. For example, in this technique, the electronic controller may start with the large initial set of operational points, then iteratively generate PWA maps and, for each PWA map, detect a portion of the operational domain with low or the lowest error rates (e.g., from a random sampling), and remove operational points for that portion to be used in the next successive PWA map to be generated. This process may be repeated until the operational points reach a predetermined threshold N (i.e., until $|Ip| \leq N$). In other examples, the process may be repeated until a the PWA map falls into a desired accuracy range (e.g., an average of k error value (E) is in a predetermined range). This process may also be referred to as downsampling.

In some embodiments, even further memory and processing efficiencies may be gained by selectively reducing the samples or operational points making up the data set (from the first step of PWA map generation noted above). For example, rather than using regular sampling, in some embodiments, the electronic controller uses a data set derived from irregular sampling where, for example, generally linear regions of operation may have less sampling than generally nonlinear regions of operation. An example process for irregular sampling is discussed above with respect to the flow chart of FIG. 6. In some embodiments, other techniques are used select operational points to make up the data set. For example, the controller may choose a point (whether at random or regularly gridded) and construct the L matrix. Then, the controller may run a cosine similarity function and test the output. When the output is above a certain accuracy threshold or score, the controller may remove one or more points to the data set (e.g., if the mapping is above a size or complexity threshold) or exit the process. When the output is below the certain threshold or score, the controller may add further points to the data set. Then, if the process was not exited, the controller may repeat the process for the modified data set. If the process was exited, the controller may move on to another region and repeat the process, or if all regions have been completed, finalize the mapping based on the final data set. This technique generally homes in on a data set of operational points that provides a mapping having sufficient accuracy and a sufficiently reduced memory footprint and complexity. In other embodiments, other criteria may be used to test a particular region and to determine whether the process is complete.

The plots in FIG. 8A-8C include examples of the PWA maps that are generated from data sets of regularly sampled current grids that are downsampled, to various extents. In particular, each of FIGS. 8A, 8B, and 8C includes four plots, each plot of a regularly gridded data set at one of the following sampling levels: 8×8×8 grid, 4×4×4 grid, 3×3×3 grid, and 2×2×2 grid. FIG. 8A illustrates plots of $\lambda_r$ vs $i_d$ and $i_r$, sliced at $i_q=0$; FIG. 8B illustrates plots of $\lambda_d$ vs $i_d$ and $i_r$, sliced at $i_q=0$, and FIG. 8C illustrates plots of $\lambda_q$ vs $i_d$ and $i_q$, at $i_d=0$.

As described above, some techniques for selecting operational points to form an irregular grid used to generate a PWA map include starting with a smaller set of operational points and adding operational points to the set to arrive at the irregular grid of operational points, while other techniques include starting with a larger set of operational points and removing operational points from the set to arrive at the irregular grid of operational points. In some examples, techniques that includes starting with a smaller set and adding operational points to the set is less computationally demanding that starting with a larger set and removing operational points, reducing the amount processing and memory resources used (e.g., by the electronic controller 400). This reduction in resources can result because, for example, creating the meshes and performing the domain decomposition (see, e.g., block 610) on smaller sets of operational points is less computationally demanding than performing such operations on larger sets of operational points.

A resulting PWA map, such as ultimately created using the process 600 or variations thereof, may be used by a motor controller to control a motor (e.g., by the motor controller 120 to control the motor 115), as described herein. Additionally, a resulting PWA map may be used as a representation of a motor controller and motor for purposes of simulation. This use of the PWA map can be beneficial because, for example, the PWA map accurately represents the associated non-linear motor and flux-based control thereof using less processing and memory resources than other modeling techniques used for motors. Accordingly, performing simulations with the PWA map can occur more quickly, with less processing and less memory resources, than other modeling techniques.

Based on experimental testing using various numbers of current-flux pair operational points (ranging from 8 points to 90 points), the amount of memory used (in kilobytes (kB)) and computational time (in microseconds (µs)) increase nonlinearly with the number of simplices used in the current-to-flux PWA map. Nevertheless, the memory used and computational time remained within a suitable range for typical motor controllers, even at relatively high fidelity. For example, at 45 operational points used to create the meshes, the memory used was still below 20 kB and with a computational time under 50 µs. Indeed, at 30, 40, 45, and 48 operational points, the computational time was between 20-40 microseconds, and at 8, 12, 18, and 24 operational points, the computational time was below 20 microseconds. Additionally, at 8, 12, 18, 24, 30, and 40 operational points, the memory usage was below 10 kB, and at 45, 48, and 60 operational points, the memory usage was between 10 kB and 20 kB.

Use of Other Current-to-Flux Linkage Maps

In some embodiments of the process 300, instead of using a PWA map as described above, another mapping of current to flux linkage is generated from the simplices resulting from the domain decomposition and used in the process 300. For example, instead of using a piecewise function including a plurality of linear relationships, a piecewise function including a plurality of quadratic functions is used to provide the current-to-flux linkage mapping. Generally, the quadratic functions may enable use of even fewer datapoints while still preserving the accuracy of the representation; however, the computational complexity to perform an inverse lookup (e.g., to solve a quadratic function to get from flux linkage to current) may increase. However, in some embodiments, such as the motor controller implementing the process 300, the motor controller may not include an inverse lookup to map flux linkage to current and the increased complexity may be irrelevant. In some contexts, such as in a simulation or motor analysis, the increased complexity may have a larger potential impact.

Other techniques may include, for instance K-Nearest Neighbors (KNN), which includes a method of searching that can be used to find adjacent simplices. KNNs, or other similar methods, utilize a distance metric as a way to build up a tree—for example, a KDTree or BallTree in higher dimensions. When provided a data point, this tree would return K nearest simplices. The metric defined can be any metric that is said to be a "true metric" in the mathematical sense, where a true metric satisfies each of the following conditions:

$$d(x, y) >= 0 \qquad 1$$
$$d(x, y) == d(y, x) \qquad 2$$
$$d(x, y) == 0 \text{ only if } x == y \qquad 3$$

To find adjacent simplices to a data point using this method, in some instances, the center of the simplex is used as the "Neighbors."

Another technique includes cosine similarity, which can be used when comparing data points as vectors in high dimensions where the angle returned gives a relative similarity between the two vectors compared (not absolute). Vectors can, in some instances, contain neural embeddings of higher order data within a lower dimensional space. As more dimensions are included in the simplices, reducing the number of relevant adjacent simplices becomes a larger task. Simplices may be discarded, thereby reducing the number of points required, based on whether a simplex has a high cosine similarity to its neighbors when generating the PWA map. Due to the linearity within the simplex, the cosine similarity could be taken between the gradients within the two simplices that are being compared.

Another technique includes decision trees, where a classification tree is fit to the dataset. For example, a "random forest" approach may take many decision trees using different subsets of the dataset and average their results making them much more robust while also giving a confidence score in the prediction, which can be used in some instances. Additionally, gradient boosting is a method that may be used, which creates many individual decision trees. This, in turn, creates additional trees by focusing on where previous trees have done poorly rather than equally weighting each tree as in a random forest.

Neural networks may also be utilized, including fully connected networks for less complex problems, convolutional networks, recurrent networks (which are particularly useful for time series problems), and/or generative networks.

Simplex Generation Process

In some embodiments, a simplex generation process is provided and, for example, executed by the electronic 400 controller including the processor 405 and the memory 408. As noted above, the processor 405 and memory 408 may be similar to the processor and memory of the motor controller 120 described above, although, at least in some embodiments, they may have increased processing power and memory capabilities relative to the motor controller 120 that may have space and power constraints. Additionally, although described in the singular, the electronic controller may include one, two, or more controllers (e.g., each with a processor and memory) operating in a distributed manner. Similarly, the processor and memory of electronic controller may include one, two, or more respective processors and memories operating in a distributed manner.

In some embodiments, the simplex generation process includes the electronic controller 400 (1) obtaining a data set of current-flux linkage pairs for operational points of the electric motor; (2) applying the domain decomposition algorithm to the data set to generate current simplices and flux linkage simplices, and (3) storing the current simplices and flux linkage simplices in a memory (e.g., the memory 408 and/or the memory 130). The first two steps may be executed similar to the first two steps for the PWA generation noted in the previous sections. In the third step, the electronic controller 400 may store the current simplices and the flux linkage simplices in the memory of the electronic controller and/or another memory with which the electronic controller is in communication.

The generated simplices may then be used to generate a PWA map or other map relating current and flux linkage, as discussed above, as well as for other purposes. For example, the simplices may be integrated into a motor analysis or simulation system and used by the system to convert current values to flux linkage values, and/or to convert flux linkage values to current values. This includes state space modeling and finite element analysis. The simplices may also be used to produce an accurate model of the machine with an irregular grid.

Current-to-Inductance PWA Map

Figure 23:
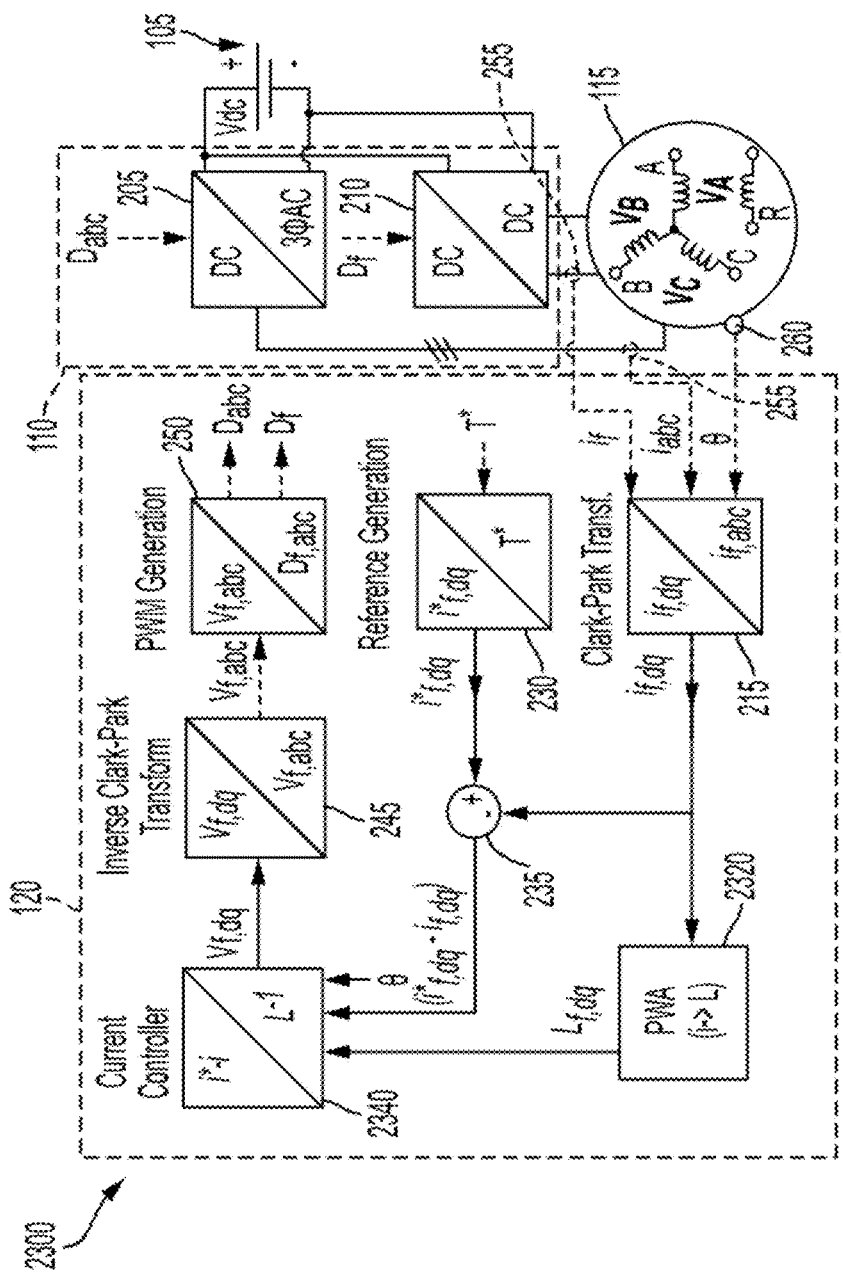
FIG. 23 illustrates another example of the motor system of FIG. 1, which includes a controller a current-to-inductance piecewise affine (PWA) map according to some embodiments.

FIG. 23 illustrates a particular example of the motor system 100 including a current-based controller, identified as motor system 2300, according to some embodiments. The description of components for FIGS. 1 and 2 above similarly applies to the components in FIG. 23 sharing the same element numbers or names, except as otherwise provided herein. For example, the motor controller 120 is again illustrated as a collection of functional blocks with respective inputs and outputs. Each of the functional blocks may be implemented by a dedicated hardware circuit of the electronic processor 125 of the controller 120, by a block of software or instructions stored in the memory 130 and executed by the electronic processor 125, or a combination thereof. The motor drive circuit 110 is further illustrated as including a stator drive circuit 205 and a rotor drive circuit 210. The motor 115 is illustrated as a WFS motor having a three-phase stator with phases (A, B, C) and a rotor field winding (R), and the motor system 2300 is primarily described with respect to a WFS motor. However, in other examples, the motor 115 is a permanent magnet synchronous motor, a hybrid synchronous motor, or another motor type. When the motor 115 is a permanent magnet synchronous motor, the rotor field winding (R) is not included in the motor 115 and, accordingly, the rotor drive circuit 210 may not be included, the motor controller 120 may not sense or control current through the rotor field winding (R), and the control blocks of the motor controller 120 may not receive, process, or generate rotor field components.

In contrast to FIG. 2, the motor system 2300 of FIG. 23 includes a current-to-inductance PWA map 2320, which may be implemented as a piecewise affine map that maps input current values $i_{r,dq}$ (illustrated as $i_{f,dq}$) to inductance values $L_{r,dq}$ (illustrated as $L_{f,dq}$), as described in further detail below. Further, the target current values ($i^*_{r,dq}$) and the current values ($i_{r,dq}$) are provided to the difference operator 235, which provides the determined difference to a current controller 2340. Additionally, the current controller 2340 is provided in place of the flux controller 230 of FIG. 2. The current controller 2340 receives the determined current difference ($i_{r,dq} - i^*_{r,dq}$) and inductance ($L_{r,dq}$) and, based on these values, generates and outputs a voltage command $V_{f,dq}$. For example, to determine the voltage command, the current controller 2340 may multiply an inverse of the inductance values (which may form a matrix) by the determined current difference (e.g., $V_{f,dq} = L_{r,dq}^{-1} (i_{r,dq} - i^*_{r,dq})$). In some examples, the inverted inductance matrix ($L_{r,dq}^{-1}$) can be a direct output of the PWA map 2320 and received by the current controller 2340 as the inductance values. In such cases, in some examples, the matrix inversion can be an offline computation.

The voltage output is provided to the inverse Clark-Park transform block 245, which is ultimately used to control the motor 115 in a similar manner as described with respect to FIG. 2. For example, the current controller 2340 may output voltage commands $V_f$, $V_d$, and $V_q$ (also referred to collectively as $V_{f,dq}$ or $V_{r,dq}$). The voltage commands may then be used to control the motor similar to as described above with respect to FIG. 2 (e.g., via inverse Clark-Park transform block 245, PWM generation block 250, and motor drive circuit 110). Like the flux controller 240, the current-based controller 2340 may be, for example a proportional integral derivative (PID) controller, a PI controller, a lookup table, or another control device.

The PWA map 2320 may map or correspond the current inputs ($i_{r,dq}$) to inductance values (e.g., $L_{r,dq}$ or $L_{r,dq}^{-1}$) that are output by the PWA map. More specifically, as previously discussed above, the PWA map includes a plurality of affine functions, each of the plurality of affine functions associated with a respective domain of a plurality of domains. The PWA map 2320 may be generated using similar techniques as described above with respect to current-to-flux linkage map 220, except with updated equations to account for the relationship between current and inductance in place of the relationship between current and flux linkage, which may be derived from the relationship of inductance to flux linkage and current (e.g., see discussion above of incremental inductance, apparent inductance, and energy-equivalent inductance). To obtain an inductance from a set of inputs to the PWA map 2320, a controller (e.g., the motor controller 120) may identify a first domain corresponding to the set of inputs and selected from the plurality of domains. The first domain is associated with a first affine function of the plurality of affine functions. Then, the controller may apply the set of inputs (i.e., the current values and one or more additional motor characteristics) to the first affine function to determine the inductance value for each dimension of the rotational reference frame. In some examples, each of the plurality of domains associated with respective affine functions) corresponds to a simplex that was provided by executing a domain decomposition algorithm on a data set of input-output pairs for a plurality of operational points of the motor. Here, the input of each input-output pair includes, for an operational point of the motor, current values, and the output includes the corresponding inductance value.

In some examples, the motor system 2300 of FIG. 23 includes a minimum power loss per torque (MPLPT) control block to serve as the reference generation block 230, such as MPLPT block 905 of FIG. 9A (discussed below) and/or the flux controller 2340 is implemented as an MPC controller, as discussed further with respect to FIG. 16.

PWA Map for MPLPT Control Scheme

In some examples, the motor system 100 implements a minimum power loss per torque (MPLPT) control scheme. The MPLPT control scheme can reduce or minimize electrical losses of the motor 115 given a reference torque (e.g., an input torque command indicating a desired output torque of the motor 115) while taking saturation and cross-saturation into account. By reducing electrical losses, namely copper and iron losses, using MPLPT, the motor system 100 provides power-efficient torque control of the motor 115. To implement MPLPT control scheme, an MPLPT optimization problem is solved using a convex pareto frontier of simulated or measured data points. Magnetic saturation and cross-saturation effects are captured using sampled points throughout full-machine operation. A filtered solution set is mapped to current space using piecewise affine functions, which approximate the current using a piecewise linear function for a given torque. This set of piecewise linear functions enables the machine controller 120 to implement MPLPT online or as an offline lookup table. This section focuses on WFS motor, but similar concepts are applicable to other motor types, including PMS motors, hybrid synchronous motors, universal motors, induction motors, and reluctance motors (synchronous and switched).

Directly controlling the torque of any machine is generally difficult, as controllers are able to control and regulate some combination of voltage, current, or flux. A typical approach is to define a reference torque, which is then directly mapped to a reference set of currents. This mapping is generally not unique, and there is no optimal solution as torque is a non-convex function of current. This problem is typically referred to as Maximum Torque per Ampere (MTPA), but is rephrased in this research as Minimum Power Loss per Torque (MPLPT) to include iron losses. The MPLPT problem becomes more complex with the addition of the strong saturation in magnetic flux of a WFS motor that operates in the linear and non-linear magnetic regimes to prevent high flux error during saturation and cross-saturation.

Existing online MTPA methods may be computationally expensive on a controller, while offline MTPA methods include adding a cross-coupling torque term and additional variables that decrease the inductance in saturation to approximate saturation effects, which produces a difficult-to-optimize equation and large lookup table.

In some examples, the MPLPT approach proposed herein uses pareto-optimal simulated or experimental values to the MPLPT as candidate points for an MPLPT current path. The solution set is reduced by using convex pareto-optimal points, and the points are linked using a Piecewise Affine (PWA) function. This approach produces a set of linear functions that are computationally cheap to run on a controller for any reference torque of the machine.

Figure 9A:
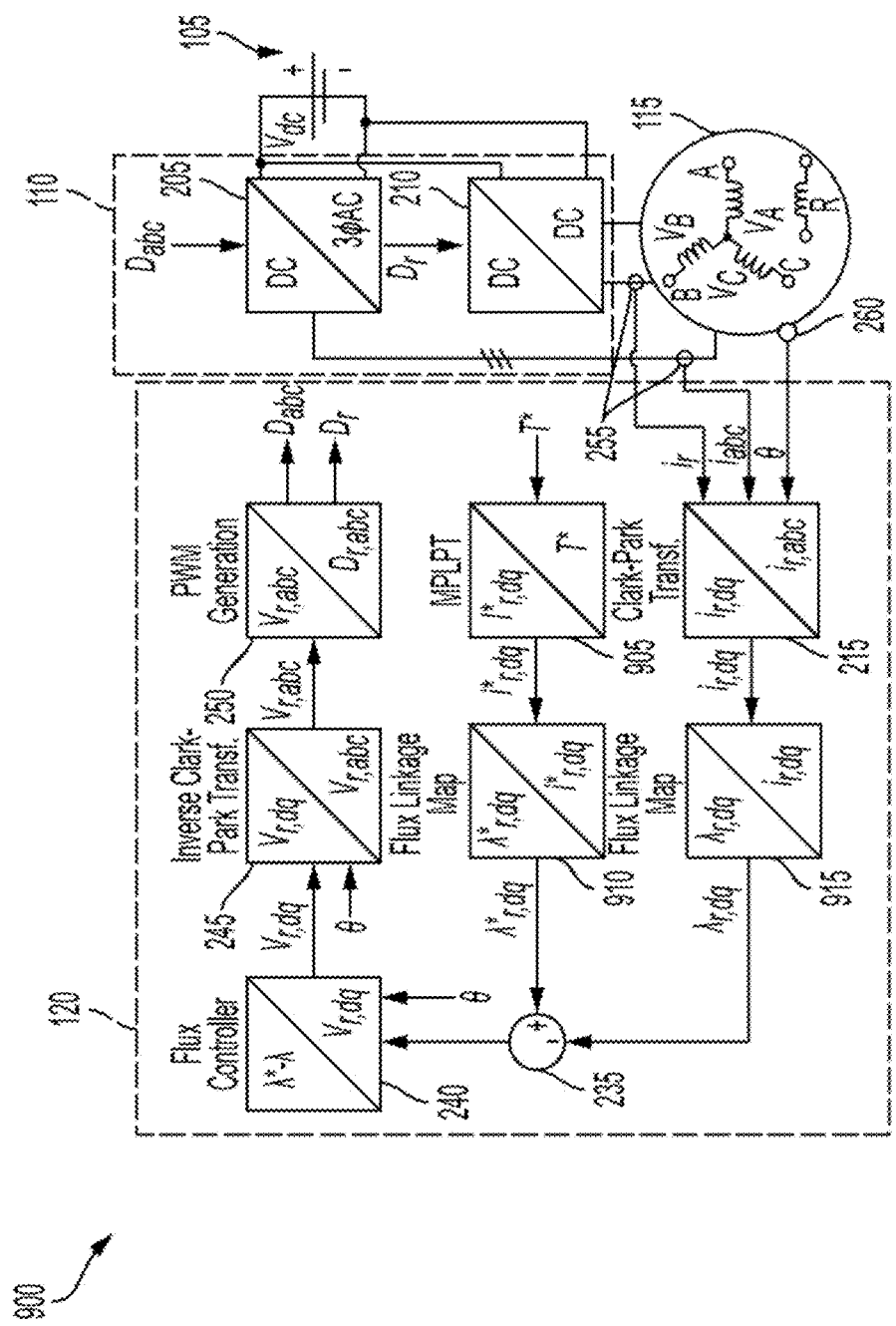
FIG. 9A illustrates another example of the motor system of FIG. 1, which includes a controller implementing a MPLPT control scheme according to some embodiments.

FIG. 9A illustrates a particular example of the motor system 100, identified as motor system 900, implementing such an MPLPT control scheme, according to some embodiments. The description of components for FIGS. 1 and 2 above similarly applies to the components in FIG. 9A sharing the same element numbers or names, except as otherwise provided herein. For example, the motor controller 120 is again illustrated as a collection of functional blocks with respective inputs and outputs. Each of the functional blocks may be implemented by a dedicated hardware circuit of the electronic processor 125 of the controller 120, by a block of software or instructions stored in the memory 130 and executed by the electronic processor 125, or a combination thereof. The motor drive circuit 110 is further illustrated as including a stator drive circuit 205 and a rotor drive circuit 210. The motor 115 is illustrated as a WFS motor having a three-phase stator with phases (A, B, C) and a rotor field winding (R), and the motor system 900 is primarily described with respect to a WFS motor. However, in other examples, the motor 115 is a permanent magnet synchronous motor, a hybrid synchronous motor, or another motor type. When the motor 115 is a permanent magnet synchronous motor, the rotor field winding (R) is not included in the motor 115 and, accordingly, the rotor drive circuit 210 may not be included, the motor controller 120 may not sense or control current through the rotor field winding (R), and the control blocks of the motor controller 120 may not receive, process, or generate rotor field components.

In contrast to FIG. 2, the motor system 900 of FIG. 9A includes an MPLPT function block 905, which may be implemented as a piecewise affine map that maps an input desired control parameter (e.g., motor torque (T*)) to target current values $i^*_{r,dq}$, as described in further detail below. Further, the current-to-flux linkage maps 910 and 915 may be implemented as piecewise affine maps as described above with respect to FIG. 2, or may be implemented through other mapping functions (e.g., lookup tables, real-time executed functions, etc.). Further still, in some embodiments, the functional blocks or maps 905 and 910 may be combined into a single piecewise affine map that maps an input desired control parameter (e.g., motor torque (T*)) to target flux linkage values $\lambda^*_{r,dq}$.

Additionally, in some embodiments, the flux controller 240 within the controller 120 may implement current-based motor control, rather than flux linkage-based control as illustrated in FIG. 9A. For example, the current-to-flux linkage maps 910 and 915 may not be present in the controller 120, and the target current values $i^*_{r,dq}$ and measured current values $i_{r,dq}$ may be provided to the difference calculation block 235 of the controller 120. The difference calculation block 235 of the controller 120 may then provide difference values indicating the differences between the target current values $i^*_{r,dq}$ and measured current values $i_{r,dq}$ to the current-based controller block that is provided in place of the flux controller block shown in FIG. 9A. Like the flux controller 240, the current-based controller block may be, for example a proportional integral derivative (PID) controller, a PI controller, a lookup table, or another control device. Whether flux-based or current-based, the controller block (and, thus, the motor controller 120) may then generate a voltage command for each dimension of the set of dimensions of the rotational reference frame based on the received difference values and the rotational position of the motor (θ). For example, the flux controller 240 may output voltage commands $V_f$, $V_d$, and $V_q$ (also referred to collectively as $V_{f,dq}$ or $V_{r,dq}$). The voltage commands may then be used to control the motor similar to as described above with respect to FIG. 2 (e.g., via inverse Clark-Park transform block 245, PWM generation block 250, and motor drive circuit 110).

Figure 9B:
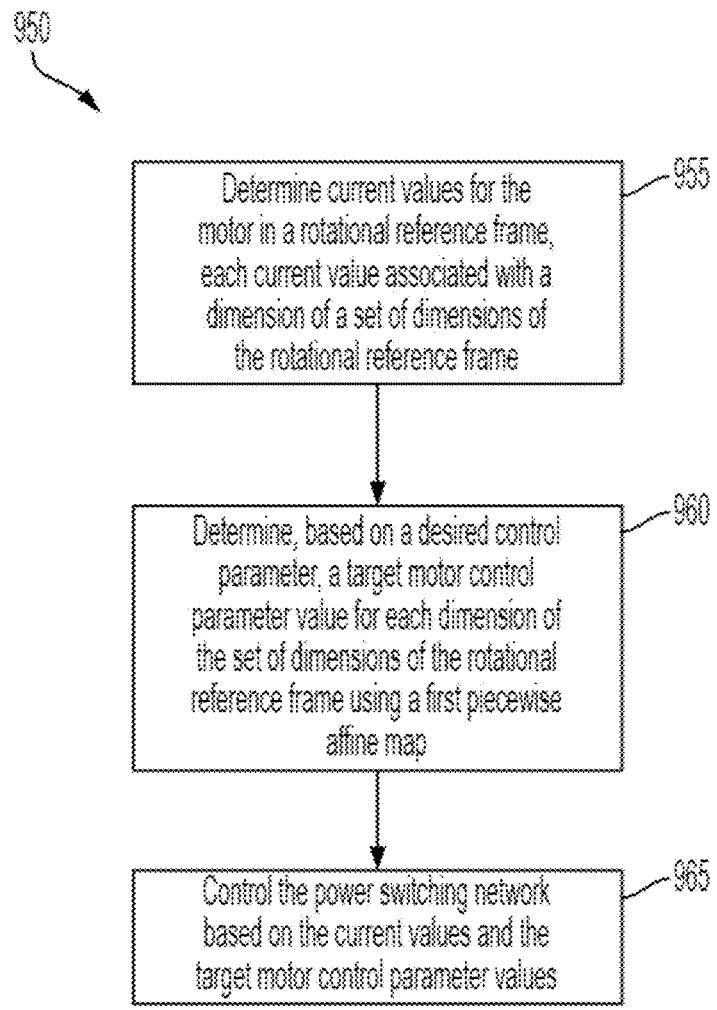
FIG. 9B illustrates a process for implementing MPLPT motor control using a piecewise affine model according to some embodiments.

FIG. 9B illustrates a process 950 for implementing MPLPT motor control using a piecewise affine model. The process 950 is described as being carried out by the motor system 900 of FIG. 9A. However, in some embodiments, the process 950 may be implemented by another motor system, for example, the motor system 100, 1600, or 1800. Additionally, although the blocks of the process 950 are illustrated in a particular order, in some embodiments, one or more of the blocks may be executed partially or entirely in parallel, may be executed in a different order than illustrated in FIG. 9B, or may be bypassed.

In block 955, the motor controller 120 determines current values for the motor 115 in a rotational reference frame, such as the RDQN reference frame or the. Each current value is associated with a dimension (or axis) of a set of dimensions of the RDQN reference frame. Here, the set of dimensions includes the R (or field (f)), D, and Q dimensions (e.g., $i_f$, $i_d$, $i_q$, also referenced as $i_{f,dq}$). As used herein, the variables F, f, R, and r are used interchangeably to refer to rotor field characteristics. For example, rotor field current may be expressed as $i_r$ or as if, and rotor field flux linkage may be expressed as $\lambda_r$ or as $\lambda_f$.

For example, to implement block 955, the motor controller 120 may determine electrical operational characteristics of the motor 115 in a stationary reference frame; determine a rotational position of the motor 115 (e.g., of the rotor of the motor 115); and transform the electrical operational characteristics and the rotational position to the current values for the motor 115 in the rotational reference frame. For example, to determine the electrical operational characteristics of the motor 115 in the stationary reference frame and the rotational position of the rotor, the controller 120 may receive current measurements from current sensors 255 configured to sense current of each phase of the stator windings (e.g., $i_a$, $i_b$, $i_c$, also collectively referred to as $i_{abc}$) and current of the rotor winding(s) (e.g., if, sometimes referred to as $i_r$) of the motor 115. The controller 120 may also receive rotational position measurements (θ) from a rotational position sensor 260 configured to measure the rotational position of the rotor. In some examples, the controller 120 may determine current and rotational motor position using other techniques. For example, the controller 120 may use a "sensorless" design to determine the rotor position, for example, by inferring rotor position by detecting zero-crossings, peaks, and/or valleys of back electromotive force (emf) signals on the stator windings. Further, the controller 120 may calculate the current values from voltage measurements on the stator windings and/or rotor winding(s) provided by voltage sensors. To transform the electrical operational characteristics and the rotational position to the current values for the motor in the rotational reference frame, the motor controller 120 may perform, via Clark-Park transform block 215, a Clark-Park transform on the determined current $i_{abc}$ and rotational position (θ) of the motor 115.

In block 960, the motor controller 120 determines, based on a desired control parameter, a target motor control parameter value for each dimension of the set of dimensions of the rotational reference frame using a first piecewise affine map. For example, the motor controller 120 may receive the desired control parameter in the form of an input command or reference value, which may be indicate a desired motor torque value (T*). The desired control parameter may be retrieved from a memory (e.g., the memory 130) or received via an input/output device of the motor controller 120 (e.g., from a user operating a keyboard, pushbutton, level, dial, etc.).

The motor controller 120 may then apply the MPLPT function block 905 to the desired control parameter. For example, the MPLPT function block 905 may implement a piecewise affine (PWA) map that maps an input desired control parameter (e.g., motor reference torque (T*)) to target current values $i^*_{r,dq}$, as described in further detail below. Alternatively, in some embodiments, the functional blocks or maps 905 and 910 may be combined into a single piecewise affine map that maps, according to MPLPT, an input desired control parameter (e.g., reference torque (T*)) to target flux linkage values $a^*_{r,dq}$. Additional detail describing the generation of the MPLPT function block 905 and its PWA map is provided below.

To determine the target motor control parameter value (e.g., $i^*_{r,dq}$) based on the desired control parameter (e.g., reference torque (T*)) using the PWA map of the MPLPT function block 905, the motor controller 120 may use the PWA map in a similar manner as described above with respect to PWA maps 220, 225 to translate an input to the output. More particularly, to use the PWA map of the MPLPT function block 905, the motor controller 120 may identify a first domain corresponding to the desired control parameter (e.g., reference torque (T*)) selected from a plurality of domains of the PWA map, where the first domain is associated with a first affine function of the plurality of affine functions of the PWA map. Then, the motor controller 120 may apply the desired control parameter (e.g., reference torque (T*)) to the first affine function to determine the target motor control parameter value for each dimension of the set of dimensions of the rotational reference frame. For example, as described in further detail below, the PWA map of the MPLPT function block 905 may be defined as $h_{PWA}(T_p)$, where each function of the PWA map takes the form $m_j T_p + i_j$. Accordingly, once the particular affine function of the PWA map is identified, the motor controller 120 may plug the reference torque (T*) into the identified function and solved to generate the target motor control parameter value.

In some examples, the output current value of the MPLPT function block 905 is an intermediate target motor control parameter value that is then further translated to a (final) target motor control parameter value by the current-to-flux linkage map 910. In other examples, such as where the controller 240 of FIG. 9A is a current-based controller rather than a flux-based controller, or where the MPLPT function block 905 is configured to map reference torque (T*) directly to a target flux value (λ*), the output current value of the MPLPT function block 905 is the (final) target motor control parameter value.

In block 965, the motor controller 120 controls the power switching network based on the current values and the target motor control parameter values. For example, the motor controller 120 may generate control signals in the stationary reference frame to drive the motor 115 based on a difference between the target motor control parameter value (e.g., flux linkage value output by block 910) and the flux linkage value for each dimension (e.g., output by the block 915). For example, the motor controller 120 may, using the difference block 235, determine a difference between each flux linkage value and target flux linkage value for each respective dimension of the set of dimensions of rotational reference frame (e.g., R, D, and Q dimensions, optionally Null dimension). This difference value and the rotational position of the motor (θ) may be provided to the flux controller 240. The flux controller 240 may be, for example, a proportional integral derivative (PID) controller, a proportional integral (PI) controller, a lookup table, a model-based controller (e.g., implementing model predictive control (MPC), as described in further detail below), or another control device. The motor controller 120 (e.g., via the flux controller 240) may then generate a voltage command for each dimension of the set of dimensions of the rotational reference frame based on the difference value and the rotational position. For example, the flux controller 240 may output voltage commands $V_f$, $V_d$, and $V_q$ (also referred to collectively as $V_{f,dq}$).

The motor controller 120 may then transform the voltage commands from the rotational reference frame to the stationary reference frame. For example, the motor controller 120, using the inverse Clark-Park transform block 245, may perform an inverse Clark-Park transform on the voltage commands $V_{f,dq}$ to generate voltage commands $V_f$, $V_a$, $V_b$, and $V_c$ (also referred to collectively as $V_{f,abc}$) in the stationary reference frame.

The motor controller 120 may then, using PWM generation block 250, generate a pulse width modulated control signal for each dimension of the stationary reference frame to control the power switching network to drive a stator of the motor. For example, the PWM generation block 250 may implement, and the motor controller 120 may access, respective lookup tables for each of the stator phases and the rotor field winding, where the motor controller 120 provides a voltage command to the respective lookup tables of the PWM generation block 250 (e.g., $V_a$ to the lookup table for stator phase A, $V_b$ to the lookup table for stator phase B, $V_c$ to the lookup table for stator phase C, and $V_f$ to the lookup table for the rotor field winding). The PWM generation block 250, via the lookup tables, may return control signal parameters (e.g., a duty cycle) for each stator phase and the rotor field winding.

Ultimately, then, as part of block 965, the motor controller 120 may provide control signals to the drive circuit 110 including stator drive control signals $D_a$, $D_b$, $D_c$ (also collectively referred to as $D_{abc}$) and rotor drive control signals $D_f$ (sometimes referred to as $D_r$) in accordance with the control signal parameters (e.g., at the particular duty cycles indicated by the voltage commands). These control signals may be applied to control terminals of power switching elements of the stator drive circuit 205 and rotor drive circuit 210 of the motor drive circuit 110. For example, the control signals $D_{abc}$ may be provided to the stator drive circuit 205 to control the power switching elements thereof, and the control signal $D_f$ may be provided to the rotor drive circuit 210 to control the power switching elements thereof.

When in a motor operational mode, based on the control signals, the motor drive circuit 110 is controlled to apply power from the power supply 105 to the motor 115 to drive rotation of the motor 115. Similarly, when in a generator operational mode, based on the control signals, the motor drive circuit 110 is controlled to apply electric power from the motor 115 to the power supply 105 (e.g., to charge the power supply) and/or to another electrical load.

MPLPT Problem Statement

As noted, the MPLPT block 905 targets minimizing losses $\pi_l(i, \lambda)$, which may include the sum of winding (copper) losses $\pi_{lc}(i, \lambda)$ and core losses $\pi_{lcr}(i, \lambda)$, for a given reference torque T*, or may focus on minimizing copper loss (e.g., when core loss as less impactful or negligible, such as when the machine operates below a base speed and has little to no field weakening). The output of the MPLPT block 905 may a reference current i* (as shown in FIG. 9A) and/or a reference flux λ*. The winding losses may be defined as $\pi_{lc}(i, \lambda) \approx i^T R i$, and the core losses may be defined as $\pi_{lcr}(i, \lambda) \approx \omega^2 \lambda^T G \lambda$, where i is current, λ is flux, T is torque, R is a matrix defining winding resistance that approximates DC and (skin effect and proximity effect) AC winding losses, and G is a matrix that defines the core conductance that approximates (eddy current and hysteresis effect) core losses. The problem solved by the MPLPT block 905 (the MPLPT Equation) may be stated as follows: for a torque reference T*, the MPLPT reference current i* and reference flux λ* are, and presuming copper losses being dominant over core losses:

$$[i^*, \lambda^*] = \mathrm{argmin}_{i \in \mathcal{J}, \lambda \in \Lambda, \bar{v} \in V} \pi_{lc}(i, \lambda),$$

$$\textit{subj. to } f(\lambda, \bar{v}) = \lambda,$$

$$g(\lambda) = i$$

$$\tau_p(i, \lambda) = T_p^*$$

where the electrical losses $\pi_{lc}(i, \lambda)$ is the objective function being minimized (as noted, in other examples, the objective function being minimized may more generally be the losses $\pi_l(i, \lambda)$), subject to constraints: $f(\lambda, \bar{v})=\lambda$, $g(\lambda)=i$, and $\tau(i, \lambda)=T_p^*$. Here, $f(\lambda, \bar{v})=\lambda$ may define a relationship between flux linkage and voltage for the motor, such as defined by, for example, the following voltage equations for a WFS motor with neutral-point isolated machine (without zero-axis flux and current and without damper windings):

$$\dot{\lambda}_r = v_r - R_r i_r = \bar{v}_r,$$

$$\dot{\lambda}_d = \omega \lambda_q + v_d - R_s i_d = \omega \lambda_q + \bar{v}_d,$$

$$\dot{\lambda}_q = \omega \lambda_d + v_q - R_s i_q = -\omega \lambda_d + \bar{v}_q$$

Additionally, $g(\lambda)=i$ may define a current-flux relationship for the motor, such as defined by, for example, a current-flux map $\phi(\cdot)$, which may be obtained with finite element analysis (FEA) or experimental measurements. An equation that may be used for relating current to flux linkage in an WFS motor without saturation has the form $\lambda = Li + \psi$, where L is the inductance matrix and $\psi$ is the flux-offset vector:

$$L = \begin{bmatrix} L_{rr} & L_{rd} & L_{rq} \\ L_{dr} & L_{dd} & L_{dq} \\ L_{qr} & L_{qd} & L_{qq} \end{bmatrix}, \psi_{rdq} = \begin{bmatrix} \psi_r \\ \psi_d \\ \psi_q \end{bmatrix}.$$

Finally, $\tau(i, \lambda)=T_p^*$ constrains the quadratic torque function to the specific reference torque of interest $T_p^*$.

The solution set for all $T_p^* \in T$, where T is the set of allowable machine torques, will be sets of currents $\underline{\mathcal{J}}$, fluxes $\underline{\Lambda}$, torques $\underline{\mathcal{T}}$, and power losses $\underline{\mathcal{P}}$, where:

$$\underline{\mathcal{J}} = \{i^* \in \mathcal{J}, \text{ s.t. } \textit{MPLPT Equation}\} \in \mathbb{R}^3$$

$$\underline{\Lambda} = \{i^* \in \Lambda, \text{ s.t. } \textit{MPLPT Equation}\} \in \mathbb{R}^3$$

$$\underline{\mathcal{T}} = \{i^* \in \mathcal{T}, \text{ s.t. } \textit{MPLPT Equation}\} \in \mathbb{R}$$

$$\underline{\mathcal{P}} = \{i^* \in \mathcal{P}, \text{ s.t. } \textit{MPLPT Equation}\} \in \mathbb{R}$$

which can be combined as:

$$\Gamma = \{\underline{\mathcal{T}}, \underline{\mathcal{P}}, \underline{\mathcal{J}}, \underline{\Lambda}\} \in \mathbb{R}^8$$

This optimization problem is difficult to solve due to the functions $\pi_{lc}(i, \lambda)$, $\tau_p(i, \lambda)$ and state space model equations $f(\lambda, \bar{v})$, $g(\lambda)=i$. Thus, there is no analytical solution for $\Gamma$.

This formulation already accounts for saturation and cross saturation inside the machine because the datapoints include i and λ together. Therefore, changes in inductance L throughout the machine are also modelled. Another dimension that can be added to the data set is a variable resistance matrix R, either by experimental measurements or FEA-analysis. If the diagonal terms in the matrix R increase at the same rate with temperature, then the solution set $\underline{\Gamma}$ may stay unchanged, however, the losses may be higher.

MPLPT Quantitative Solution

In this section, a quantitative solution to the MPLPT problem is provided that assumes low speed operation of the motor 115. In these conditions, the copper loss is dominant, relative to the winding loss, and the machine operates below base speed (i.e., with no field weakening).

Taking a large sample of random experimental or simulated datapoints can yield an approximate solution to equation MPLPT optimization problem noted above (i.e., [i*, λ*]=arg min $\pi_{lc}$(i, λ), subject to the noted constraints). FEA-simulated data points will have a current i and flux λ, while experimental data points will have a known current i and an approximated flux λ using flux-linkage map approximations, e.g., via current-flux map φ(•). These points can be directly mapped to a torque per pole pair $T_p$ and powerloss $P_l$ using τ(i, λ) and $p_l$(i, λ), or to a torque per pole pair $T_p$ and copper loss $\pi_{lc}$(i, λ) using $\tau_p$(i, λ)=τ(i, λ)/p=$i^T J \lambda$, and $\pi_{lc}$(i, λ)≈$i^T R i$.

The set of all experimental datapoints is denoted:

$$\Gamma = \{\mathcal{T}, \mathcal{P}, \mathcal{J}, \Lambda\} \in \mathbb{R}^8$$

where a single point $\Gamma_j$ has four components (torque per pole pair, power loss, current, flux,). The value of each component for each point can be denoted $\Gamma_{j,k}$ where j is the component and k is the index of the value. For example, $\Gamma_{1,1}$ is the torque of the first data point. The set of just one component, say torque, for all points can be denoted $\Gamma_{1,k}$, while the collection of all components for one value, say the first value, can be denoted $\Gamma_{j,1}$.

The datapoints can be plotted according to their power loss, $\Gamma_{2,k}$, and inverse torque, $\Gamma_{1,k}^{-1}$, against $\underline{\Gamma}$ to see which points are the most optimal.

From the set of all datapoints, there will be pareto-optimal, or efficient, values. That is, there is some subset of all values that are the most efficient for a given neighborhood. This subset, and neighborhood for each member of the subset, may be determined as a pareto front, or "pareto-optimal," defined as a value in that cannot further decrease $\Gamma_{1,k}^{-1}$, without increasing $\Gamma_{2,k}$, or vice-versa. The set of all pareto-optimal points is called a pareto frontier. The pareto frontier for a WFS motor can be denoted $\Gamma_p$. The points in the pareto frontier will all have unique torques. The pareto frontier points $\Gamma_p$ produced by this method can be considered candidate points for a general MPLPT function that will exist in three-dimensional current space 3.

A line connecting all pareto-optimal points is not necessarily convex. Accordingly, a new set $\Gamma_c$ is defined as the largest subset of pareto-optimal points that creates a convex, piecewise linear function when line segments are added between the points.

The point $\Gamma_{j,x}$ that corresponds to minimum torque $T_{p,min} \in T_p$ will always be in $\Gamma_c$ because the minimum torque point occurs at zero losses, and no point can have negative losses. Furthermore, the point $\Gamma_{j,x}$ corresponding to maximum torque $T_{p,max} \in T_p$ will also always be in this set as no point can have higher torque, regardless of losses.

The curvature of the collection of lines connecting all adjacent $\Gamma_c$ points in the three-dimensional current space ($\mathcal{J}$) is not necessarily convex. A new set $\Gamma_{cc}$, is defined as the largest subset of $\Gamma_c$ points that creates a convex, piecewise linear function when line segments are created between the points and grouped in the current space. The cc denotes that the piecewise linear function created is convex in the two-dimensional ($\Gamma_{1,k}^{-1}$, $\Gamma_{2,k} \in \mathbb{R}^2$) space, and three-dimensional ($\Gamma_{3,k} \in \mathcal{J} \in \mathbb{R}^3$) space. By these definitions $\underline{\Gamma} \subseteq \Gamma_p \subseteq \Gamma_c \subseteq \Gamma_{cc}$.

Figure 10A:
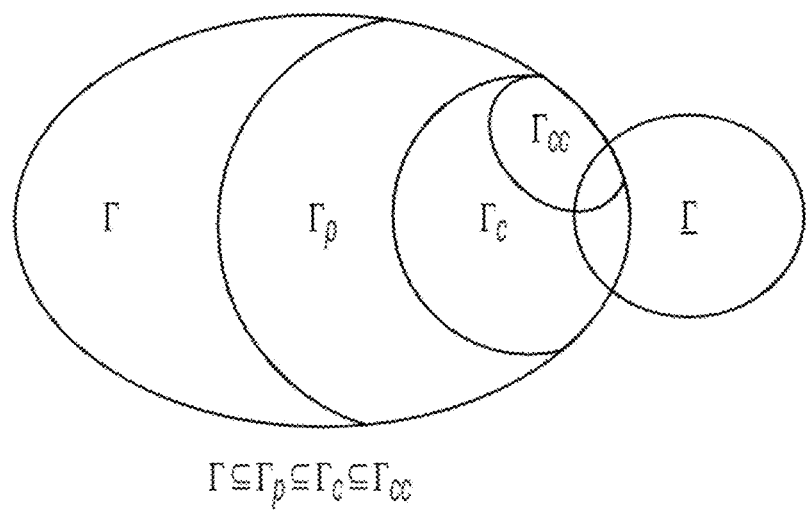
FIG. 10A illustrates relationships between sets of datapoints that may be considered for use in generation of a MPLPT control scheme according to some embodiments.
Figure 10B:
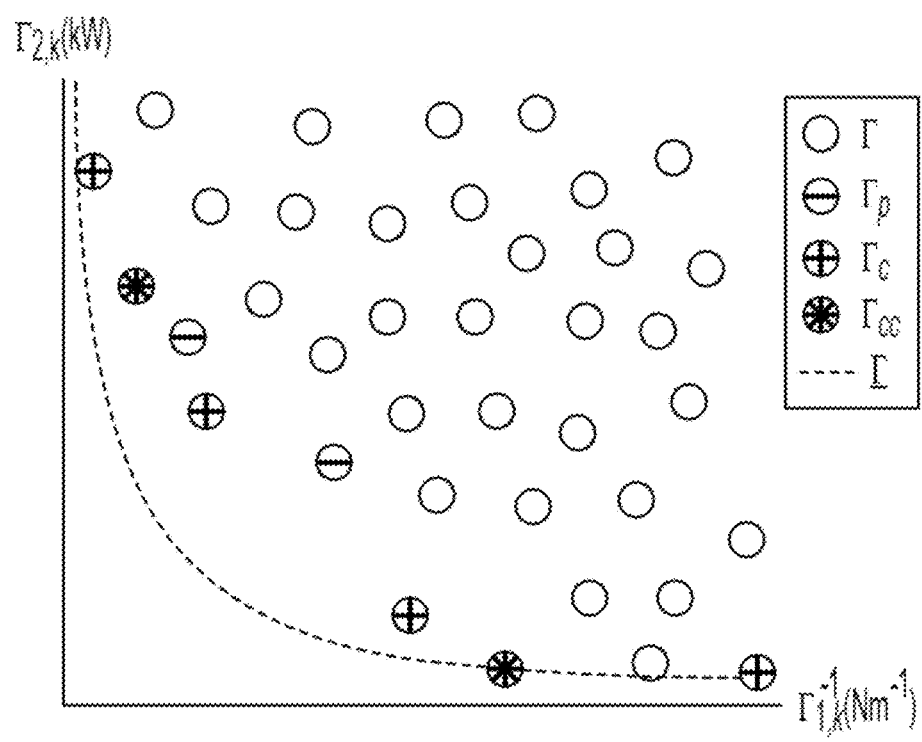
FIG. 10B illustrates examples points of the sets of datapoints of FIG. 10A according to some embodiments.

Because points in $\underline{\Gamma}$ are MPLPT optimal and $\Gamma_c$ are not, the losses for a point in $\Gamma_c$ will always be greater than or equal to the losses in $\underline{\Gamma}$ with the same torque. So $\Gamma_c$ may contain points in $\underline{\Gamma}$, or $\Gamma_c \cap \underline{\Gamma} \neq \emptyset$. The relationships between the sets $\underline{\Gamma}$, $\Gamma_p$, $\Gamma_c$, $\Gamma_{cc}$ and $\underline{\Gamma}$ are shown in FIG. 10A, and example points of the sets are shown in FIG. 10B on axes of power loss $\Gamma_{2,k}$ and inverse torque $\Gamma_{1,k}^{-1}$.

Connecting convex pareto-optimal points $\Gamma_c$ with line segments produces torque and powerloss trajectories that are more optimal than using any interior pareto-optimal points. Connecting points in $\Gamma_{cc}$, with line segments produces torque and powerloss trajectories that are less optimal than using any interior pareto-optimal points. Connecting pareto-optimal points using straight line segments is an approximation that is valid for densely sampled points. In some examples, adjacent points in $\Gamma_c$ are within a minimum ϵ Euclidean distance of each other to be considered close enough to approximate a line between them. If two points are not close enough to meet this requirement, more points are simulated or measured.

Generating a convex pareto frontier can be obtained using a modified divide and conquer algorithm for a set of solutions, and repeated to obtain $\Gamma_{cc}$. Linking line segments created using $\Gamma_p$, $\Gamma_c$, and $\Gamma_{cc}$, in two-dimensional ($\Gamma_{1,k}^{-1}$, $\Gamma_{2,k} \in \mathbb{R}^2$) space to three-dimensional ($\Gamma_{3,k} \in \mathbb{R}^3$) current space can be modelled using a piecewise affine map. Each set may have unique properties.

The above description is just one technique for selecting significant datapoints as a subset of all datapoints. In other examples, other techniques are used to perform such subset identification. Regardless of the selection algorithm, a PWA, or equivalent mapping technique, can be constructed from the resulting subset.

Piecewise Affine Map (PWA) for MPLPT

In some examples, a piecewise-affine (PWA) map or function is used to express an approximate MPLPT solution path. PWA maps divide a nonlinear map into M domains over which the function may be linearized. The torque domain $\Gamma_{1,k}$ is partitioned into torque regions $T_j$, but can equivalently be partitioned into powerloss regions. Moving forward, points in this space are interchangeably described as torques $T_{p,k}$ or $\Gamma_{1,k}$ values equivalently. Similarly, the current domain $\Gamma_{3,k}$ will be partitioned into current regions $I_j$, and currents can be described by $i_k$ or $\Gamma_{3,k}$. Hence, we express the PWA torque-to-current map, or MPLPT function, $h(T_p)$ as:

$$i = h(T_p) \approx h_{PWA}(T_p) = \begin{cases} m_1 T_p + i_1, & T_p \in \mathcal{T}_1, \\ m_2 T_p + i_2, & T_p \in \mathcal{T}_2, \\ \ldots \\ m_M T_p + i_M, & T_p \in \mathcal{T}_M, \end{cases}$$

where $i = m_j T_p + i_j$ is the affine equation that maps torques-powerloss points $T \in T_j$ onto current points $I \in I_j$ and $I_j$ is the image of the domain $T_j$. The torque simplices cover the full range of machine torques, or $T_1 \cup T_2, \ldots T_M = T$. The affine map is defined by the three-dimensional current slope and a current offset. This is seen on the left plot of FIG. 11. The points used to create h(T) can be from the sets $\Gamma_p$, $\Gamma_c$, or $\Gamma_{cc}$, defined above, and may be denoted $h_p(T)$, $h_c(T)$, and $h_{cc}(T)$, respectively. The process of using the points to create h(T) is described next.

Figure 11:
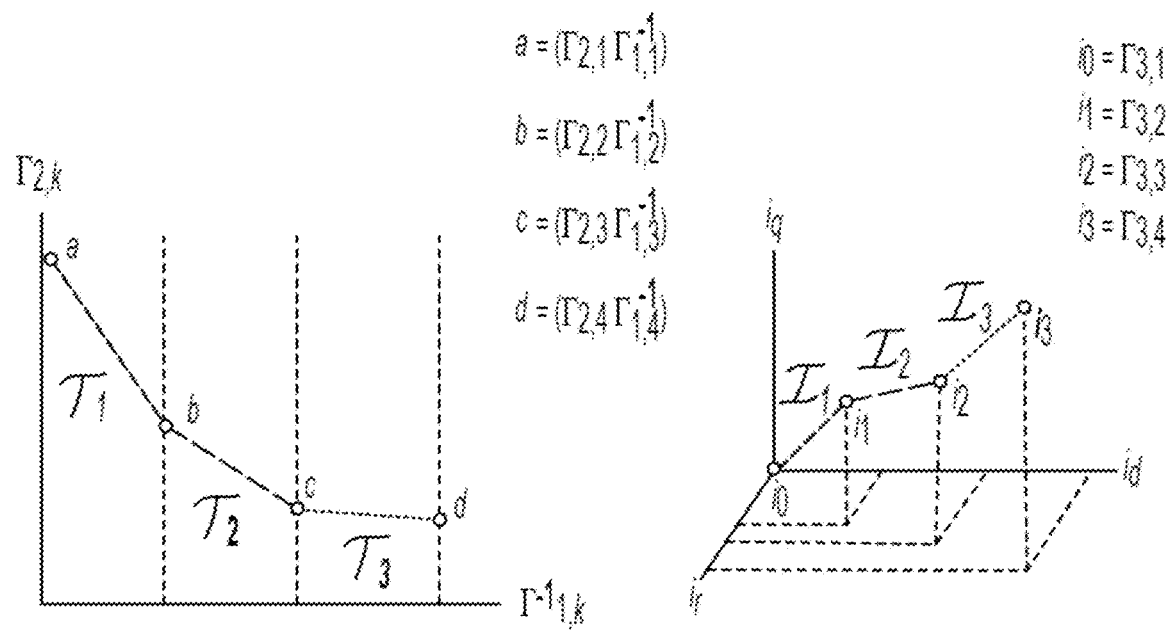
FIG. 11 illustrates three-dimensional current slope and current offset for an affine map according to some embodiments.

As previously noted, PWA maps divide the original domain into M sets. Each subset is defined to be a simplex, which is the simplest possible polytope in any D-dimensional space and a line segment in the single dimension of the given problem. A D-dimensional simplex can be defined as the convex hull of its D+1 vertices (called the V-notation); alternatively, a simplex can be defined by its by its faces defined as affine inequalities, called the H-notation:

$$\mathcal{T}_j = \mathcal{H}(\{T_{j_0}, T_{j_1}\})$$

where $T_{j0}, T_{j1} \in \mathcal{T}$. Each torque simplex $\mathcal{T}_j$ forms a domain of an affine map that maps into the current simplex:

$$\mathcal{J}_j = \mathcal{H}(\{i_{j_0}, i_{j_1}\})$$

where $i_{j0}, i_{j1} \in \mathcal{J}$. The general position of the defining set of measurement points (convex) implies that the vertices of each simplex are linearly independent and full dimension (not degenerate). Example simplices that are linked in both spaces are shown in FIG. 11. Each line segment $\mathcal{T}$ is defined by two vertices, where one vertex $T_{j0}$ is a support vector such that the origin can be moved $\bar{T} = T - T_{j_o}$.

Figure 12:
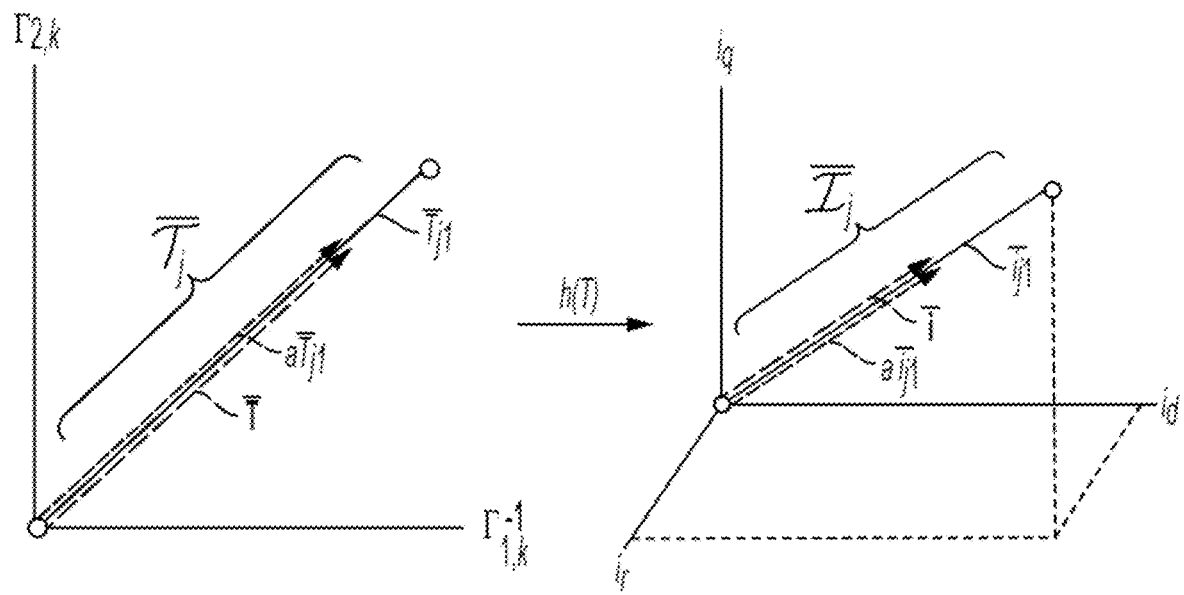
FIG. 12 illustrates a simplices and a shift of origin according to some embodiments.

In the shifted dimension, the simplex is defined by $$\bar{\mathcal{T}}_j = \mathcal{H}(\{0, \bar{T}_{j_1}\}),$$

where $\bar{T}_{j1} = T_{j1} - T_{jo}$, where $\bar{T}_{j1}$ spans the simplex. Furthermore, the current space is shifted in the same way, $\bar{\imath} = i - i_{j_o}$ that results in the simplex $$\bar{\mathcal{J}}_j = \mathcal{H}(\{0, \bar{\imath}_{j_1}\}),$$

where $\bar{\imath}_{j1} = i_{j1} - i_{jo}$, where $\bar{\imath}_{j1}$ spans the simplex. The D=1 simplices and the shift of origin are illustrated in FIG. 12.

The nonzero vertices can be interpreted as a basis and since an affine map is an isomorphism, the relative position of a vector in the current and flux simplex is the same:

$$\bar{T} = a\bar{T}_{j_1}.$$

The a coefficient can be obtained similar to how space vector modulation (SVM) computes relative on-times. Also, $\bar{T}$ is projected onto the basis of $\bar{T}_j$ $$p_j = \text{proj}_{\bar{T}_{j_1}} \bar{T} = \frac{\bar{T}_{j_1} \cdot \bar{T}}{\|\bar{T}_{j_1}\|},$$

A relative length of the vector is obtained by dividing the magnitude of the projection with the magnitude of the basis vector:

$$a = \frac{\|p_j\|}{\|\bar{T}_{j_1}\|}.$$

To find the current vector $\bar{\imath}$, a is multiplied with the basis vector of $\bar{\imath}_j, \bar{\imath}_{j1}$:

$$\bar{\imath} = a\bar{\imath}_{j_1}.$$

The a coefficients in these equations can be set to equal, resulting in:

$$\frac{\bar{T}}{\bar{T}_{j_1}} = \frac{\bar{\imath}}{\bar{\imath}_{j_1}}$$

The, solving for i yields the resulting linear map $$i = m_j T + i_j \text{ where } m_j = \frac{i - i_{j0}}{T_{j1} - T_{j0}} \text{ and } i = i_{j0} - m_j T_{j0}.$$

A visualization of this map is shown in FIG. 12.

Example Experimental Results for MPLPT Control

Experimental results from simulations implementing MPLPT control are described below with respect to an example 65 kW WFS motor with cross-section shown in FIG. 13 and including the following characteristics:

TABLE I

WRSM MOTOR DRIVE PARAMETERS

| Parameter | Value |
|---|---|
| Turns ratio $N_f/N_s$ | 39 |
| Pole pairs | 2 |
| Stator resistance | 11.732 mΩ |
| Rotor resistance (stator referred) | 5.461 mΩ |
| Shaft inertia | 22.76E-3 kg m$^2$ |
| Switching frequency | 10 kHz |
| Sampling frequency | 20 kHz |
| Nameplate r-axis inductance $L_r$ | 1.956 mH |
| Nameplate d-axis inductance $L_d$ | 2.420 mH |
| Nameplate q-axis inductance $L_q$ | 0.789 mH |
| DC-link voltage | 325 V |
| Maximum power | 65 kW |
| Maximum torque | 220 Nm |

Figure 14A:
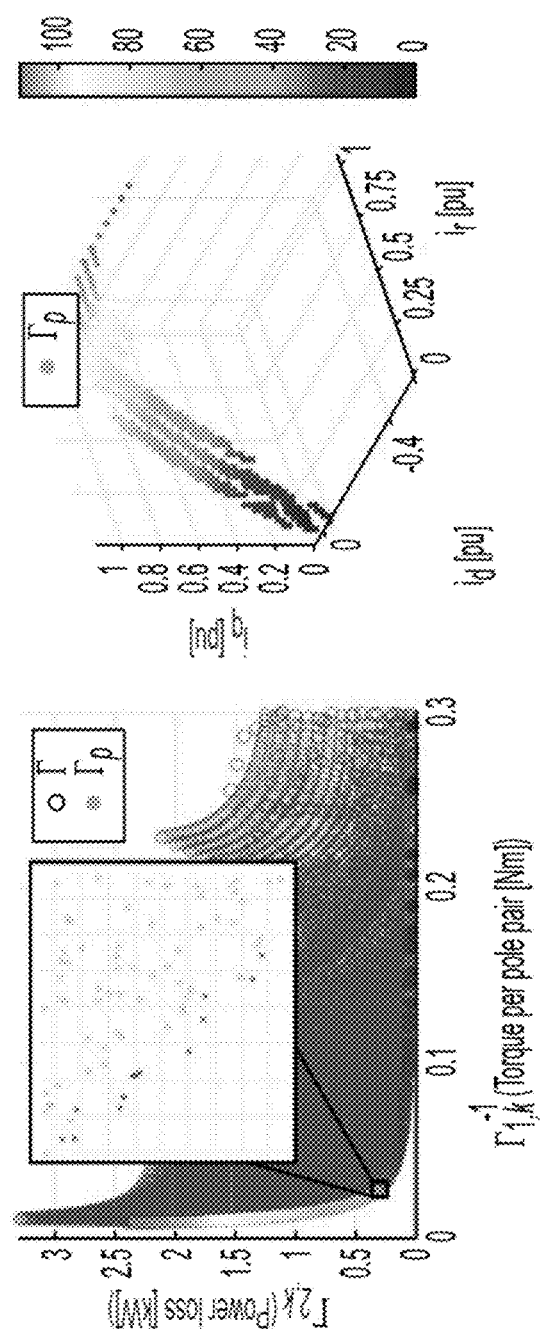
FIG. 14A illustrates a set of points $\Gamma$ and pareto frontier $\Gamma_p$ collected using FEA-simulated data for the WFS motor (left), and the corresponding three-dimensional MPLPT currents that will be candidate points for MPLPT (right) according to some embodiments.

This experimental example is provided with respect to an MPLPT path from the most negative machine torque to the most positive. In this case the motor has a torque range of 0 Nm/p to 112 Nm/p and copper loss range from 0 kW to 3.23 kW. The left graph of FIG. 14A shows the set of points Γ and pareto frontier $\Gamma_p$ collected using FEA-simulated data for the WFS motor, and the right graph of FIG. 14A illustrates the corresponding three-dimensional MPLPT currents that will be candidate points for MPLPT. This example has too many pareto-optimal points $\Gamma_p$ to all be used in a MPLPT path.

Figure 14B:
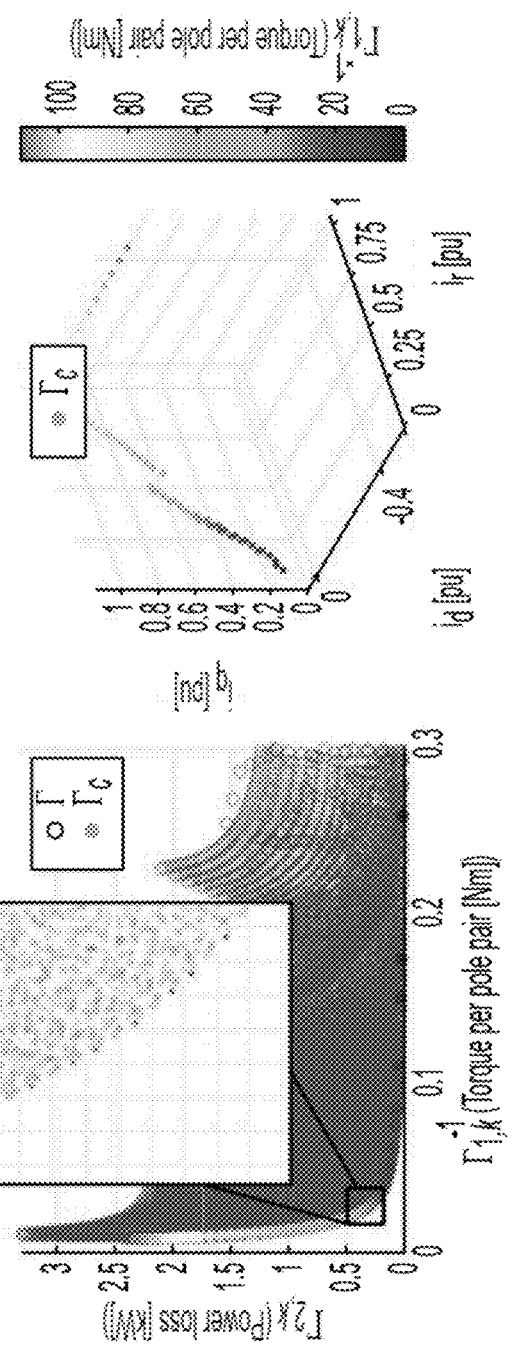
FIG. 14B illustrates simulated points $\Gamma$ and convex pareto-optimal solutions $\Gamma_c$ (left) and the corresponding three-dimensional MPLPT currents that will be used to construct h(T) (right) according to some embodiments.
Figure 14C:
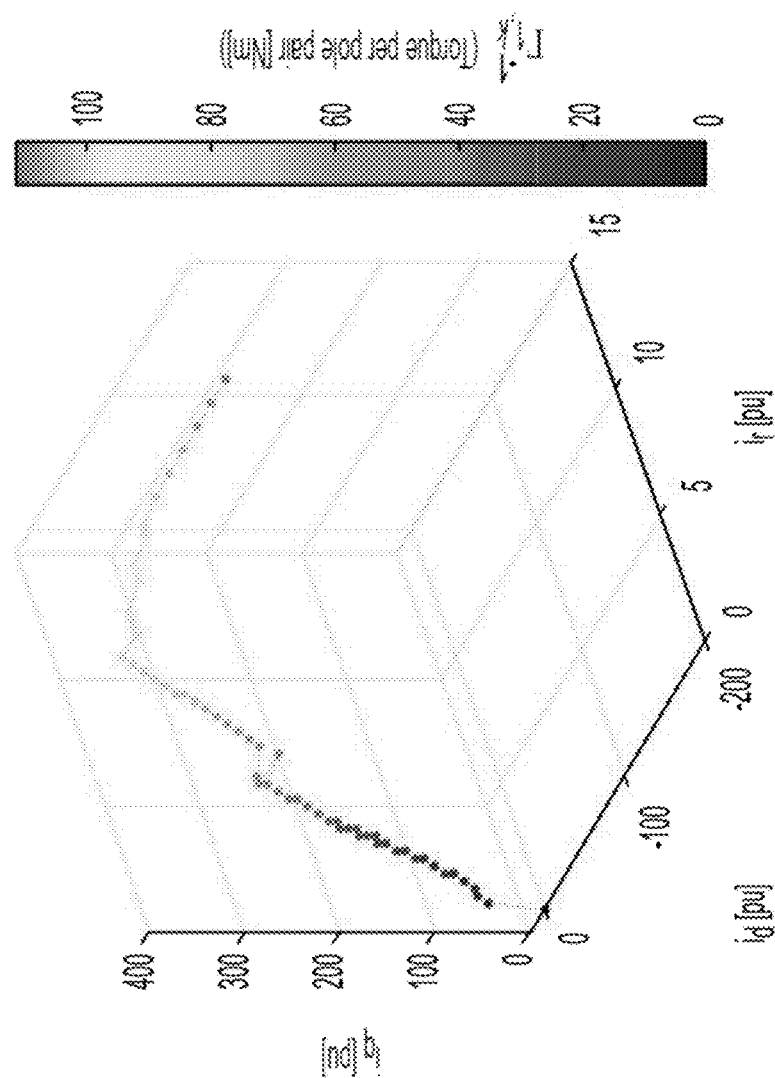
FIG. 14C illustrates a piecewise linear function according to some embodiments.

The resulting pareto-convex points $\Gamma_c$ are shown in FIG. 14B. More particularly, the left graph of FIG. 14B shows the simulated points Γ and convex pareto-optimal solutions $\Gamma_c$, and the right graph of FIG. 14B illustrates the corresponding three-dimensional MPLPT currents that will be used to construct h(T). Applying the PWA map h(T) to the set of pareto-convex points yields the piecewise linear function shown in FIG. 14C. The function h(T) in this case follows an occasionally jagged but mostly smooth curve. The distance between the points varies. There are 60 points in $\Gamma_c$ and 59 line segments that create the PWA map.

Further filtering of points in c or a different way to filter out points in to produce a different h(T) can be implemented to obtain certain qualities in the MPLPT path that can include: convexity, smoothness, and more. Costs can be assigned to the distance between points, angle of adjacent line segments, and other parameters. The selected technique used in this first simulation study strictly minimized power losses for torque without consideration for other potentially desirable qualities of the MPLPT path. But, in other examples, other techniques are used such that other qualities of the MPLPT path are considered.

Figure 13:
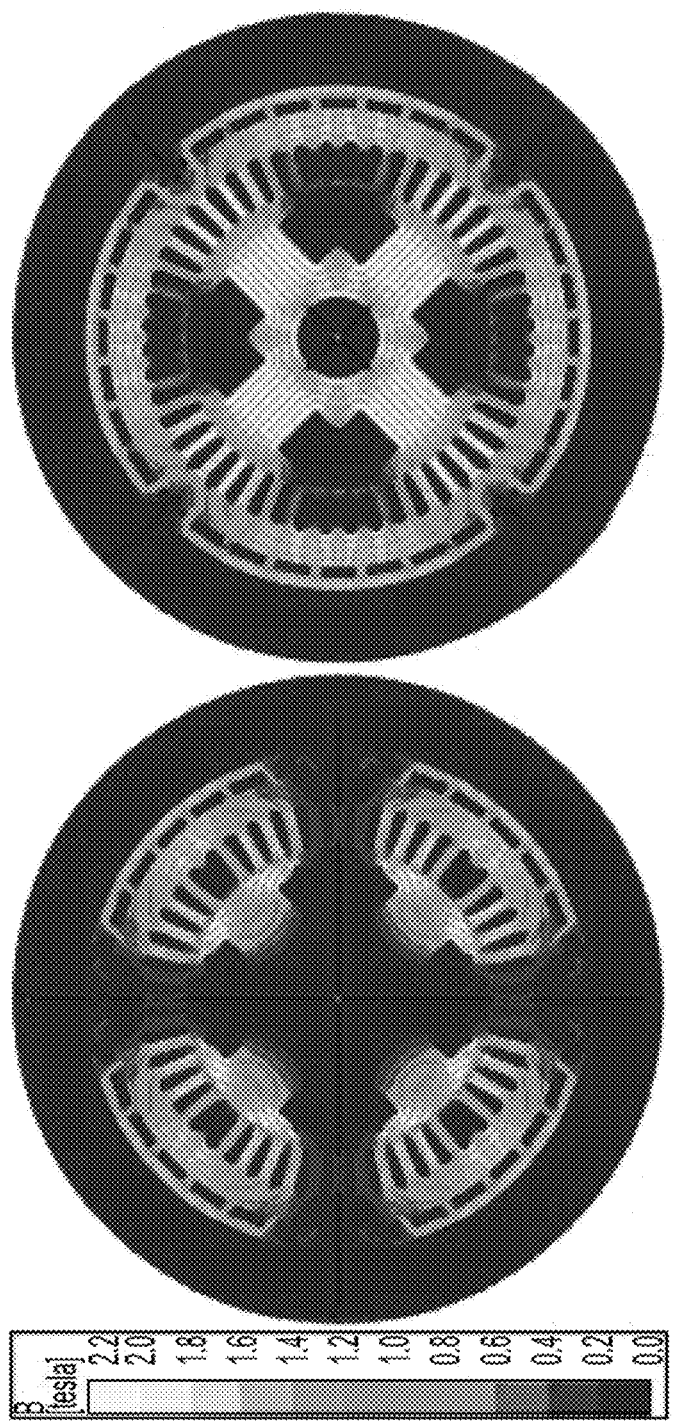
FIG. 13 illustrates a cross-section of a WFS motor used to produce experimental MPLPT control results according to some embodiments.
Figure 15A:
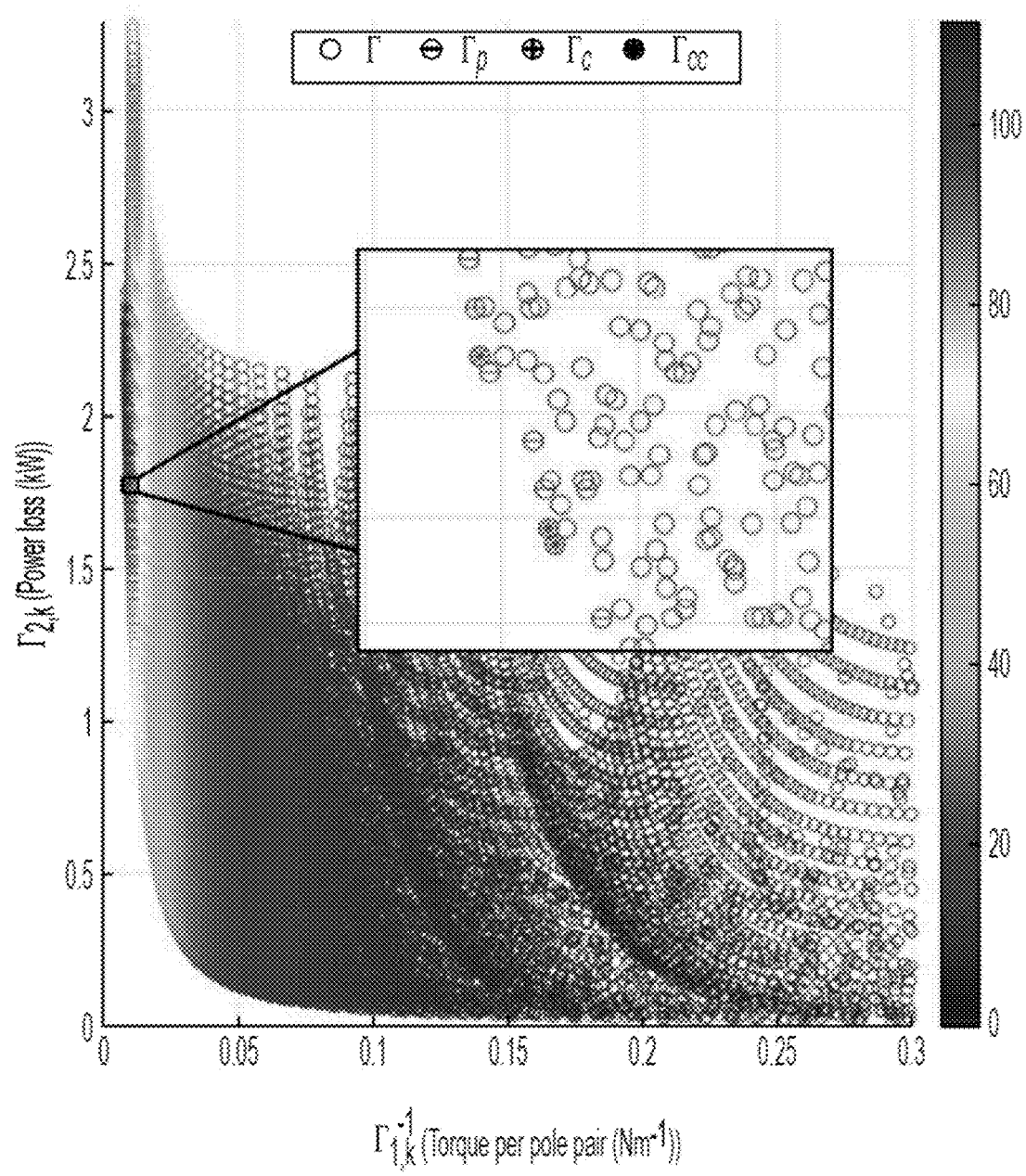
FIG. 15A illustrates simulation results including power-loss versus torque domain FEA-simulated points $\Gamma$ and subsets $\Gamma_p$, $\Gamma_c$, $\Gamma_{cc}$.
Figure 15B:
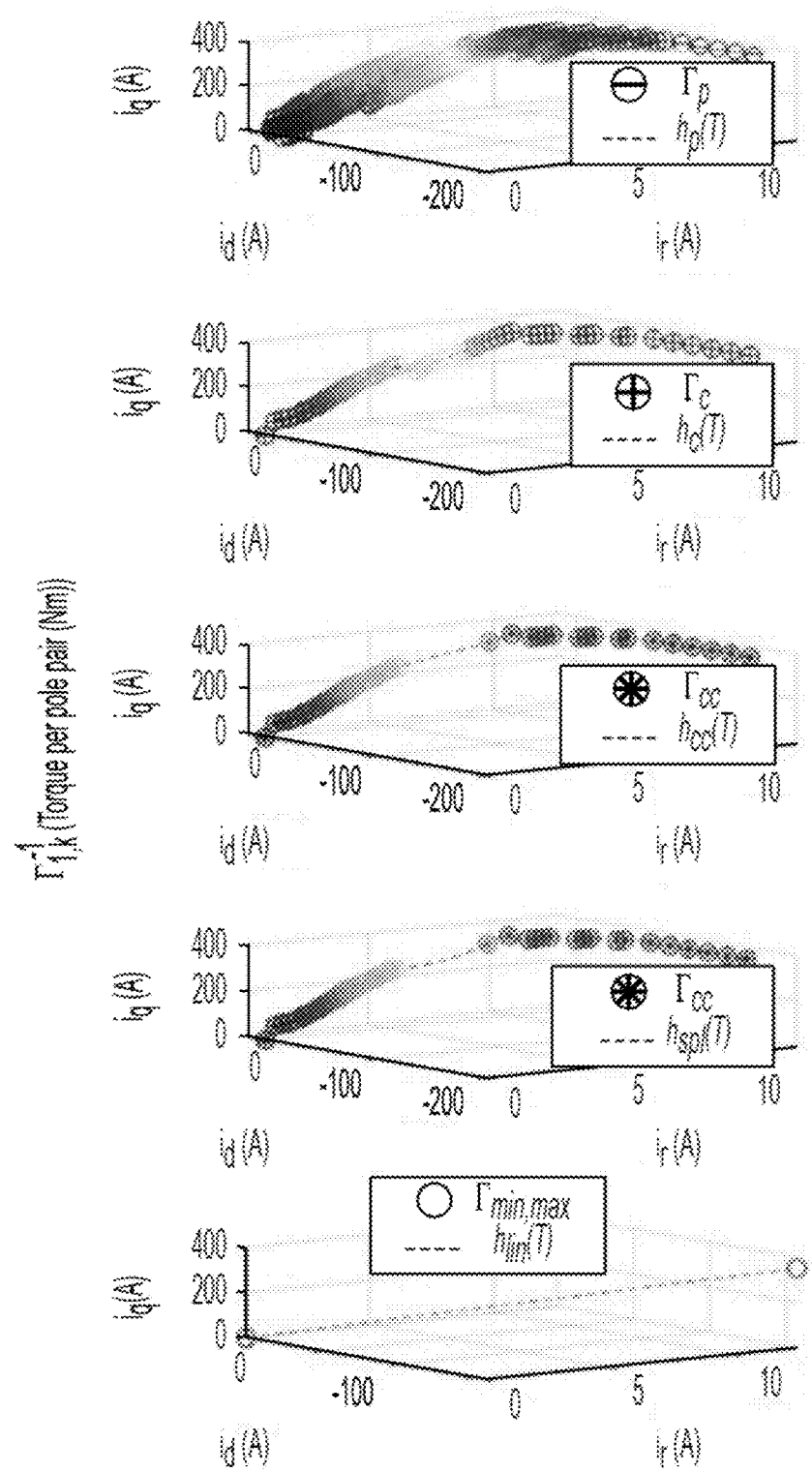
FIG. 15B illustrates simulation results including current domain sets $\Gamma$, $\Gamma_p$, $\Gamma_c$, $\Gamma_{cc}$, and functions $h_p(T_p)$, $h_c(T_p)$, $h_{cc}(T_p)$, $h_{lin}(T_p)$, $h_{spl}(T_p)$.

Additional experimental results from further simulations implementing MPLPT control were performed with the same example 65 kW WFS motor with cross-section shown in FIG. 13. The motor was again modelled computationally using the Finite Element Method (FEM) and analyzed using Finite Element Analysis (FEA) to generate the full set of datapoints $\Gamma$. The sets $\Gamma_p$, $\Gamma_c$, $\Gamma_{cc}$ are then obtained in post processing by the techniques described above. These sets are shown in the two-dimensional $(\Gamma_{1,k}^{-1}, \Gamma_{2,k})$ space in FIG. 15A and three-dimensional $(\Gamma_{3,k})$ space in FIG. 15B. The majority of the points from the FEA analysis are not in these sets. Of the 57,288 generated datapoints the sizes of the sets were $|\Gamma_p|=403$, $|\Gamma_c|=60$, $|\Gamma_{cc}|=47$, or less than 1%. The MTPA functions produced using $\Gamma_p$, $\Gamma_c$, $\Gamma_{cc}$ are evaluated against a 'linear' MTPA ($h_{lin}(T_p)$), which is a linear trajectory between the maximum torque point and the origin (in the current domain), as well as against a cubic spline interpolated MTPA ($h_{spl}(T_p)$), which uses the points in $\Gamma_{cc}$ but they are cubic spline interpolated instead of piecewise affine interpolated.

Further experimentation was also performed using a WFS motor testbench. The motor testbench was configured to operate using the control diagram in FIG. 9A. The five $h(T_p)$ functions (i.e., $h_p(T_p)$, $h_c(T_p)$, $h_{cc}(T_p)$, $h_{lin}(T_p)$, $h_{spl}(T)$) were translated to controller code and evaluated on a Texas Instruments TMS320F28379D real-time microcontroller to test their computation time and memory size. In the PWA formulation, if N points are used to create each $h(T_p)$ function, then N−1 lines (or sub-domains) are used; therefore, the memory size will grow at a rate of $\mathcal{O}(N)$ (coefficients plus boundary conditions). The cubic spline interpolation requires twice as much memory as it must save four coefficients (third degree polynomials) instead of two. The computation time of the PWA $h(T_p)$ functions has two components, a (cold start) search which takes N log(N) time, and two floating point operations. The cubic spline $h_{spl}(T_p)$ will use the same search, but requires six floating point operations via Horner's method, therefore taking three times as long; both are $\mathcal{O}(N \log(N))$ computation time. As more inputs and outputs are added, cubic spline interpolations tend to increase in complexity by factors of two over PWA. The function $h_{lin}(T_p)$ has $\mathcal{O}(1)$ computation and memory size, but is extremely inaccurate. A summary of MCU performance is shown in TABLE II. The time of the other control operations of the control loop are shown in TABLE III.

TABLE II

MCU Performance of MTPA Functions

|  | Comp. Time (μs) | Memory (KiB) |
| --- | --- | --- |
| $h_{lin}$ (T) | 6 | 4 |
| $h_p$(T) | 226 | 102 |
| $h_c$(T) | 40 | 18 |
| $h_{cc}$(T) | 24 | 15 |
| $h_{spl}$(T) | 72 | 31 |

TABLE III

Control Timing Parameters

| Operation | Time (μs) |
| --- | --- |
| ADC Conversions | 1.8 |
| MTPA PWA Map $h_{lin}$(t) | 6.0 |
| Clarke Park Transform | 6.3 |
| Flux Linkage Maps (×2) | 14.6 |
| PI Virtual Flux Controller | 6.1 |
| Inverse Clark Park Transform | 6.3 |
| PWM Generation | 3.1 |

Figure 15C:
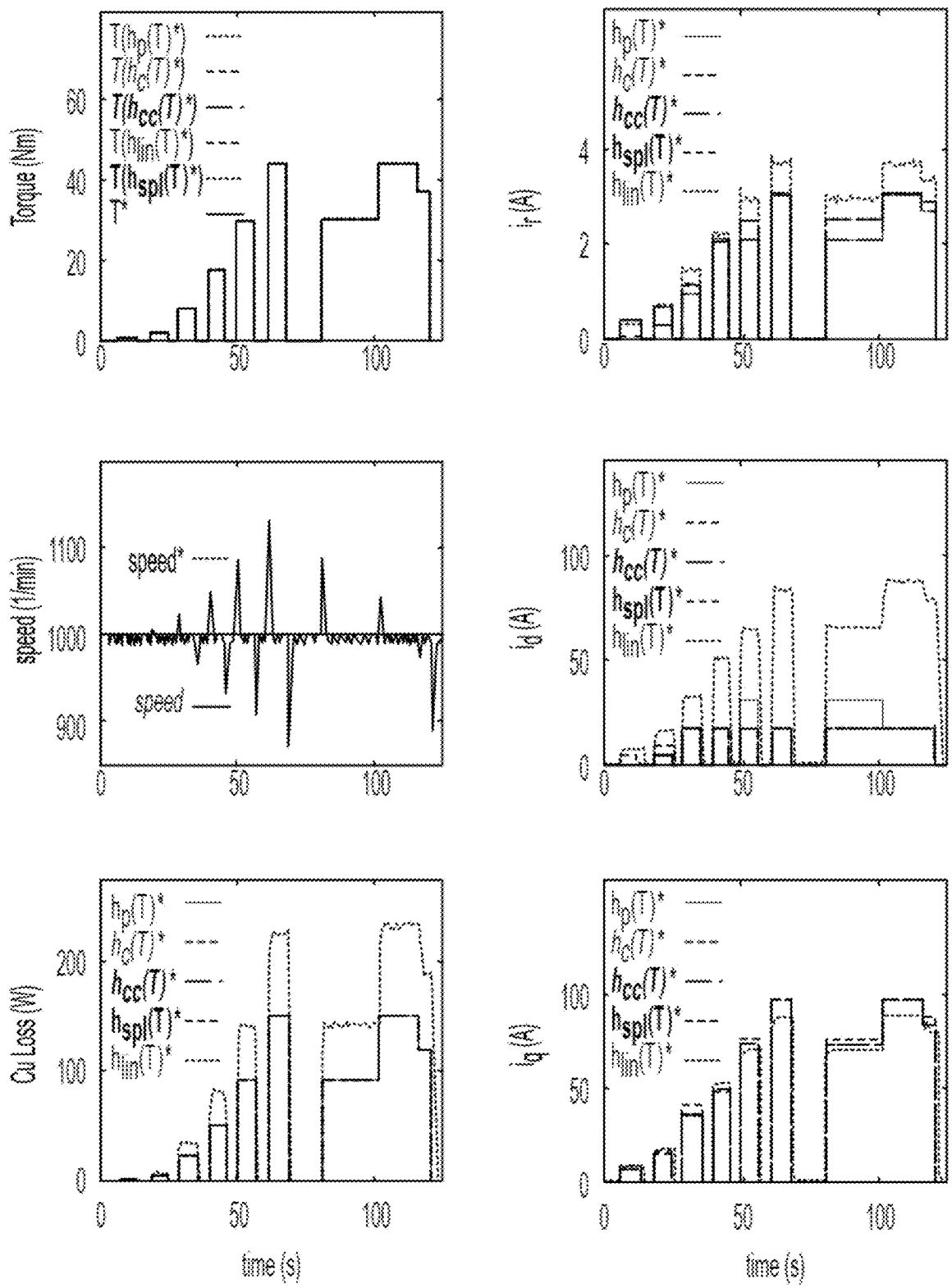
FIG. 15C illustrates WFS motor testbench experimental results for MTPA PWA including, from top to bottom on the left side, torque (reference, measured, MTPA PWA); speed (reference and measured); copper losses (experimental, MTPA PWA), and from top to bottom on the right side, rotor current (measured, MTPA PWA); d-axis stator current (measured, MTPA PWA); q-axis stator current (measured, MTPA PWA).
Figure 15D:
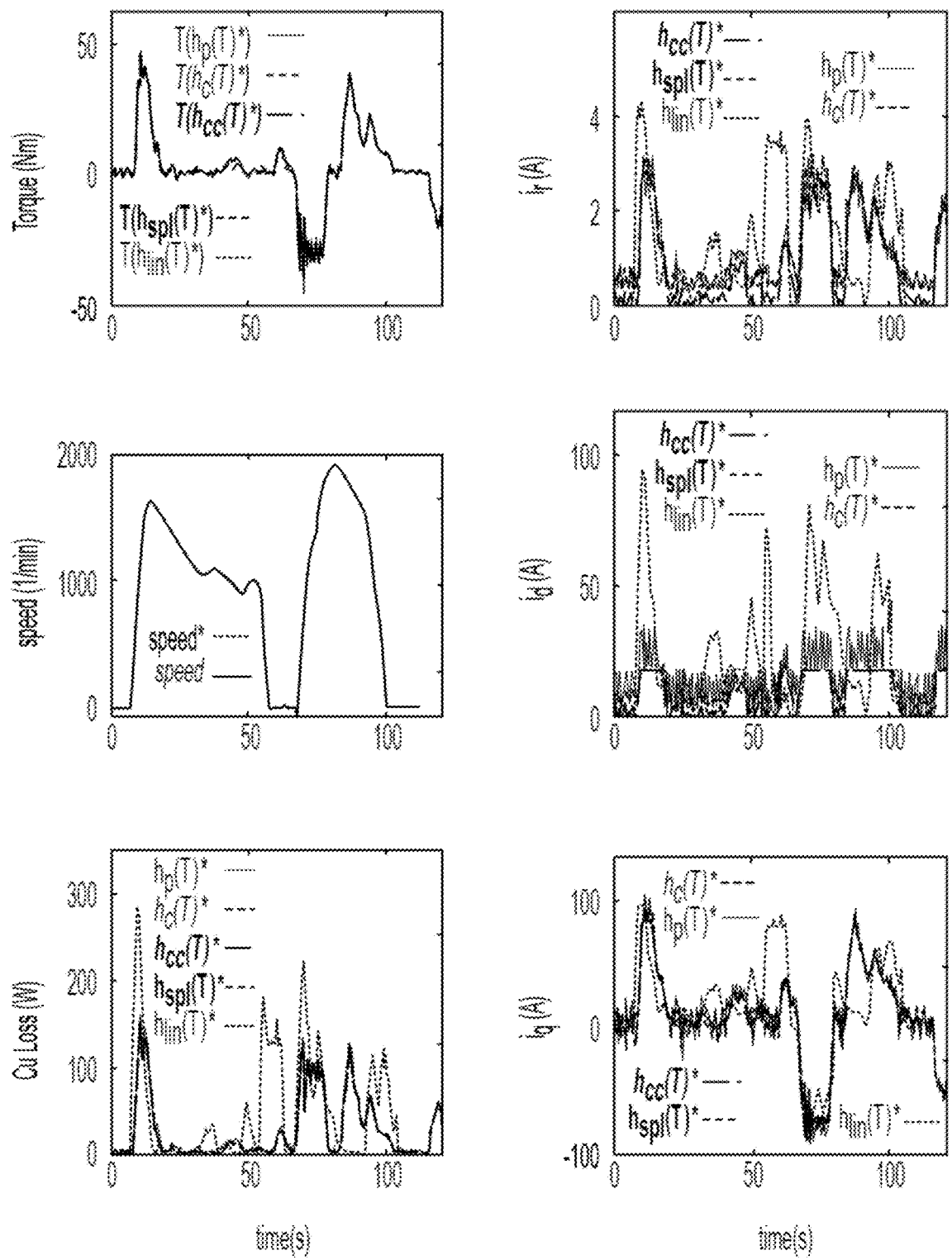
FIG. 15D illustrates WFS motor testbench experimental results for MTPA PWA following a dynamic speed reference including, from top to bottom on the left side, experimental torque tracking speed reference, and real-time copper losses for each MTPA function, and from top to bottom on the right side, experimental and post-processed rotor current $i_r$, stator current $i_d$, and stator current $i_q$ using the MTPA maps $h_p(T)$, $h_c(T)$, $h_{cc}(T)$, and $h_{spl}(T)$.
Figure 15E:
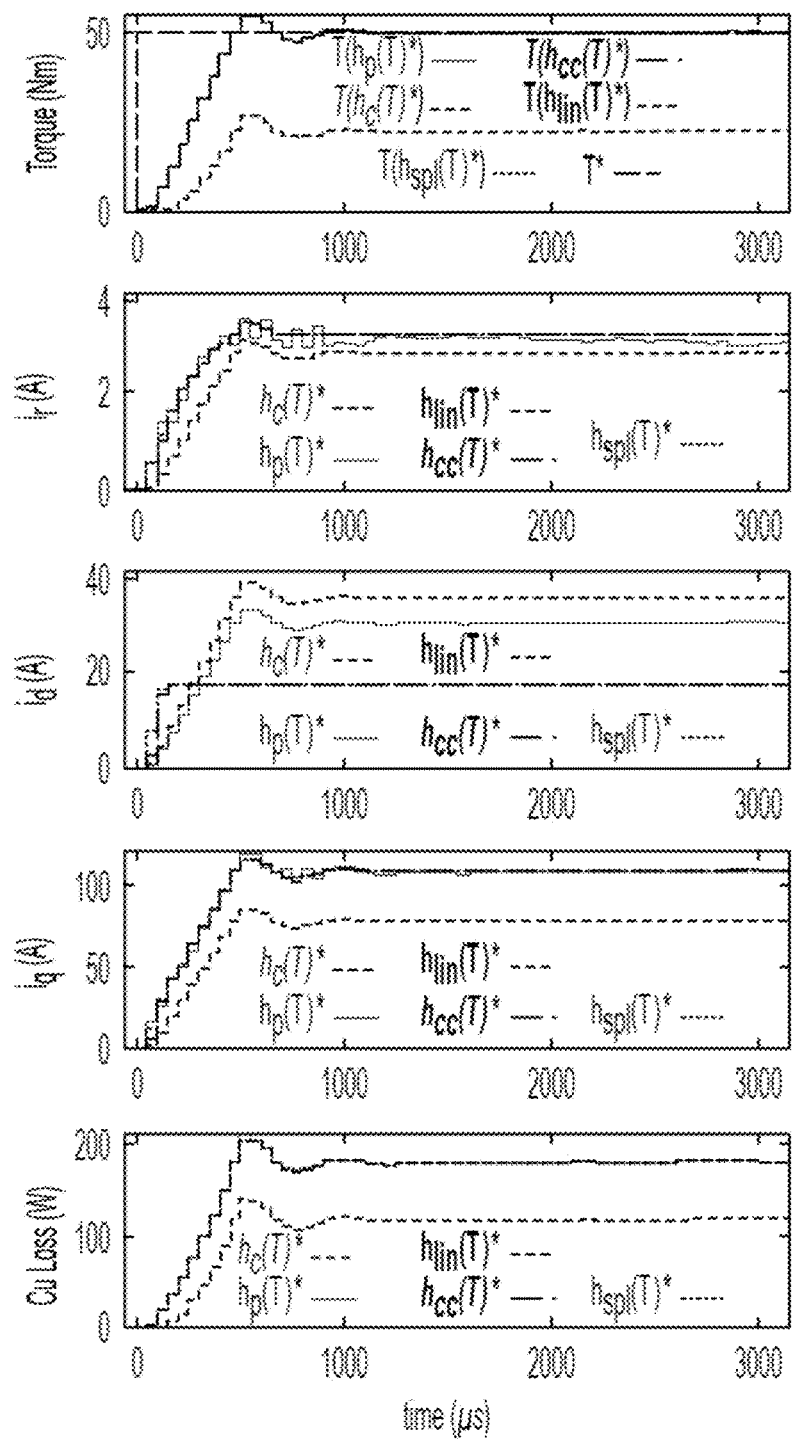
FIG. 15E illustrates WFS motor testbench experimental results for MTPA PWA with 50 Nm dynamic torque step and, from top to bottom, torque reference T* and recalculated torques from currents $h_p(T)$, $h_c(T)$, $h_{cc}(T)$, and $h_{spl}(T)$, experimental and postprocessed rotor current $i_r$ and stator currents id, iq generated from $h_p(T)$, $h_c(T)$, $h_{cc}(T)$, and $h_{spl}(T)$ MTPA functions, and real-time copper losses for each MTPA function

For real-time evaluation, several tests were conducted. The first involved the WRS motor being spun at a fixed speed of 1000 l/min using a coupled industrial drive. The WRS motor exerts 0.5-44 Nm variable torque steps that follow torque references over a 120 s period. The experimental MTPA function used was $h_{lin}$. The MTPA references generated offline by $h_p(T_p)$, $h_c(T_p)$, and $h_{cc}(T_p)$ (as well as $h_{spl}(T_p)$) are shown in FIG. 15C and are applied to the requested torques in post processing. A drive cycle emulating the operation of a passenger vehicle was also conducted, where a reference speed trajectory is applied, and the coupled industrial drive simulates the nonlinear torque load due to vehicle dynamics. This experiment is useful to show the operation of the MTPA functions under dynamically changing speeds and torques (including negative torque operation). It is shown in FIG. 15D. Torque is symmetrical about $i_q$ and, therefore, the maps $h_p(T_p)$, $h_c(T_p)$, $h_{cc}(T_p)$, and $h_{spl}(T_p)$ can handle negative torques by inputting the negative of the requested torque, $-T_p$, and then replacing $i_q$ with $-i_q$ at the output of the function. Lastly, a close up of a torque step showing the transient behavior of the controller and MTPA functions is shown in FIG. 15E.

In every experiment, the linear MTPA function $h_{lin}(T_p)$ performs the worst, creating up to 70% additional copper losses in some cases. This comes at the expense of extremely fast computation and very low memory size.

The functions $h_p(T_p)$, $h_p(T_p)$, and $h_{cc}(T_p)$ have different properties that are useful for different applications. Averaged copper loss is shown in TABLE IV. As expected, the function $h_c(T_p)$ outperforms $h_p(T_p)$ and $h_{cc}(T_p)$, although all three are within 1% of each other. The PWA MTPA functions outperform the cubic spline $h_{spl}(T_p)$, with the trade-off of losing smoothness in I.

TABLE IV

Efficiency and Accuracy of MTPA Functions

|  | Avg. $\pi_{lc}$ (W) | Avg. T error (%) | Convex in $j$ |
| --- | --- | --- | --- |
| $h_{lin}$(T) | 950 | 29.9 | yes |
| $h_p$(T) | 761.7 | 0.16 | no |
| $h_c$(T) | 758.9 | 1.68 | no |
| $h_{cc}$(T) | 759.0 | 1.69 | yes |
| $h_{spl}$(T) | 761.9 | .07 | yes |

Because the $h(T_p)$ functions are piecewise-linear approximations of $\Gamma$, there will be error in the currents produced. This error can be quantified by comparing torque $T_p$ (expected torque) to the resulting torque from $\tau_p(h(T_p))$, where $i=h(T_p)$ is the set of current references. The functions $h_c(T_p)$ and $h_{cc}(T_p)$ have minimal error at $T_p$>10 Nm/p, and $h_p(T_p)$ has very low error throughout all torques. The spline MTPA $h_{spl}(T_p)$ and linear MTPA $h_{lin}(T_p)$ bound the PWA interpolations in torque error. This error presents itself in each of the torque plots of FIGS. 15C, 15D, and 15E as well.

Finally, the shape of the MTPA trajectory for each $h(T_p)$ is different. The function $h_p(T_p)$ is jagged, and even a small torque change produces large differences in current (as seen in FIG. 15C). The function $h_{cc}(T_p)$ is the least jagged, and has the property of being convex in I. The function $h_c(T_p)$ is a compromise between the two.

In summary, each of the PWA MTPA functions perform well in terms of memory, computation time, average copper loss, and torque error. Additionally, the function $h_p(T_p)$ has a particularly low torque error, the function $h_c(T_p)$ has a particularly low average copper loss, and the function $h_{cc}(T_p)$ has a particularly fast computation time, has particularly small memory, and is convex.

In contrast, the two reference MTPA functions tend to operate on extremes of two or more criteria. For example, the function $h_{lin}(T_p)$ has fast computation and small memory, but very high error and very high average copper loss. Additionally, the function $h_{spl}(T_p)$ has low torque error, but slow computation time.

MPC Controller for WFSM Using PWA Map(s)

In some examples, the motor system 100 implements a model predictive controller. Electric machines, particular WFS motors, can have a strong nonlinear coupling between direct (d) and rotor (r) dimensions. Some electric machines use ferromagnetic materials to maximize and channel magnetic flux. Such machines tend to operate non-linear magnetic regime in general and exhibit saturation and cross saturation. The relationship between current and flux linkage is modeled using magnetic models (MM), which may also be referred to as flux linkage maps. Such maps tend to be linearized and expressed as inductances or transfer functions for motor control. Motor controllers can use an explicit or implicit MM as part of their control scheme.

Offline MM can use one or a combination of Finite Element Analysis (FEA), analytical calculations, and experimental values to measure inductances at various operating points. Some WRS motor controllers use a linearized, offline MM, which may include in sliding mode control, maximum torque, passivity-based control, and predictive direct current control. Capturing non-linear flux is much simpler using online estimation methods. Some examples include Kalman filters, flux-linkage observers, and iterative numerical solvers. However, with online methods, estimation and advanced control may require additional microcontroller resources and/or computation time to complete closed loop control cycles.

As provided in some examples herein, PWA functions may be used to build an offline MM lookup table (LUT) to capture non-linear flux. These PWA functions simplify the state-space equations to be linear, decreasing computation time. The saved computation time can instead be spent solving a constrained finite time optimal control (CFTOC) MPC problem. Accordingly, in some examples, a motor controller is provided that implements MPC control using PWA functions that simplify the MPC state-space equations to be linear.

Figure 16:
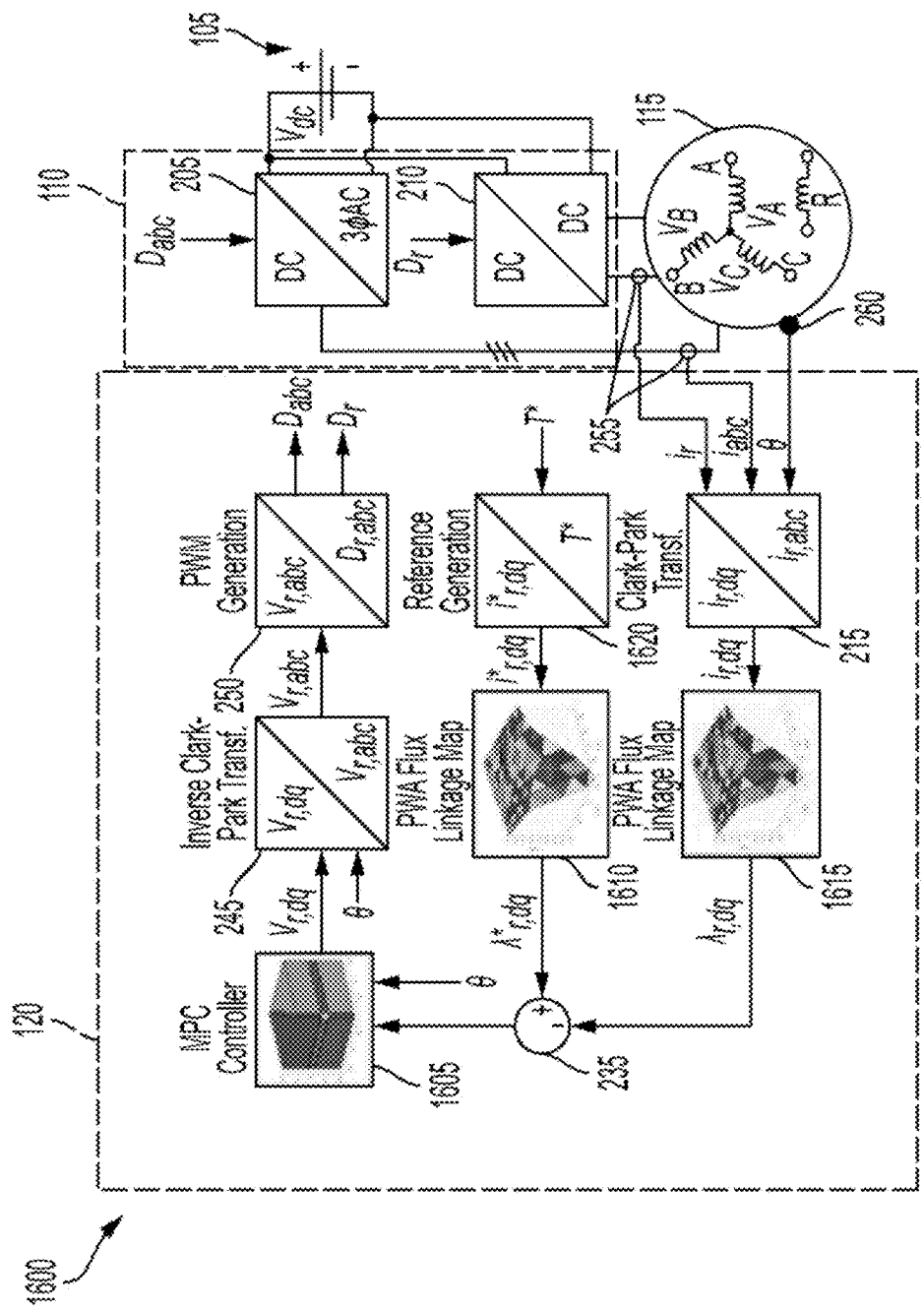
FIG. 16 illustrates another example of the motor system of FIG. 1, which implements a model predictive control (MPC) control scheme according to some embodiments.

FIG. 16 illustrates a particular example of the motor system 100, identified as motor system 1600, according to some embodiments. The description of components for FIGS. 1, 2, and 9A above similarly applies to the components in FIG. 16 sharing the same element numbers or names, except as otherwise provided herein. For example, the motor controller 120 is again illustrated as a collection of functional blocks with respective inputs and outputs. Each of the functional blocks may be implemented by a dedicated hardware circuit of the electronic processor 125 of the controller 120, by a block of software or instructions stored in the memory 130 and executed by the electronic processor 125, or a combination thereof. The motor drive circuit 110 is further illustrated as including a stator drive circuit 205 and a rotor drive circuit 210. The motor 115 is illustrated as a WFS motor having a three-phase stator with phases (λ, B, C) and a rotor field winding (R), and the motor system 1600 is primarily described with respect to a WFS motor. However, in other examples, the motor 115 is a permanent magnet synchronous motor, a hybrid synchronous motor, or another motor type. When the motor 115 is a permanent magnet synchronous motor, the rotor field winding (R) is not included in the motor 115 and, accordingly, the rotor drive circuit 210 may not be included, the motor controller 120 may not sense or control current through the rotor field winding (R), and the control blocks of the motor controller 120 may not receive, process, or generate rotor field components.

In contrast to FIG. 2, the motor system 1600 of FIG. 16 includes an MPC control block 1605, as described in further detail below. Further, the current-to-flux linkage maps 1610 and 1615 may be implemented as piecewise affine maps as described above with respect to FIG. 2, or may be implemented through other mapping functions (e.g., lookup tables, real-time executed functions, etc.). Further still, in some embodiments, a function block or map 1620 that translates an input desired control parameter (e.g., motor torque (T*)) to target current values $i^*_{r,dq}$ may be implemented as the MPLPT function block 905 described with respect to FIG. 9A (which may be implemented as a piecewise affine map that maps an input desired control parameter (e.g., motor torque (T*)) to target current values $i^*_{r,dq}$). Further, the functional blocks or maps 1610 and 1620 may be combined into a single piecewise affine map that maps an input desired control parameter (e.g., motor torque (T*)) to target flux linkage values $\lambda^*_{r,dq}$.

Additionally, in some embodiments, the controller block within the controller 120 may implement current-based motor control, rather than flux linkage-based control as illustrated in FIG. 16. For example, the current-to-flux linkage maps 1610 and 1615 may not be present in the controller 120, and the target current values $i^*_{r,dq}$ and measured current values $i_{r,dq}$ may be provided to the difference calculation block of the controller 120. The difference calculation block of the controller 120 may then provide difference values indicating the differences between the target current values $i^*_{r,dq}$ and measured current values $i_{r,dq}$ to the current-based MPC controller block 1605 that is provided in place of the flux controller block shown in FIG. 16. Regardless of whether flux-based or current-based, the MPC controller block 1605 (and, thus, the motor controller 120) may then generate a voltage command for each dimension of the set of dimensions of the rotational reference frame based on the received difference values and the rotational position of the motor (θ). For example, the flux controller may output voltage commands $V_f$, $V_d$, and $V_q$ (also referred to collectively as $V_{f,dq}$ or $V_{r,dq}$). The voltage commands may then be used to control the motor similar to as described above with respect to FIG. 2 (e.g., via inverse Clark-Park transform block 245, PWM generation block 250, and motor drive circuit 110).

Figure 17:
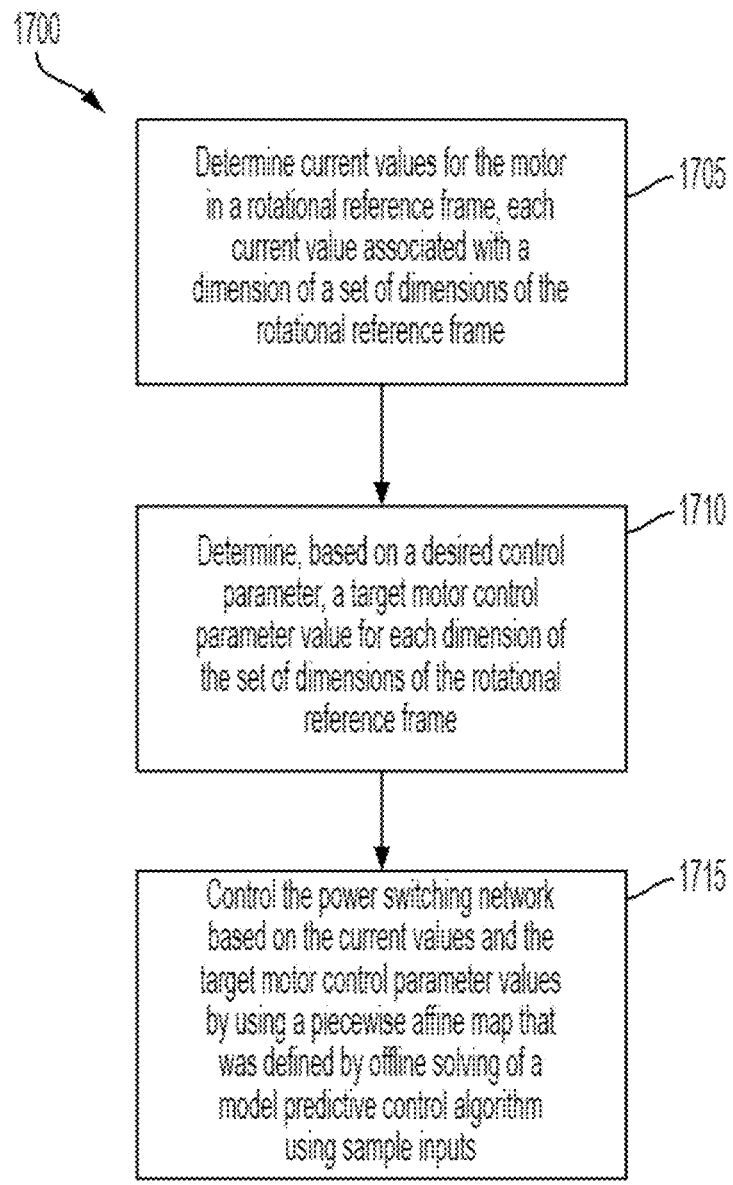
FIG. 17 illustrates a process for controlling a motor using a model predictive control technique according to some embodiments.

FIG. 17 illustrates a process 1700 for controlling a motor using a model predictive control technique. The process 1700 is described as being carried out by the motor system 1600 of FIG. 16. However, in some embodiments, the process 1700 may be implemented by another motor system, for example, motor system 100, 900, and/or 1800. Additionally, although the blocks of the process 1700 are illustrated in a particular order, in some embodiments, one or more of the blocks may be executed partially or entirely in parallel, may be executed in a different order than illustrated in FIG. 17, or may be bypassed.

In block 1705, the motor controller 120 determines current values for the motor 115 in a rotational reference frame, such as the RDQN reference frame or the rotor-alpha-beta (rαβ) reference frame. Each current value is associated with a dimension (or axis) of a set of dimensions of the rotational reference frame. For example, in the RDQN reference frame, the set of dimensions includes the R (or field (f)), D, and Q dimensions (e.g., $i_f$, $i_d$, $i_q$, also referenced as $i_{f,dq}$). As another example, in the rαβ reference frame, the set of dimensions includes the r (or field (f)), α, and β dimensions (e.g., $i_f$, $i_\alpha$, $i_\beta$, also referenced as $i_{f,\alpha\beta}$). In some examples involving MPC control, the rαβ reference frame may be used instead of the RDQN reference frame because, in the rαβ reference frame, the state equation has no dependence on speed to and is linear.

For example, to implement block 1705, the motor controller 120 may determine electrical operational characteristics of the motor 115 in a stationary reference frame; determine a rotational position of the motor 115 (e.g., of the rotor of the motor 115); and transform the electrical operational characteristics and the rotational position to the current values for the motor 115 in the rotational reference frame. For example, to determine the electrical operational characteristics of the motor 115 in the stationary reference frame and the rotational position of the rotor, the controller 120 may receive current measurements from current sensors 255 configured to sense current of each phase of the stator windings (e.g., $i_a$, $i_b$, $i_c$, also collectively referred to as $i_{abc}$) and current of the rotor winding(s) (e.g., $i_f$, sometimes referred to as $i_r$) of the motor 115. The controller 120 may also receive rotational position measurements (θ) from a rotational position sensor 260 configured to measure the rotational position of the rotor. In some examples, the controller 120 may determine current and rotational motor position using other techniques. For example, the controller 120 may use a "sensorless" design to determine the rotor position, for example, by inferring rotor position by detecting zero-crossings, peaks, and/or valleys of back electromotive force (emf) signals on the stator windings. Further, the controller 120 may calculate the current values from voltage measurements on the stator windings and/or rotor winding(s) provided by voltage sensors. To transform the electrical operational characteristics and the rotational position to the current values for the motor in the RDQN rotational reference frame, the motor controller 120 may perform, via Clark-Park transform block 215, a Clark-Park transform on the determined current $i_{abc}$ and rotational position (θ) of the motor 115. The motor controller 120 (e.g., in the transform block 215) may further perform an inverse Park transform on the current values that are in the RDQN rotational reference frame (e.g., by multiplying the current values by the inverse Park transform matrix ($P^{-1}$) to obtain the current values in the rαβ reference frame. In some examples, the Clark-Park transform block 215 may instead be a Clarke transform block that directly transforms the determined current $I_{abc}$ and rotational position (θ) (by applying the Clarke transform matrix) to generate the current values for the motor 115 in the rαβ reference frame.

In block 1710, the motor controller 120 determines, based on a desired control parameter, a target motor control parameter value for each dimension of the set of dimensions of the rotational reference frame. For example, the motor controller 120 may receive the desired control parameter in the form of an input command or reference value, which may be indicate a desired motor torque value (T*) or desired motor speed (ω). The desired control parameter may be retrieved from a memory (e.g., the memory 130) or received via an input/output device of the motor controller 120 (e.g., from a user operating a keyboard, pushbutton, level, dial, etc.).

The motor controller 120 may then, using the reference generation block 230, transform the desired control parameter to target current values for the motor in the rotational reference frame (e.g., $i^*_{f,dq}$ or $i^*_{f,\alpha\beta}$). For example, the motor controller 120 may use the reference generation block 230 in the form of a lookup table (e.g., stored in the memory 130) that maps potential values for the desired control parameter T* to the target current values. The lookup table may be populated in advance based on experimental data. The motor controller 120 may then determine, based on the target current values, the target flux linkage value for each dimension of the set of dimensions of the rotational reference frame using the piecewise affine (PWA) map 225. The motor controller 120 may use the PWA map 225 to determine the target flux linkage values based on the target current values in a similar manner as the PWM map 220 is used to determine the flux linkage values based on the current values. The two PWA maps 220 and 225 illustrated in FIG. 17 may be duplicate PWA maps, or the motor controller 120 may use one PWA map for both the actual values and the target values (i.e., although two PWA maps are illustrated, in some embodiments, one shared PWA map is included instead).

In some examples, the reference generation block 230 is implemented as the MPLPT function block 905 described above with respect to FIGS. 9A-9B. In such cases, the motor controller 120 may apply the MPLPT function block 905 to the desired control parameter. For example, the MPLPT function block 905 may implement a piecewise affine (PWA) map that maps an input desired control parameter (e.g., motor reference torque (T*)) to target current values $i^*_{r,dq}$, or to target flux linkage values $\lambda^*_{r,dq}$, as described above with respect to FIGS. 9A-9B.

In some examples, the output current value of the reference generation block 230 is an intermediate target motor control parameter value that is then further translated to a (final) target motor control parameter value by the current-to-flux linkage map 225. In other examples, such as where the controller 240 of FIG. 17 is a current-based controller rather than a flux-based controller, or where the reference generation block 230 is configured to map reference torque (T*) directly to a target flux value (λ*), the output current value of the reference generation block 230 is the (final) target motor control parameter value.

In block 1715, the motor controller 120 controls the power switching network based on the current values and the target motor control parameter values by using a piecewise affine map that was defined by offline solving of a model predictive control algorithm using sample inputs. For example, in some scenarios, the MPC controller 1605 implements a model predictive control (MPC) algorithm to generate the control signals (e.g., voltage commands ($V_{r,dq}$)), based on the received difference values from difference operation block 235 (e.g., λ*−k) and the rotational position of the motor (θ). The difference values indicate a difference between the target flux values (λ*) output by PWA map 1610 and the flux values (k) output by PWA map 1615. The controls are based on the current values and the target motor control parameter values at least because the MPC controller 1606 generates the controls based on the flux values (λ), which was determined based on the current values (e.g., $i_{r,abc}$, $i_{r,dq}$) and based on the target flux values ($\lambda^*$) (a target motor control parameter value).

The MPC algorithm includes an MPC optimization problem or equation, as described in further detail in below. In some examples, the MPC controller 1605 implements "explicit MPC." In such examples, in advance of execution of the process 1700, the MPC optimization problem is solved offline and a control law is generated therefrom and stored on the MPC controller 1605. Then, in block 1715, during real-time operation of the motor 115, the control law is accessed and implemented to control the motor 115. For example, the MPC optimization problem (e.g., described below) is solved for all or a subset of possible inputs offline, which is then used to generate a piecewise affine map (an "MPC PWA map") that is stored on the controller 120 (e.g., as part of the MPC controller 1605) in advance of motor operation. The MPC PWA map defines a plurality of domains, each with an associated control law. In real time during operation of the motor, the MPC controller 1605 receives measurements (e.g., the received difference values and the rotational position of the motor ($\theta$)), which dictates which domain of the MPC PWA is active. The MPC controller 1605 thus identifies the active domain and the feedback control law associated with the active domain. The MPC controller 1605 then generates control signals (e.g., voltage commands ($V_{r,dq}$)) using the identified control law.

In some examples, the explicit MPC provides a feedback control law as a MPC PWA map of the form:

$$u(k) = -K_i x(k) + F_i, \text{ for all } x(k) \text{ in } D_i,$$

where $K_i$ and $\Gamma_i$ describe the affine control law applicable to all states $x(k)$ in the i-th PWA domain $D_i$. Typical mathematical strategies may be used to reduce the MPC statement to this PWA form, such as by using a parametric solver (e.g., the multiparametric toolbox (MPT)).

In other examples, the MPC controller 1605 solves the MPC optimization problem online (i.e., in real time during operation and control of the motor 115) to generate the control signals. For example, the MPC controller may solve the MPC optimization problem online either analytically (e.g., using an unconstrained MPC formulation) or numerically (e.g., with a real-time numerical solver such as a gradient method or Newton solver).

As described above, the MPC controller 1605 may implement flux linkage-based control or current-based control. In some embodiments, the MPC controller 1605 may implement a hybrid current and flux linkage based-control. For example, the cost function of the MPC optimization problem or parts of the MPC may be formulated in the flux and/or current domain and include the PWA map in the optimization problem as an equality constraint.

Although the controller block of the motor controller 120 (e.g., flux controller, current-based controller, MPC controller 1605) in the various embodiments provided herein are described and shown as receiving a difference value (e.g., a difference between target flux values $\lambda^*_{r,dq}$ and measured flux values $\lambda_{r,dq}$ or a difference between target current values $i^*_{r,dq}$ and measured current values $i_{r,dq}$), in some examples, the controller blocks receive the reference and measured values and, for example, the difference calculation is integrated into the controller block. In other words, the difference calculation block shown in FIGS. 2, 9A, and 16 may be part of the controller block and its control algorithm or the algorithms may be adjusted to account for the measured and reference values without an explicit difference calculation between these two values.

MPC Algorithm

Model Predictive Control (MPC), or Receding Horizon Control (RHC), is a control technique that includes solving a constrained finite time optimal control (CFTOC) problem that finds the minimal-cost path from a start state to and end state. In this CFTOC problem, the r$\alpha\beta$ reference frame form of the machine equations may be used because the state equation has no dependence on speed $\omega$ and is linear. Accordingly, in this section, unless otherwise noted, it can be assumed that fluxes $\lambda$, currents i, and terminal voltages $\bar{v}$ are in r$\alpha\beta$ reference frame form. In this CFTOC problem, the (discrete time) state equation $f$ is $$f_{r\alpha\beta}(\bar{v}_{r\alpha\beta}) = T_s \bar{v}_{r\alpha\beta},$$

where $T_s$ is the sampling period and $\bar{v}$ is the terminal voltage, and the (discrete time) output equation g is:

$$g_{r\alpha\beta} = P^{-1}(\theta) \phi^{-1}(P(\theta) \lambda_{r\alpha\beta})$$

where $\phi^{-1}$ is the flux-to-current map (e.g., an FEA-generated or PWA flux-to-current map, as previously described), $\lambda$ is flux, $\theta$ is the rotational position of the motor, and P is the Park transform.

RHC provides an optimal input $\bar{v}$ to the plant by computing a set of inputs $V_{0 \to N}$ that reaches a desired state $\lambda_N$ from a starting state $\lambda_0$ in N time steps, then choosing the first value of the set. N is called the horizon length. The known state variable at the present time k is denoted $\lambda(k)$, a calculated future state variable at time k is denoted $\lambda_k$, and the state predicted for time t+k computed at time k is denoted $\lambda_{t+k|k}$t+k|k. The same notation is valid for inputs $\bar{v}$.

An input trajectory of length N where the input starts at $\bar{v}_0$ is denoted as the set $$V_{0 \to N} = \{\bar{v}_0, \ldots, \bar{v}_{N-1}\}$$

The starting state is denoted $\lambda_0$ and the value of the input and state at the end of the trajectory are denoted $\bar{v}_N$, $\lambda_N$, respectively.

A cost $J_0$ for a given a trajectory can be calculated by:

$$J_0(\lambda_0, i_0) \triangleq \lambda_N, P\lambda_N + \sum_{k=0}^{N-1} \bar{v}' Q \bar{v}$$

where $\lambda_k$ and $\bar{v}_k$ are the state and input at some time k in the trajectory. The cost function has two components. The first component is called the "terminal cost" and uses the matrix $P \in \mathbb{R}_{3 \times 3}^+$ to penalize the trajectory based on how close the final state $\lambda_N$ is against the desired state. The second component is called "stage cost," which uses the matrix $Q \in \mathbb{R}_{3 \times 3}^+$ to penalize the sum of change in state over all steps.

In some examples, an additional term $\bar{v}'R\bar{v}$, called the "input cost," is used to penalize the sum of change in input over all steps. When using voltage-source inverters, we can set R=0 because changing the terminal voltage may not be associated with any significant drawbacks, so this term is not included.

The CFTOC problem can be defined as:

$$J_0^*(\lambda(t)) = \min_{V_{0 \to N}} J_0(\lambda(0), V_{0 \to N}),$$

$$\text{subj.to } \lambda_{k+1} = f(\lambda, \bar{v}), k = 0, \ldots, N-1,$$

$$\lambda_k \in \Lambda, \bar{v}_k \in V, k = 0, \ldots, N-1,$$

$$\lambda_N \in \Lambda_f,$$

$$\lambda_0 = \lambda(0)$$

where $J_0^*$ is the optimal cost or value function, $\Lambda_f$ is the terminal region that the final flux $\lambda_N$ must be in by the Nth step, and $\lambda_0$ is the defined starting state, which is the same as the known state it is currently in $\lambda(0)$. A simple definition of the terminal region $\Lambda_f$ is an area within some E distance from the desired state $\lambda^*$, $$\Lambda_f = \lambda^* + \epsilon, \epsilon \in \mathbb{R}^3.$$

There exists at least one optimum cost and trajectory if $V_{0 \to N}$ is compact and $f(\lambda, \bar{v})$ and $\bar{v}'Q\bar{v}$ are continuous. The optimal output trajectory to the problem is denoted as:

$$\mathcal{V}_{0 \to N}^* = \{\bar{v}_0^*, \bar{v}_1^*, \ldots, \bar{v}_{N-1}^*\}.$$

At t=0, the first solution of the trajectory is the input to the system; at t=1, the CFTOC problem is re-solved and the first input of the new trajectory is the input to the system. This process is repeated indefinitely:

$$\bar{v}(0) = \bar{v}_{0|0}^*(\lambda(0)),$$

$$\bar{v}(1) = \bar{v}_{1|1}^*(\lambda(1)),$$

$$\vdots$$

$$\bar{v}(t) = \bar{v}_{t|t}^*(\lambda(t)).$$

In each case, the horizon length is N time steps ahead of the current time. Thus, the horizon is constantly being pushed further ahead in time, or "receding" from the present viewpoint.

The RHC control law that associates an optimal input $\bar{v}_{t|t}^*$ after solving the CFTOC to the state $\lambda(t)$ is denoted as $c_t$: $\mathbb{R}^3 \to \mathbb{R}^3$, where $c_t(\lambda(t)) = \bar{v}_{t|t}^*$.

By combining the control law for any arbitrary positive time k (denoted $c_k$), with the system plant $f_{r\alpha\beta}(\bar{v}_{f_{r\alpha\beta}}) = T_s \bar{v}_{f_{r\alpha\beta}}$, the closed-loop control equation $c_{cl}$ is $$c_{cl}(\lambda(k)) \triangleq \lambda(k+1) = T_s c_k(\lambda(k)), k \geq 0.$$

In some examples, the CFTOC problem (i.e., the optimal cost or value function $J_0^*(\lambda(t))$ is solved using the Multi-Parametric Toolbox 3.0 (MPT3), which is uniquely designed to solve MPC with PWA system functions. As shown in FIG. 16, in some examples, the measured state flux $\lambda$ is calculated using the feedback current i and the PWA map 1615. The MPT3 solver may solve the CFTOC problem using a linear complementarity problem (LCP) solver that can solve linear problems (LP) and quadratic problems (QP). The output provided by the MPT3 solver may be the aforementioned MPC PWA function. The MPC PWA function may have a different function for each combination of active and inactive equality constraints.

Simulations of the MPC controller 1605 controlling a 65 kW WFS motor illustrated that the described MPC controller 1605 is feasible and viable for use in speed-based control and torque-based control of a WFS motor.

PWA Map for Permanent Magnet Synchronous Machines

As noted above, in some embodiments, the motor 115 is a permanent magnet (PM) synchronous motor. Among other applications, PM synchronous motors may be used in high energy density applications due to their high efficiency and mechanical simplicity. For example, PM synchronous motors have been used in the automotive space, including for electric and all-electric air propulsion drives. Controller performance for PMS motors can depend on the accuracy of the machine parameters such as the stator inductances, stator resistance, and permanent magnet (PM) flux. These parameters can change in real time and have dependencies on temperature, position, and current. For example, the stator resistance increases non-linearly with temperature, the PM flux can decrease (demagnetize) at high temperatures, and stator inductance saturates at high current. A controller can account for these variations using online parameter estimation, offline parameter look up tables (LUTs), or a combination thereof.

Online parameter estimation may use real-time feedback of the drive system to estimate parameters. Feedback can include current, voltage, speed, and position. Online parameter estimation methods include receding horizon estimation, recursive least squares, neural networks, and extended Kalman filters. Offline parameter LUTs may use the data of the machine from analytical calculations, FEA-analysis, and experimentation (or a combination thereof) to approximate the parameters given various operating points of the machine. The datapoints are interpolated in various ways to produce various desirable properties depending on the parameter and application. Generally, online parameter estimation requires more computation time than offline LUTs, but is more accurate over the lifetime of the motor (or associated vehicle) by detecting degradation and partial faults in the machine. Online parameter estimation may use more sensors or sensorless techniques than offline LUTs. Additionally, systems that use offline parameter LUTs may take up more memory (e.g., on a digital signal processor (DSP) of the motor controller) and can function with less sensors.

In some examples provided herein, a virtual-flux motor controller for controlling a PM synchronous motor is provided that relies on a flux linkage magnetic model of the PM synchronous motor. Flux linkage exhibits saturation and cross saturation at high current, introducing non-linearities into the machine model. The virtual-flux motor controller can regulate the flux of a machine by using field-oriented control such as, for example, model predictive control (MPC). As described in further detail herein, the virtual-flux motor controller may use a piecewise affine (PWA) flux linkage magnetic model, also referred to as a PWA map or function, that locally linearizes the inductance and flux-offset of the machine. Accordingly, the magnetic model and, thus, the state-space model of the system may be linear while capturing saturation effects, enabling robust controls and efficient operation. The magnetic model of the PM synchronous motor may be built using the PWA functions. This magnetic model can allow for the use of virtual-flux model predictive control (VF-MPC) motor controller that also takes into account saturation and cross saturation effects in the MM. The model may be created using FEA-simulated data points and may be verified with experimental datapoints. Additionally, in some examples, as described herein, the model may be optimized using irregularly gridded points (e.g., in maximum torque per ampere (MTPA) range, derated range, or full current range), which can result in lower average and maximum flux error. In one example, using only 40 irregularly gridded points provided an average flux error less than 1% and a maximum error less than 2%. This result represents a≈5-10% and ≈80-100% reduction in average and maximum flux error compared to a regularly gridded model.

As noted above, in some embodiments, the motor 115 is a permanent magnet (PM) synchronous motor. For example, the motor 115 illustrated and described with respect to FIGS. 1, 2, 9A, and 16 may be a PM synchronous motor. In such embodiments, the rotor of the PM synchronous motor includes permanent magnets, and does not include an energizeable field (in contrast to a WFS motor and in contrast to a hybrid WFS motor having a rotor with at least one permanent magnet and at least one energizeable field). Accordingly, in such embodiments, the motor drive circuit 110 may not include a rotor drive circuit 210, but may still include the stator drive circuit 205. Additionally, the monitored or determined rotor field characteristics (e.g., $i_r$, $\lambda_r$), rotor field control-related variables (e.g., $v_r$, $D_r$), and corresponding portions of the controller 120 that operate to determine or generate these rotor field elements may be modified to not determine or generate these rotor field elements. For example, the blocks 905, 910, 915 of FIG. 9B may not receive $i_r$ or output $i_r$, $i^*_r$, $\lambda_r$, $\lambda^*_r$, the flux controller may not receive $\lambda^*_r$–$\lambda_r$, or output $v_r$, and the PWM generation block may not receive $v_r$ or output $D_r$. Similar modifications may also be present in the systems illustrated in FIG. 2 and FIG. 16 when implemented with a PM synchronous motor.

Figure 18:
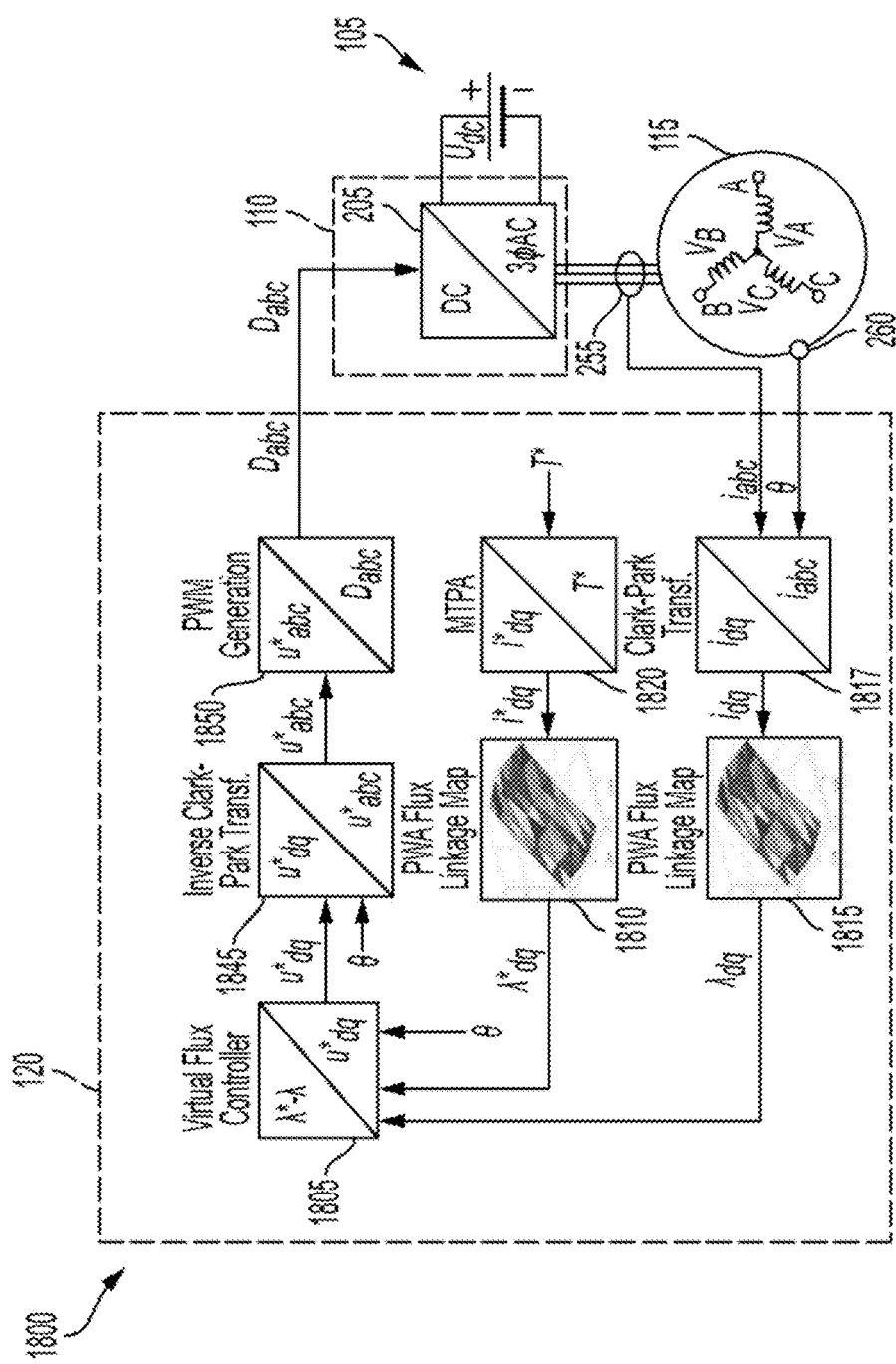
FIG. 18 illustrates another example of the motor system of FIG. 1, which includes a permanent magnet (PM) synchronous motor and implements one or more of a current-to-flux PWA map, a model predictive control (MPC) control scheme, and MTPA or MPLPT-based reference generation according to some embodiments.

FIG. 18 also discloses the motor 115 in the form of a PM synchronous motor. More particularly, FIG. 18 illustrates a particular example of the motor system 100, identified as PM synchronous motor system 1800, according to some embodiments. The description of components for FIGS. 1, 2, 9A, and 16 above similarly applies to the components in FIG. 18 sharing the same element numbers or names, except as otherwise provided herein. For example, the motor controller 120 is again illustrated as a collection of functional blocks with respective inputs and outputs. Each of the functional blocks may be implemented by a dedicated hardware circuit of the electronic processor 125 of the controller 120, by a block of software or instructions stored in the memory 130 and executed by the electronic processor 125, or a combination thereof. The motor drive circuit 110 is further illustrated as including a stator drive circuit 205, but without a rotor drive circuit (as the rotor is lacking an excitable field). Additionally, in contrast to the illustrations of FIGS. 2, 9A, and 16, the motor 115 is illustrated as a PM synchronous motor having a three-phase stator with phases (λ, B, C), and the motor system 1800 is primarily described with respect to a PM synchronous motor. However, in other examples, the motor 115 is a WFS motor, a hybrid synchronous motor, or another motor type.

The motor controller 120 of the motor system 1800 is similar to the motor controller 120 illustrated in FIGS. 2, 9A, and 16, but its functional blocks are adapted for a PM synchronous motor. For example, the control blocks of the motor controller 120 in the motor system 1800, may not receive, process, or generate rotor field components (as the rotor is lacking an excitable field). Otherwise, the control blocks perform generally similar functionality as similarly named components of FIGS. 2, 9A, and 16. For example, virtual flux controller 1805 may generate control signals (voltage commands) based on a motor position and on difference in a reference flux and a determined flux (similar to flux controllers 240 and 1605); the PWA maps 1810 and 1815 may translate an input current values to flux values based on PWA functions (similar to the maps 220, 225, 910, 915, 1610, and 1615); the Clark-Park transform block 1817 may perform a Clark-Park transform on the determined current $i_{abc}$ and rotational position (θ) of the motor 115 to transform the input values to a rotational reference frame (e.g., DQ reference frame) (similar to transform block 215); the MTPA block may translate a reference torque to a reference current using a maximum torque per ampere translation function or an MPLPT translation function (similar to reference MPLPT block 905); the inverse Clark-Park transform block 1845 may transform an input voltage from a rotational reference frame (e.g., DQ reference frame) to a stationary reference frame (e.g., ABC reference frame) (similar to inverse transform block 245); and the PWM generation block 1850 may transform an input voltage command to a PWM control signal ($D_{abc}$), similar to PWM generation block 250.

Further, in some embodiments, a function block or map 1820 that translates an input desired control parameter (e.g., motor torque (T*)) to target current values $i^*_{r,dq}$ may be implemented as a lookup table or other function that does not implement MPLPT or MTPA, such as described with respect to block 230. In the case of the motor system 1800 using a speed control command, the reference torque (T*) may be created by a reference speed ω* subtracted by a measured speed w fed into a PI controller to produce the reference torque T*. In the case of the motor system 1800 using a torque control command, the reference torque (T*) may be input (e.g., from a memory, a pedal, knob, switch, keypad, etc.). In some examples, the functional blocks or maps 1810 and 1820 may be combined into a single piecewise affine map that maps an input desired control parameter (e.g., motor torque (T*)) to target flux linkage values $\lambda^*_{dq}$.

PM Synchronous Motor Model

In the following section, a model for a PM synchronous motor is provided. This model is similar to the previously described WFS motor model, but is updated to account for the lack of an excitable rotor field. The PMSM is a three-phase synchronous machine that can be dynamically described by the state-space model $$\dot{\lambda}_d = \omega\lambda_q + u_d - R_s i_d = \omega\lambda_q + \bar{u}_d,$$

$$\dot{\lambda}_q = -\omega\lambda_d + u_q - R_s i_q = -\omega\lambda_d + \bar{u}_q,$$

where $\lambda_d$, $\lambda_q$ are the q-axis and d-axis stator flux linkages, $u_d$, $u_q$ are terminal voltages, $i_d$, $i_q$ are stator currents, ω is the electrical speed of the machine, $R_s$ is the stator resistance, and (•) is the d/dt operator. This formulation makes use of the Parke-Clarke transformation, which here provides a linear transformation from three phase (three-dimensional) to direct-quadrature (two-dimensional) space. The power-invariant Clark transform is used, and the magnetic axis of the permanent magnet of the rotor is the reference angle for the d-axis in the Park transformation.

The compensated terminal voltages $\bar{u}_d$ and $\bar{u}_q$ are the terminal voltages incorporating the resistive voltage drop. The compensated terminal voltages are capable of including the inverter non-idealities such as switch on-voltage drops and dead times. The PWA formulation presented later is capable of including parameters not present such as damper windings, zero-sequence current, etc., but are omitted for simplicity. Additionally, position-dependent effects can be added to the PWA model as third, fourth, . . . nth dimensions of the existing two-dimensional dq PWA model. This formulation is compatible with any PM synchronous machines, regardless of salience ratio (IPMSM, SPMSM, etc.).

The torque of a PMSM is modelled by $$T = pi'J\lambda,$$

where p is the number of pole pairs, $i=[i_d\ i_q]'\in I$ is the current vector, $\lambda=[\lambda_d\ \lambda_q]'\in \Lambda$ is the flux vector, and J is the cross-coupling matrix, $$J = \begin{bmatrix} 0 & -1 \\ 1 & 0 \end{bmatrix},$$

The sets I and $\Lambda$ describe the full operating current and flux range of the machine. The relationship between current i and flux $\lambda$ is nonlinear and saturates. Cross saturation makes the d-axis flux dependent on d-axis current and q-axis current. The same holds for q-axis flux. The functions $f(i)$ and $g(\lambda)$ model this relationship:

$$\lambda = f(i)$$
$$i = g(\lambda).$$

The function $f(i)$ is useful for calculating or estimating the flux of the machine $\lambda$ given feedback currents, while $g(\lambda)$ is useful when estimating i using an observer instead of direct measurement. Typically, $g(\lambda)$ is more computationally difficult to obtain then $f(i)$. The map $f(\cdot)$ may be a LUT that is built using measured or finite element analysis (FEA) points that are interpolated by some method.

The compensated terminal voltages can be described by the vector $\bar{u}[\bar{u}_d\ \bar{u}_q]'\in U$, where U is voltage operating range of the machine. Thus, the machine can be described as a standard linear state-space system in the form $$\dot{\lambda} = A\lambda + B\bar{u},$$
$$i = g(\lambda),$$

where the A and B matrices are $$= \begin{bmatrix} 0 & \omega \\ -\omega & 0 \end{bmatrix}, B = I = \begin{bmatrix} 1 & 0 \\ 0 & 1 \end{bmatrix}.$$

The input is the compensated voltage u, the state is the flux $\lambda$, and the output is the current i. This state space model can be used in an MPC controller, such as may be implemented the flux controller block 1805. The state will be linearized using a piecewise affine map $f_{pwa}(i)$ according to the machine operating point.

Piecewise a Fine (PWA) Magnetic Model for PM Synchronous Motor

As noted, the motor 115 implemented as a PM synchronous motor may have its magnetic model expressed as a PWA map. As previously discussed (e.g., with respect to WFS motors above), PWA maps divide a nonlinear map into M domains over which the function is linearized. Hence, the PWA current to flux map may be expressed as:

$$\lambda = f(i) \approx f_{PWA}(i) = \begin{cases} L_1 i + \psi_1, & i \in \mathcal{J}_1, \\ L_2 i + \psi_2, & i \in \mathcal{J}_2, \\ \cdots \\ L_M i + \psi_M, & i \in \mathcal{J}_M, \end{cases}$$

where $\lambda = L_j i + \psi_j$ is the affine equation that maps currents $i \in I_j$ onto fluxes $\lambda \in \Lambda_j$ and $\Lambda_j$ is the image of the domain $I_j$. The affine map is defined by the inductance matrix $L_j$ and a flux offset $\psi_j$.

The inverse of $f(\cdot)$ is $$i = g(\lambda) \approx g_{PWA}(\lambda) = \begin{cases} L_1^{-1}(\lambda - \psi_1), & \lambda \in \Lambda_1, \\ L_2^{-1}(\lambda - \psi_2), & \lambda \in \Lambda_2, \\ \cdots \\ L_M^{-1}(\lambda - \psi_M), & \lambda \in \Lambda_M \end{cases},$$

such that $i = g \circ f(i)$.

The process to create this PWA map can be divided into four steps: 1) choose $I_P$; 2) domain decomposition (e.g., Delaunay Triangulation) of $I_P$; 3) compute all $L_j$ and $\psi_j$; and 4) assign all Lj and $\psi_j$ to $I_j$. In step one of the process to create the PWA map (choosing $I_P$), $I_P \subseteq I$ is the set of measured, simulated, or estimated current points that will be used to create the PWA map. The corresponding flux set $\Lambda_p$ is also identified. In general, as least in some examples, a set of all current-flux point pairs for a motor may be too large to create a corresponding PWA map because the resulting PWA map may be too large for a DSP of the motor controller 120 with finite memory. Accordingly, a subset of current-flux point pairs ($I_P$ and corresponding flux points $\Lambda_p$) selected from the current-flux point pairs I and $\Lambda$ for the motor 115 may be identified or chosen.

In some examples, $I_P$ can be regularly gridded, where $i_d$ and $i_q$ datapoints of $I_P$ are evenly separated. The corresponding flux points $\Lambda p$ will not necessarily be regularly-gridded.

In other examples, $I_P$ can be irregularly gridded. An irregularly-gridded $I_P$ can yield higher accuracy PWA map for the same number of points as the regularly-gridded, because flux error is not evenly distributed. Irregularly-gridded current points can also target areas in I and $\Lambda$ that may be more frequently used, such as derated operation and MTPA.

Techniques for selecting the subset of current-flux point pairs for use in the PWA map generation, including to optimize the PWA map, are described further below. Similar strategies may be used as described with respect to the process 600 of FIG. 6 and WFS motors.

In step two of creating a PWA map, (domain decomposition of $I_p$), the domain decomposition algorithm (e.g., Delaunay Triangulation) is applied to the current-flux pairs to obtain M subdomains of the PWA function. That is, constructing the PWA map or functions implies splitting the domain I and image Λ into M subdomains $I_j$ and subimages $Λ_j$. These M subdomains are connected and that the resulting maps are non-conflicting. In other words, a point $i \in I$ can be in one or more subdomains if and only if they map to the same point $λ \in Λ$. Hence, the domain can be split into simplices that do not overlap except for at the border. Any point on the border $i \in \partial I_j$ is expected to be part of two or more subdomains to ensure continuity. The points all map onto the same $Δ \in \partial Λ_j$ that is also part of two or more subdomains. In contrast, all points in the interior of the subdomains are part of only one subdomain.

The M subdomains may be obtained by identifying unique and connected simplices using the Delaunay triangulation $DT(I_P)$ (or another domain decomposition algorithm). To calculate the Delaunay triangulation for $I_P$, a Voronoi diagram may be constructed using $I_P$. The Voronoi diagram of $I_P$ splits the I space into $|I_P|$ Voronoi cells, where all points in a Voronoi cell are closer to a single point in $I_P$ than any other. To obtain the Delaunay triangulation, the dual of the Voronoi diagram is found.

The Delaunay triangulation $DT(I_P)$ of the Euclidian space I guarantees that no point $i \in I$ is inside two simplices in $DT(I_P)$. In general, $DT(I_P)$ is unique and there exists no set of D+2 points wherein one of the points lies strictly inside the minimally enclosing hypersphere of the point set. Each subset is defined to be a simplex, which is the simplest possible polytope in any D-dimensional space, which is a triangle in the two dimensions of the given problem.

A D-dimensional simplex can be defined as the convex hull of its D+1 vertices (called the V-notation); alternatively, a simplex can be defined by its faces defined as affine inequalities (called the H-notation):

$$\mathcal{J}_j = \mathcal{H}(\{i_{j_0}, i_{j_1}, \ldots, i_{j_D}\}).$$

where $i_{j_0}, \ldots, i_{j_D} \in I_P$. Each current simplex $I_j$ forms a domain of an affine map that maps into the flux simplex $$Λ_j = \mathcal{H}(\{λ_{j_0}, λ_{j_1}, \ldots, λ_{j_D}\}).$$

where $λ_{j_0}, \ldots, λ_{j_D} \in Λ_P$. The general position of the defining set of measurement points implies that the vertices of each simplex are linearly independent and full dimension (not degenerate).

In step three of creating a PWA map, subdomain coefficients ($L_j$ and $\psi_j$) are computed. Each simplex $I_j$ is defined by three vertices. One vertex $i_{j0}$ may be the support vector such that the origin may be moved $\bar{i}=i-i_{j0}$. In the shifted dimension, the simplex is defined by $$\bar{I}_j = H(0, \bar{i}_{j1}, \ldots, \bar{i}_{jD})$$

where $\bar{i}_{jk}=i_{jk}-i_{j0}$ ($k=\{1, \ldots, D\}$) span the simplex. Furthermore, the flux space is shifted by the corresponding flux vector $\bar{λ}=λ-λ_{j_0}$, which results in the simplex defined by $$\bar{Λ}_j = \mathcal{H}(0, \bar{λ}_{j_1}, \ldots, \bar{λ}_{j_D})),$$

where $\bar{λ}_{jk}=λ_{jk}-λ_{j0}$ ($k=\{1, \ldots, D\}$) span the simplex.

The nonzero vertices can be interpreted as a basis and since an affine map is an isomorphism, the relative position of a vector in the current and flux simplex is the same $$\bar{i} = a_1 \bar{i}_{j_1} + \ldots + a_D \bar{i}_{j_D}.$$

The α coefficients can be obtained similar to how space vector modulation (SVM) computes relative on-times. Then, $\bar{i}$ can be projected onto the basis of $\bar{I}_j$ $$p_{j_k} = proj_{\bar{i}_{j_k}} \bar{i} = \frac{\bar{i}_{j_k} \cdot \bar{i}}{\|\bar{i}_{j_k}\|},$$

and the relative length of the vector can be obtained by dividing the magnitude of the projections with the magnitude of the basis vectors $$a_{j_k} = \frac{\|p_{j_k}\|}{\|\bar{i}_{j_k}\|}$$

To find the flux vector $\bar{λ}$, we multiply $a_k$ with the basis vectors of $\bar{Λ}_j$ $$\bar{λ} = a_1 \bar{λ}_{j_1} + \ldots + a_D \bar{λ}_{j_D}.$$

Then, the motor flux results from shifting the origin. This computation can be simplified using vector notation, where the bases $\bar{I}_j$ and $\bar{Λ}_j$ are the respective matrices $$M_{\bar{\mathcal{I}}_j} = [\bar{i}_{j_1}, \ldots, \bar{i}_{j_D}],$$
$$M_{\bar{Λ}_j} = [\bar{λ}_{j_1}, \ldots, \bar{λ}_{j_D}]$$

and $a=[a_1, \ldots, a_D]^T$. Then, $\bar{i}=M_{\bar{I}_j}a$ and $\bar{λ}=M_{\bar{Λ}_j}a$ and, because the simplices are not degenerate, the bases are nonsingular, providing the linear relationship $$M_{\bar{Λ}_j}^{-1} \bar{λ} = M_{\bar{I}_j}^{-1} \bar{i},$$

which can be used to map current to flux and vice versa.

Substituting the original coordinates provides $$M_{\bar{Λ}_j}^{-1}(λ - λ_{j0}) = M_{\bar{I}_j}^{-1}(i - i_{j0}),$$

which results in the affine map $$λ = L_j i + \psi_j$$

where $L_j = M_{\bar{Λ}_j} M_{\bar{I}_j}^{-1} \bar{i}$ and $\psi_j = λ_{j0} - L_j i_{j0}$.

Figure 19A:
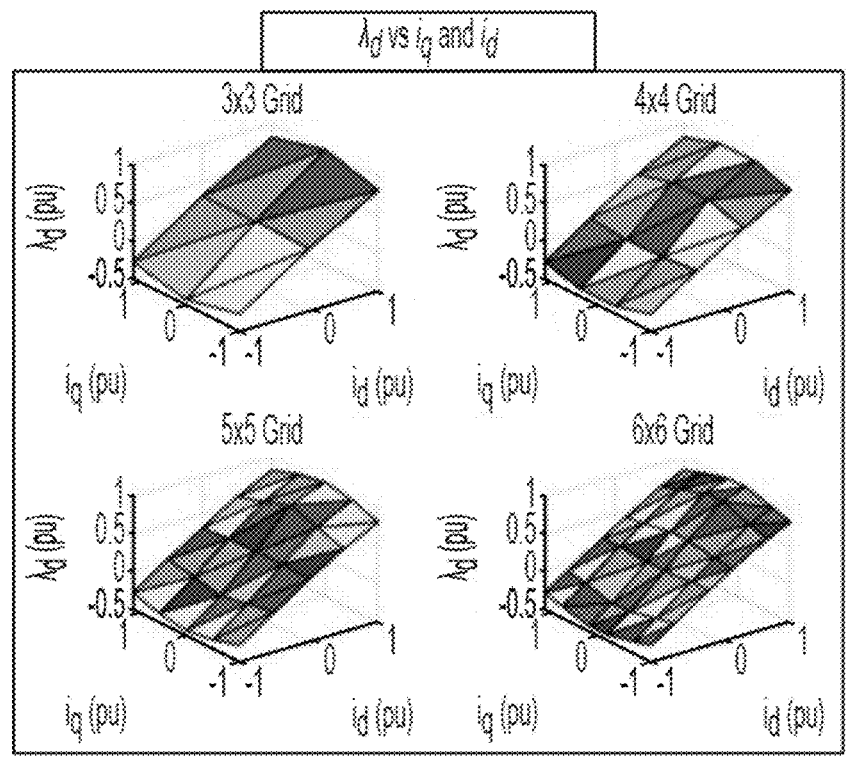
FIGS. 19A and 19B illustrate differently sized regularly-gridded PWA map functions according to some embodiments.
Figure 19B:
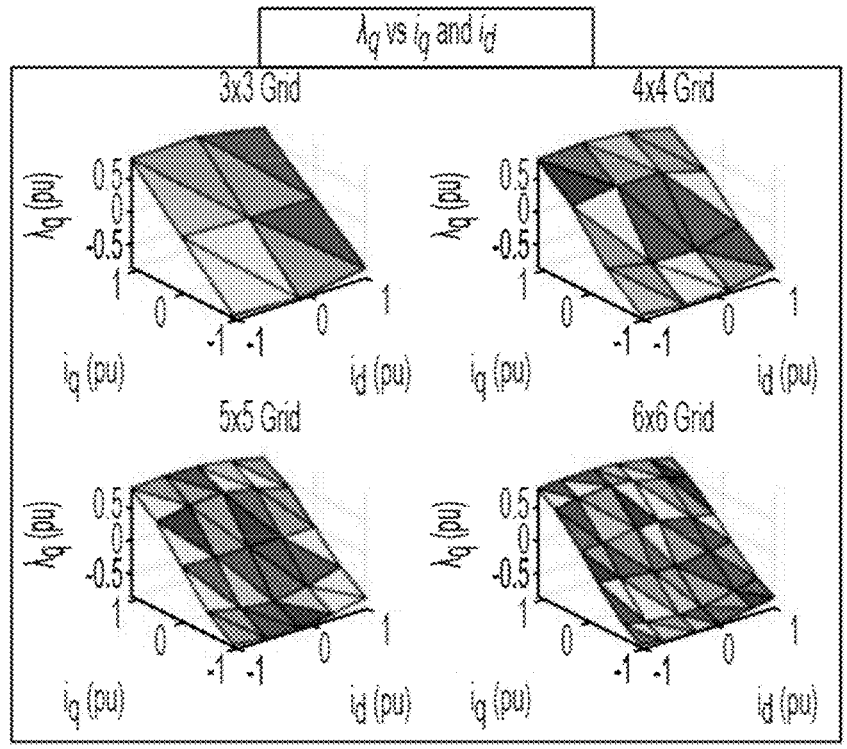

In step four of creating a PWA map (assigning coefficients to simplices), the coefficients $L_j$ and $\psi_j$ are assigned to their simplex $I_j$. Grouping all such functions produces the PWA map (magnetic model) for the motor 115 as a PM synchronous motor. Examples of differently sized regularly-gridded PWA map functions are shown in FIGS. 19A and 19B.

Magnetic Model Optimization

Figure 20:
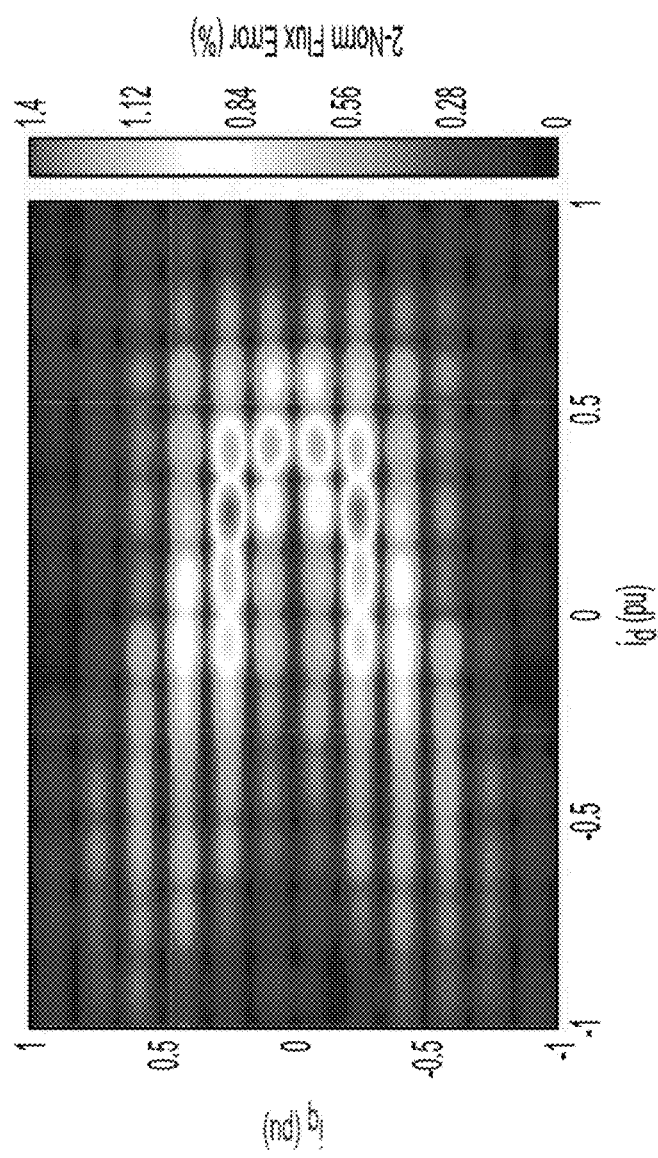
FIG. 20 illustrates an example of a 2-Norm flux error distribution for a 13×13 regularly gridded set of current points used to create a current-to-flux PWA map for a PM synchronous motor according to some embodiments.

As noted above, while a regularly gridded set of current points may be used in step one of creating a PWA map, in some examples, an irregularly gridded set current points is used. An irregularly gridded set of current points can be selected to optimize the PWA map. For example, the irregularly gridded set of current points can be selected to minimize flux error in the PWA map ($f_{PWA}$) for a certain number of points. Choosing the areas to minimize the flux error in $f_{PWA}$, by selectively choosing current points to use ($I_P$), may depend on the application. The 2-Norm flux error is a metric available to measure the flux error of a PWA map to a reference magnetic model (e.g., FEA spline) at any given point. An example of the 2-Norm flux error distribution using a 13×13 regularly gridded $I_P$ to create $f_{PWA}$ is shown in FIG. 20. The flux error may be the highest where the flux linkage is the most non-linear.

In some examples, a similar algorithm as described above with respect to FIG. 6 is employed by the electronic controller 400 (of FIG. 4) to identify an N-point optimized irregular gridded set of current points $I_P$ for use in generating the PWA map for the PM synchronous motor. This algorithm may select the current points $I_P$ to reduce or minimize the maximum 2-Norm flux error. In some examples, contrast to the algorithm in FIG. 4, the first set of current points in block 605 is chosen to be four (4) current points, corresponding to four (4) flux points, to provide the minimum number of points ($I_P$, $\Lambda_P$) to cover the full current domain I. This minimum number of current points (four) provides a square in the dq current space). Otherwise, the process 600 may be implemented in a similar manner to generate the PWA map from the N-point optimized irregular grid.

Three areas of interest are evaluated and explored using this technique: the full current range (I), the approximate MTPA trajectory region ($I_{MTPA}$), and the approximate derated current region ($I_{derated}$). I represents the absolute maximum current limits. $I_{derated}$ represents the typical rated or continuous current limit, where the $\|i_{dq}\| \le i_{rated}$ where in this case $i_{rated}$=0.75 pu. $I_{MTPA}$ is an area instead of a region to account for temperature variations in the PM synchronous motor parameters.

The PWA method of building a magnetic model may be evaluated by the flux error. In the following section, a PWA map ($f_{PWA}$) created using irregular optimized grids are evaluated. The current points used to construct the model are taken from a large pool of experimental data points, and the corresponding flux points were estimated using least squares approximation. For reference, an $f_{PWA}$ using a regularly-gridded full current space ($I_P$=1) is also used, denoted by I*. I* is constructed using square grids, i.e. 2×2, 3×3, . . . 6×6, so N=4, 9, . . . 36. The data for this section comes from an interior PM synchronous motor IPMSM. The magnetic model is compared against a high-fidelity, spline-interpolated magnetic model, denoted as $f_S$, and built using many FEA data points.

Figure 21:
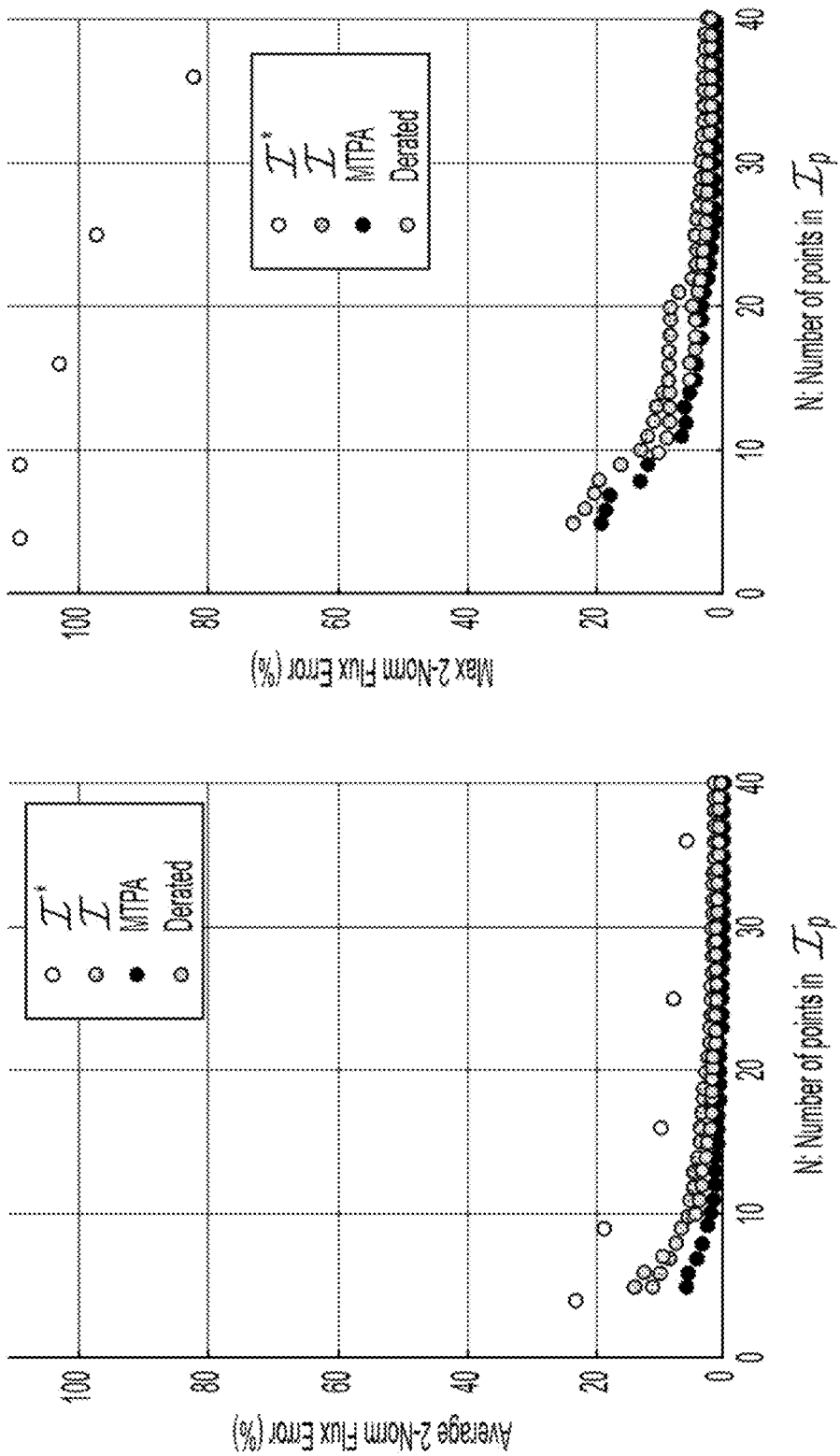
FIG. 21 illustrates average and maximum 2-Norm flux error for different current sets used to create a current-to-flux PWA map for a PM synchronous motor according to some embodiments.

The flux error in a magnetic model corresponds to an error to the state space model of the system and the torque. The 2-Norm flux error between $f_{PWA}$ using irregular optimization algorithm, described above and with respect to FIG. 6, and $f_S$ can be evaluated by sampling many random current points i∈I. The average and maximum of this error within the optimized regions for various values of N is shown in FIG. 21. Among the irregular optimized functions: the error is the smallest for the MTPA region, as this is the smallest region by area, and the error is the largest for I, as this is the largest area. It can be seen that the average and maximum error of I* (regularly-gridded) is significantly worse, by margins of ≈5-10% and ≈80-100% respectively.

The error distribution in these magnetic models is not even. As an example, functions using 36-point (6×6) regularly-gridded current points (I*) and 40-point irregularly-gridded functions (I, $I_{MTPA}$, $I_{derated}$) are shown in FIG. 21. The simplicial mesh $I_M$ comprised of all simplices I, is shown in the top row, the placement of points in $I_P$ by the above-noted optimization algorithm for each of these functions is shown in the middle row, and the 2-Norm flux error distribution is shown in the bottom row. The 2-Norm flux error is minimized in the region of interest, which is apparent in the low flux error, especially for $I_{MTPA}$ and $I_{derated}$.

Figure 22:
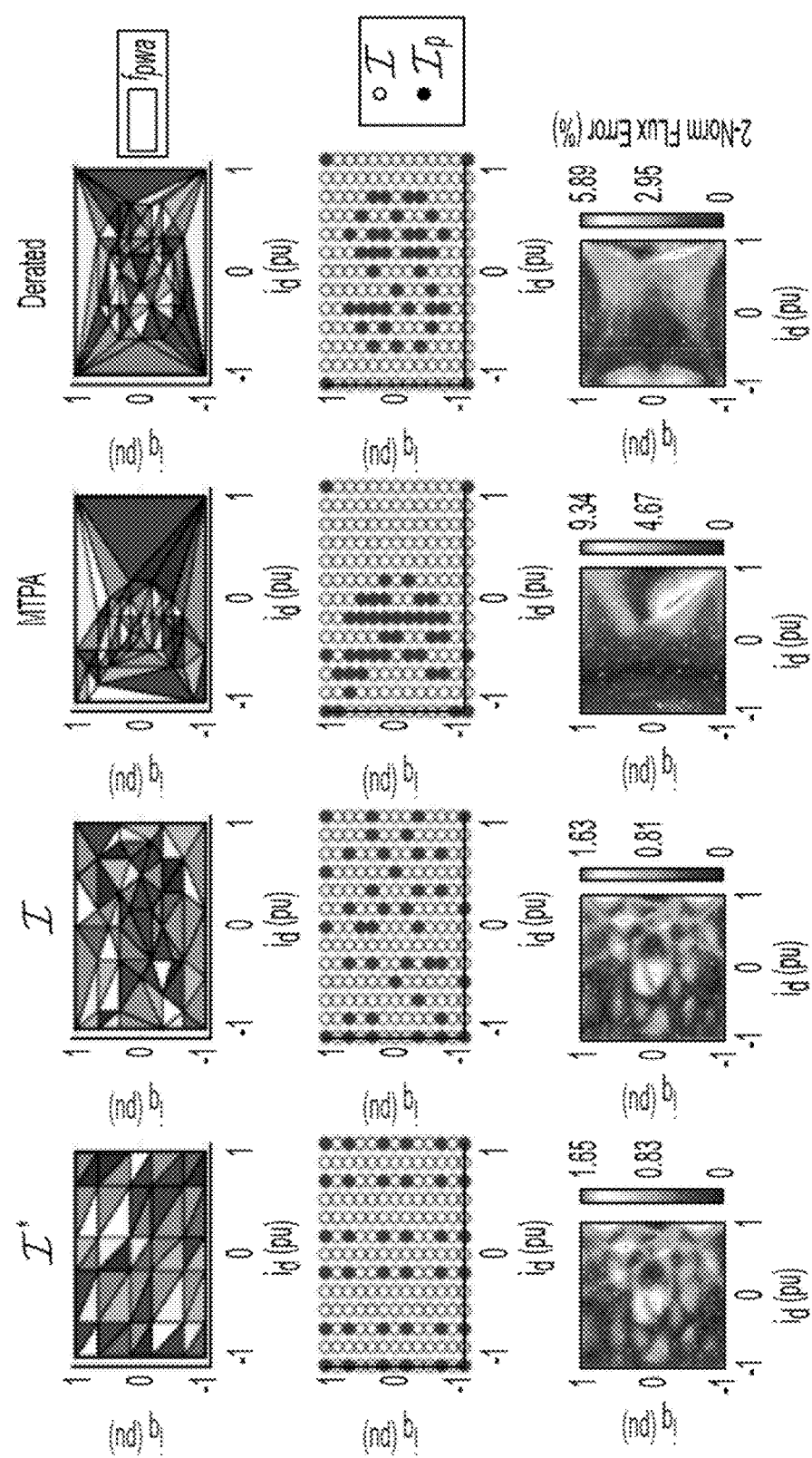
FIG. 22 illustrates a simplicial mesh, current point placement, and 2-Norm flux error distribution for different current-to-flux PWA maps for a PM synchronous motor according to some embodiments.

FIG. 22 illustrates information about the three irregularly-gridded magnetic models and the regularly gridded magnetic model, each in a respective column. More particularly, in the top row, a simplicial mesh $I_M$ comprised of all simplices I, is illustrated for each magnetic model. The middle row illustrates placement of points in $I_P$ by the optimization algorithm for each magnetic model. The bottom row illustrates the determined 2-Norm flux error distribution for each magnetic model. The first column is directed to the PWA map generated using regularly-gridded current points covering I; the second column is directed to the PWA map generated using irregularly-gridded current points optimizing I; the third column is directed to the PWA map generated using irregularly-gridded current points optimizing $I_{MTPA}$; and the fourth column is directed to the PWA map generated using irregularly-gridded current points optimizing $I_{derated}$.

Accordingly, using one or more of the various techniques described herein to generate a PWA map for a PM synchronous motor, the PM synchronous motor system 1800 of FIG. 18 provides a motor controller 120 that uses a current-to-flux linkage PWA map (e.g., PWA map 1810 and/or PWA map 1815) to control the motor 115. As described, these PWA map(s) may be generated based on regularly gridded current space or based on an irregularly gridded current space. Further, these PWA map(s) generated based on irregularly gridded current space may have higher current point density in areas with nonlinear behavior, which may increase the accuracy of the map, and/or lower current point density in areas of linear behavior, which may decrease the overall size of the map (reducing memory space used to store the map on the motor controller 120 or elsewhere). These PWA map(s) also enable a more precise or accurate translation between current and flux domains, and the inversion of the related matrices. Further, the PWA map(s) also allow not just for a more accurate motor model with less points, but also the ability to optimize the—in some embodiments, irregular—points required to describe or represent a given machine for a desired accuracy or operation.

As noted above, the motor system 1800 may be used to implement one or more of the methods 300, 950, and 1700. In other words, as noted above, a PM synchronous motor may be used in conjunction with these methods 300, 950, and 1700.

For example, with reference back to the method 300 of FIG. 3 in conjunction with the system 1800 of FIG. 18, in block 305, the motor controller 120 of the system 1800 determines current values for the PM synchronous motor 115 in a rotational reference frame, such as the DQ reference frame. Each current value is associated with a dimension (or axis) of a set of dimensions of the DQ reference frame. For example, as described with respect to system 100 of FIG. 2, the motor controller 120 of the system 1800 may determine electrical operational characteristics of the motor 115 in a stationary reference frame; determine a rotational position of the motor 115 (e.g., of the rotor of the motor 115); and transform the electrical operational characteristics and the rotational position to the current values for the motor 115 in the rotational reference frame via Clark-Park transform block 1817.

In block 310, the motor controller 120 of the system 1800 is configured to determine, based on the current values, a flux linkage value for each dimension of the set of dimensions of the rotational reference frame using a piecewise affine map. For example, the motor controller 120 is configured to determine flux linkage values $\lambda_{dq}$ using the PWA current-to-flux linkage map 1815. In some examples, as described above with respect to the system 100 of FIG. 2, the motor controller 120 of FIG. 18 may first identify on which simplex (or domain) of the PWA map 1815 the current value resides, and then use the particular affine function associated with the identified simplex to calculate the flux linkage.

In block 315, the motor controller 120 is configured to determine a target flux linkage value for each dimension of the set of dimensions of the rotational reference frame. For example, the motor controller 120 is configured to determine target flux linkage values $\lambda^*_{dq}$. To determine the target flux linkage values, the motor controller 120 may determine a desired control parameter (e.g., motor torque (T*) or motor speed (not shown)) for the motor 115. The desired control parameter (e.g., motor torque (T*) or speed) may also be referred to as a motor command, and may be provided by an input device as described above. The motor controller 120 may then, using the reference generation block 1820, transform the desired control parameter to target current values for the motor in the rotational reference frame (e.g., $i^*_{dq}$). For example, the motor controller 120 may use the reference generation block 1820 in the form of a lookup table (e.g., stored in the memory 130) that maps potential values for the desired control parameter T* to the target current values. The lookup table may be populated in advance based on experimental data. The motor controller 120 may then determine, based on the target current values, the target flux linkage value for each dimension of the set of dimensions of the rotational reference frame using the piecewise affine (PWA) map 1810. The motor controller 120 may use the PWA map 1810 to determine the target flux linkage values based on the target current values in a similar manner as the PWM map 1815 is used to determine the flux linkage values based on the current values. The two PWA maps 1810 and 1815 illustrated in FIG. 18 may be duplicate PWA maps, or the motor controller 120 may use one PWA map for both the actual values and the target values (i.e., although two PWA maps are illustrated, in some embodiments, one shared PWA map is included instead).

In block 320, the motor controller 120 is configured to control the power switching network based on the flux linkage values and the target flux linkage values. In some embodiments, the motor controller 120 may generate control signals in the stationary reference frame to drive the motor 115 based on a difference between the target flux linkage value and the flux linkage value for the dimension. For example, the virtual flux controller 1805 may compute the difference value, or the motor controller 120 may include a difference block, similar to the difference block 235 of FIG. 2, to determine a difference between each flux linkage value and target flux linkage value for each respective dimension of the set of dimensions of rotational reference frame (e.g., D and Q dimensions, optionally Null dimension). The motor controller 120 (e.g., via the virtual flux controller 1805) may then generate a voltage command for each dimension of the set of dimensions of the rotational reference frame based on the difference value and the rotational position. For example, the flux controller 240 may output voltage commands $V_d$ and $V_q$ (also referred to collectively as $V_{dq}$ or $u^*_{dq}$).

The motor controller 120 may then transform the voltage commands from the rotational reference frame to the stationary reference frame. For example, the motor controller 120, using the inverse Clark-Park transform block 1845, may perform an inverse Clark-Park transform on the voltage commands $V_{dq}$ to generate voltage commands $V_a$, $V_b$, and $V_c$ (also referred to collectively as $V_{abc}$) in the stationary reference frame. The motor controller 120 may then, using PWM generation block 1850, in a similar manner as the PWM generation block 250 of FIG. 2, to generate a pulse width modulated control signal for each dimension of the stationary reference frame to control the power switching network 205 to drive a stator of the motor.

When in a motor operational mode, based on the control signals, the motor drive circuit 110 is controlled to apply power from the power supply 105 to the motor 115 to drive rotation of the motor 115. Similarly, when in a generator operational mode, based on the control signals, the motor drive circuit 110 is controlled to apply electric power from the motor 115 to the power supply 105 (e.g., to charge the power supply) and/or to another electrical load.

As noted above, the motor system 1800 may also be used to implement the method 950. With respect to the method 950 of FIG. 9B, in conjunction with FIG. 18, in block 955, the motor controller 120 of the system 1800 determines current values for the PM synchronous motor 115 in a rotational reference frame, such as the DQ reference frame. The motor controller 120 of FIG. 18 may perform this block 955 in a similar manner as the motor controller 120 of FIG. 18 performs block 305 of FIG. 3.

In block 960, the motor controller 120 of FIG. 18 determines, based on a desired control parameter (e.g., a desired motor torque value (T*)), a target motor control parameter value for each dimension of the set of dimensions of the rotational reference frame using a first piecewise affine map. The motor controller 120 may then apply the MTPA function block 1820, implementing a PWA map, to the desired control parameter. In some examples of the system 1800 of FIG. 18 implementing the process 950, the MPLPT function block 905 of FIG. 9A (described above) may serve in place of the MTPA function block 1820, albeit modified to output target current values in the DQ reference frame ($i^*_{dq}$), without a rotor field target current $i^*_r$. As described above, the MPLPT function block 905 may implement a PWA map, and translating an input desired control parameter to target motor control parameter value using the PWA map may be performed in a similar manner as described above with respect to FIGS. 9A-9B. In some examples, the output current value of the MPLPT function block 905 or MTPA function block 1820, as the case may be, is an intermediate target motor control parameter value that is then further translated to a (final) target motor control parameter value by the current-to-flux linkage map 1810. In other examples, such as where the controller 1805 of FIG. 18 is a current-based controller rather than a flux-based controller, or where the MPLPT function block 905 or MTPA function block 1820 is configured to map reference torque (T*) directly to a target flux value ($\lambda^*$), the output current value of the MPLPT function block 905 or MTPA function block 1820 is the (final) target motor control parameter value.

In block 965, the motor controller 120 of the system 1800 controls the power switching network based on the current values (e.g., received directly or after translation to flux values via flux linkage map 1815) and the target motor control parameter values (e.g., received directly or after translation to target flux values via flux linkage map 1820). The motor controller 120 of FIG. 18 may then perform this block 965 in a similar manner as the motor controller 120 of FIG. 18 performs block 320 of FIG. 3, based on the received values (e.g., $\lambda_{dq}$, $\lambda^*_{dq}$, $\theta$ or $\lambda_{dq}-\lambda^*_{dq}$ and $\theta$), and outputting voltage commands to inverse Clark-Park transform block 1845.

As noted above, the motor system 1800 may also be used to implement the method 170. With respect to the method 1700 of FIG. 17, in conjunction with FIG. 18, in block 1705, the motor controller 120 of the system 1800 determines current values for the PM synchronous motor 115 in a rotational reference frame, such as the DQ reference frame. The motor controller 120 of FIG. 18 may perform this block 1705 in a similar manner as the motor controller 120 of FIG. 18 performs block 305 of FIG. 3.

In block 1710, the motor controller 120 determines, based on a desired control parameter, a target motor control parameter value for each dimension of the set of dimensions of the rotational reference frame. The motor controller 120 of FIG. 18 may perform this block 1710 in a similar manner as the motor controller 120 of FIG. 16 performs block 1710 of FIG. 17. For example, the motor controller 120 of FIG. 18 may receive the desired control parameter (e.g., T*) and translate the desired control parameter to target motor control parameter values (e.g., $\lambda^*_{dq}$) via blocks 1810 and 1820.

In block 1715, the motor controller 120 controls the power switching network based on the current values and the target motor control parameter values by using a piecewise affine map that was defined by offline solving of a model predictive control algorithm using sample inputs. For example, in some scenarios, the virtual flux controller 1805 implements a model predictive control (MPC) algorithm to generate the control signals (e.g., voltage commands ($V_{dq}$)), based on the received or determined difference values (e.g., $\lambda^*-\lambda$) and the rotational position of the motor ($\theta$). The controls are based on the current values and the target motor control parameter values at least because the MPC controller 1805 generates the controls based on the flux values ($\lambda$), which was determined based on the current values (e.g., $i_{abc}$, $i_{dq}$) and based on the target flux values ($\lambda^*$) (a target motor control parameter value).

The MPC algorithm includes an MPC optimization problem or equation, as described in further detail in below with respect to PM synchronous motor implementation. In some examples, the MPC controller 1605 implements "explicit MPC." In such examples, in advance of execution of the process 1700, the MPC optimization problem is solved offline and a control law is generated therefrom and stored on the MPC controller 1805. Then, in block 1715, during real-time operation of the motor 115, the control law is accessed and implemented to control the motor 115. For example, the MPC optimization problem (e.g., described below) is solved for all or a subset of possible inputs offline, which is then used to generate a piecewise affine map (an "MPC PWA map") that is stored on the controller 120 (e.g., as part of the MPC controller 1805) in advance of motor operation. The MPC PWA map defines a plurality of domains, each with an associated control law. In real time during operation of the motor, the MPC controller 1805 receives measurements (e.g., the received difference values and the rotational position of the motor ($\theta$)), which dictates which domain of the MPC PWA is active. The MPC controller 1805 thus identifies the active domain and the feedback control law associated with the active domain. The MPC controller 1805 then generates control signals (e.g., voltage commands ($V_{dq}$) using the identified control law.

MPC Controller for PM Synchronous Motor Using PWA Map(s)

In some examples of the PM synchronous motor system 1800, which may use one or more current-to-flux linkage PWA maps generated for the PM synchronous motor as described above, the virtual flux controller 1805 is implemented as an MPC controller. In such cases, the virtual flux controller 1805 may be referred to as the virtual flux MPC (VF-MPC) controller 1805. The VF-MPC controller 1805 may use the outputs of one or both of the above-described current-to-flux linkage PWA maps 1810, 1815, and may implement model predictive control (MPC) to these outputs to ultimately generate control signals for controlling the motor 115. At least in some examples, use of MPC-based control by the VF-MPC controller 1805 to control a PM synchronous motor (e.g., motor 115) and using current-to-flux PWA maps results in a reduction of flux and torque error (e.g., by an order of magnitude) throughout full machine operation.

In general, MPC is a control method for PM synchronous motors that provides multi-input and multi-output capabilities, an ability to handle nonlinear systems, desired stability properties, and capability for real-time application in microcontrollers (MCUs). As discussed above with respect to WFS motors, MPC solves a constrained finite time optimal control (CFTOC) problem at every control step. In electric motors, MPC implementations may be direct-torque control (MP-DTC), and direct-speed control (MP-DSC), current control, and voltage control.

The CFTOC problem can be solved and an actuation action applied every control cycle via a modulation scheme such as Space Vector Modulation (SVM) or Pulse Width Modulation (PWM). This technique is called Convex Control Set MPC (CCS-MPC). Conversely, an actuation step may be applied only when certain criteria are met, i.e., the error exceeds a certain amount. This technique is called Finite Control Set MPC (FCS-MPC). CCS-MPC is asymptotically stable while FCS-MPC can be shown to be set stable (error bounded).

Non-linear flux-linkage that arises from saturation and cross-saturation effects, due to a state space model becoming nonlinear, can lead to an MPC controller with inefficient operation of a PM synchronous motor at full-power. Virtual flux MPC (VF-MPC) of PM synchronous motors is a control method that uses the flux of the motor as the state variable, utilizing a current-to-flux transform and the $\alpha\beta$ transform on flux to create a sinusoidal tracking MPC problem, or flux error to create an MPC regulation problem. The separation of the magnetic model $f(i)$ from the control allows for more advanced and accurate magnetic models to be used, such as piecewise affine (PWA) magnetic models as described above. PWA magnetic models (MMs) share many of the same advantageous properties as linearized maps, including linearity, bidirectionality, and continuity, and additionally can capture saturation and cross saturation effects. These advantages translate to efficiency gains, as the controller is able to more accurately bring the motor to the desired reference point (by MTPA or flux weakening), otherwise having a steady-state offset. Offline MMs may be built using machine datapoints from analytical calculations, FEA analysis, and experimentation (or a combination thereof), and may be interpolated via linear interpolation, Hermite spline interpolation, polynomials, and/or piecewise nonlinear.

Relative to online parameter estimation methods, use of offline PWA MMs can reduces the computation load for an MPC controller.

In some examples of the system 1800 provided herein, the MPC controller 1805 is a VF-MP-DTC controller that uses an offline PWA MM to control a PM synchronous motor (e.g., the motor 115). Generation of offline PWA MM models for a PM synchronous motor, including regularly gridded and irregularly gridded PWA maps, is described above in further detail. In other examples, the MM may be a linear model, which may be less accurate than a PWA MM model as described. The linear model, such as nameplate magnetic models or optimized linear magnetic models, may have the form $$\lambda_{dq} = Li_{dq} + \psi_{PM}$$

where $$L = \begin{bmatrix} L_d & 0 \\ 0 & L_q \end{bmatrix}, \psi_{PM} = \begin{bmatrix} \psi_d \\ 0 \end{bmatrix}.$$

By this definition, the mutual flux of the machine is neglected (non-diagonal terms of L) and the small but non-negligible (in saturation) $\psi_q$ is also neglected. The map $f(i)$ is approximated as a plane, i.e., convex, when in reality $f(i)$ is non-convex and L and $\psi_{PM}$ can change by large margins throughout $i \in I_P$.

In some examples involving MPC control, the αβ reference frame may be used instead of the dq reference frame because, in the αβ reference frame, the state equation has no dependence on speed ω and is linear. Accordingly, while the PM synchronous motor model described above still applies, an αβ dynamic model for the PM synchronous motor may be modeled by the discrete first order ordinary differential equation $$\lambda_{\alpha\beta}^+ = \lambda_{\alpha\beta} + T_s v_{\alpha\beta}$$

where $v_{\alpha\beta}$ is the compensated voltage $v_{\alpha\beta} = v_{\alpha\beta,terminal} - R_s i_{\alpha\beta}$, and the $^+$ superscript indicates next step. All terms can be normalized by the constant $\Lambda_{const} = T_s v_c$ to be $$\overline{\lambda}_{\alpha\beta}^+ = \overline{\lambda}_{\alpha\beta} + \overline{v}_{\alpha\beta}$$

where the "—" superscript indicates compensated (voltage) or normalized (flux).

The torque of the a PMSM is the cross product of the current and the flux multiplied by pole pairs and a constant $$T = \frac{3}{2} p i'_{dq} J \lambda_{dq}$$

where J is the cross-coupling matrix $$J = \begin{bmatrix} 0 & -1 \\ 1 & 0 \end{bmatrix}$$

The state space system for the PM synchronous motor system 1800 may be modelled as a regulation problem instead of a sinusoidal tracking problem by using the state vector $$x = \overline{\lambda}_{\alpha\beta} - \overline{\lambda}_{\alpha\beta}^*$$

and the input can be the voltage $$u = \overline{v}_{\alpha\beta} - \overline{u}$$

where $$\overline{u} = -(\overline{\lambda}_{\alpha\beta} - \overline{\lambda}_{\alpha\beta}^*)$$

In this way, the state space equation becomes $$x^+ = x + \overline{u},$$

and $\overline{v}_{\alpha\beta}$ is the sum of u (feedback controller) and $\overline{u}$ (feedforward controller).

Turning to constraints, the current limits of a machine may be defined by a continuous current and maximum current. The continuous current represents the current that the machine can run at steady state for a prolong period of time and is limited by the thermal effects of copper loss $i^2 R_s$, $$\mathcal{I}_{cont} = \{i_{dq} \in \mathbb{R}^2 \mid i_{dq} \leq \|i_{dqr}\|\},$$

and traces a circle or ellipse in the dq current plane. $i_{dqr}$ is the rated current value in the dq plane. The maximum current is the maximum current that the machine can handle in transient operation, i.e., for short periods of time, $$\mathcal{I}_{max} = \{i_{dq} \in \mathbb{R}^2 \mid i_{dq} = i_{dqr}\},$$

and traces a square or rectangle in the dq current plane. The rated current may be set to the maximum current ($\mathcal{I}_r = \mathcal{I}_{max}$).

The rated flux set $\Lambda_r$ is any flux that when mapped back to current using the inverted magnetic model $i_{dq} = g(\lambda_{dq})$ is in the rated current set:

$$\Lambda_r = \{\lambda_{dq} \in \mathbb{R}^2 \mid g(\lambda_{dq}) \in \mathcal{I}_r\}.$$

If $f(i_{dq})$ is fully linear, $\Lambda_r$ may be a rectangle, but with saturation effects included, $\Lambda_r$ may be a bulged rectangle in the dq current plane. The rated flux value, $\lambda_{dqr}$, may be defined to be the flux at the intersection point of the MTPA trajectory with the rated current set.

The voltage constraint in this problem can either be CCS constrained by $V_s$ or FCS constrained by $V_d$ depending on the MPC implementation. The FCS voltage constraint $V_s$ is limited to the six discrete states of the voltage source inverter (VSI) in the αβ frame $$V_s = C \circ \{0, 1\}^3 = \{v_{000}, v_{100}, \ldots, v_{111}\},$$

While the CS voltage constraint $V_d$ can be any interior point of the six states in the αβ frame, or convex hull H of $V_s$, where $V_d = H(V_s)$.

Model Predictive Control for PM Synchronous Motor

Model Predictive Control (MPC) or Receding Horizon Control (RHC) is a control method that solves a constrained finite time optimal control (CFTOC) problem to compute an optimal trajectory of states and inputs length N (prediction horizon) control cycles in the future, and then implements the first input. In this problem, the state is the flux error $x = \bar{\lambda}_{\alpha\beta} - \bar{\lambda}_{\alpha\beta}^*$ the input is the compensated voltage $u = = \bar{v}_{\alpha\beta} - \bar{u}$, and the state space model is $x^+ = x + \bar{u}$. The state being measured or estimated is $x_0$ and the desired state is $x_N$, the CFTOC output is a set of control inputs of length N denoted $U_{0 \to N}$, and the corresponding set of states is denoted $\lambda_{0 \to N}$, $$\mathcal{U}_{0 \to N} = \{u_0, \ldots, u_{N-1}\}, \mathcal{X}_{0 \to N} = \{x_0, \ldots, x_{N-1}\},$$

which, when implemented, will bring the state to a terminal region $x \in X_f$ defined by $$\mathcal{X}_f = x^* + \epsilon, \epsilon \in \mathbb{R}^2$$

This is a regulation problem, so the desired state is $x^*=0$. A cost function $J_0(x_0, u_0)$ assigns a cost to a trajectory of states and inputs beginning at $(x_0, u_0)$ with length N by $$J_0(x_0, u_0) \triangleq x_N' P x_N + \sum_{k=0}^{N-1}(x'Qx + u'R)$$

where P defines the terminal cost quantity and penalizes how close the final state is to 0, Q defines the stage cost quantity and penalizes the sum of change in state, and R penalizes the sum of change in voltage (minimizing switching losses in FCS-MPC). The $\alpha$ and $\beta$ components of x and u should be penalized equally, thus $P=Q=R \triangleq I$.

The optimization problem is $$J_0^*(x) = \min_{\mathcal{U}_{0 \to N}} J_0(x_0, \mathcal{U}_{0 \to N}),$$

$$\text{subj. to } x_{k+1} = x_k + u_k$$

$$\lambda_k \in \Lambda_r, \bar{v}_k \in \mathcal{V}_\&$$

$$x_N \in \mathcal{X}_f,$$

where $k=\{0, \ldots, N-1\}$, where the cost $J_0^*(x)$ minimization is subject to the three listed constraints. The first constraint constrains the states to obey the state equation, the second constraint constrains the flux to machine rated flux and the compensated voltage to the CCS voltage constraint (replace with Vd when using FCS-MPC), and the third constraint constrains the final state to the terminal region. The solution to the optimization problem is a set of optimal inputs $U_{0 \to N}^*$, and states $\lambda_{0 \to N}^*$ with cost $J_0^*(x)$. The first solution of the trajectory is the input to the system, and at the next sampling period, the CFOTC problem is re-solved and first input of the new trajectory is the input to the system.

In testing, four magnetic models, two linear and two PWA, were evaluated offline to estimate the flux error of each model with MPC based control, such as may be implemented by the MPC controller 1805. The MPC regulation controller, such as described herein, was formulated utilizing a cost function and prediction horizon in the $\alpha\beta$ frame. The PWA magnetic models proved to decrease flux and torque error in steady state experiments (T=0-0.8 p.u., $\omega$=1-3 p.u.) and transient experiments ($\omega$=3 p.u. speed step, T=1 p.u. torque step) by an order of magnitude consistently compared to the linear MMs.

Additional Dimensions

In several examples discussed herein, a PWA map, such as the PWA maps 220 or 225, maps motor current to flux. In some further examples, such PWA maps incorporate additional dimensions corresponding to additional motor characteristics, for example, rotor rotational speed ($\omega$), rotor rotational acceleration, motor temperature, or the like. For example, the PWA map 220 (and/or another of the disclosed current-to-flux PWA maps) may receive as input a motor current (e.g., $i_{f,dq}$) as well as one or more other motor characteristics (e.g., rotor rotational speed, position, or acceleration, motor temperature, or the like) as additional dimensions. The one or more other motor characteristics may be determined by the motor controller 120, for example, by direct sensing via an associated sensor, or indirectly by calculating or inferring based on another sensed motor characteristics. The PWA map may map or correspond the inputs to a flux (e.g., $\lambda_{f,dq}$) that is output by the PWA map. That is, the PWA map may map a set of input values to an output flux linkage value for each dimension of a rotational reference frame, where the set of input values includes the current values (e.g., $i_{f,dq}$) and at least one additional motor characteristic (e.g., rotor rotational speed, rotor rotational acceleration, motor temperature, or the like).

More specifically, as previously discussed above, the PWA map includes a plurality of affine functions, each of the plurality of affine functions associated with a respective domain of a plurality of domains. To obtain a flux linkage from a set of inputs to the PWA map, a controller (e.g., the motor controller 120) may identify a first domain corresponding to the set of inputs and selected from the plurality of domains. The first domain is associated with a first affine function of the plurality of affine functions. Then, the controller may apply the set of inputs (i.e., the current values and one or more additional motor characteristics) to the first affine function to determine the flux linkage value for each dimension of the rotational reference frame. In some examples, each of the plurality of domains associated with respective affine functions) corresponds to a simplex that was provided by executing a domain decomposition algorithm on a data set of input-output pairs for a plurality of operational points of the motor. Here, the input of each input-output pair includes, for an operational point of the motor, current values and the one or more additional motor characteristics, and the output includes the corresponding flux linkage value.

As another example, rotor position ($\theta$) may be an additional motor characteristic corresponding to an additional dimension of the PWA map. For example, the relationship between flux linkage, inductance, current, and/or torque may be relevant for a desired motor operating characteristic, e.g., slot-passing effects, which introduce torque ripple and variations in BEMF when in motion. In a PMSM, there may be two degrees of freedom for a given datapoint of five variables: $i_d$, $i_q$, $\lambda_d$, $\lambda_q$, and torque. By specifying any two variables, the other three variables may be uniquely determined by the physics-based relationship, commonly modeled through FEA. To incorporate position, each datapoint now has six variables, $\theta$, $i_d$, $i_q$, $\lambda_d$, $\lambda_q$, and torque, where three independent parameters are known or specified, with the remaining three variables uniquely determined by the physics-based relationship. Other quantities can be included in the dataset, for example efficiency, conduction loss, etc., but these other quantities may either derived from these existing quantities, or deemed negligible for the controls or modeling problem statement.

In some examples, motor speed ($\omega$) may be beneficial as an additional motor characteristic corresponding to an additional dimension because other system losses may be a function of speed ($\omega$) and may influence which combination of winding currents and flux linkages result in the most desirable operating state, e.g., efficiency. In such a case, the complete operating point may be specified by the eight-dimensional point $\omega$, $i_d$, $i_q$, $\lambda_d$, $\lambda_q$, torque, $p_{loss\ core}$, $p_{loss\ conduction}$, but the operating point is uniquely identified or specified by any three variables, with the other five variables being constrained by the physics-based relationship and/or synthetic metric that forms the desired figure-of-merit.

In some examples involving a wound-field machine with a single-phase rotor, relative to the above PMSM examples, one additional degree of freedom is introduced, but two additional parameters come with that degree of freedom: $i_r$, and $\lambda_r$.

By including the additional dimensions in the PWA map, in addition to current, the PWA map may have an improved accuracy. In other words, in this example, the flux output by the PWA map may be a more accurate representation of the actual flux of the motor 115. In contrast to other techniques, additional dimensions can be added to the PWA map technique without increasing the computational complexity to the point of being impractical. That is, the PWA map may incorporate additional dimensions and still be practicably implemented on a motor controller having typical processing and memory resources. Additionally, in some further examples, the disclosed PWA maps that map motor flux to current are modified to similarly include one or more additional dimensions (e.g., one or more additional motor characteristics) to increase the accuracy of the current output by the PWA maps.

As should be understood from the discussion throughout the present disclosure, although some embodiments include an MPC controller (e.g., MPC controller 1605) implementing model predictive control, some embodiments use other flux, current, or model-based controllers as part of the motor controller 120. That is, the PWA maps described herein may be used with any flux, current, or model-based controller (or control method). Use of the PWA maps may, for example, reduce space, increase accuracy of the motor or plant model, and/or increase performance of the controller (e.g., better dynamics, reduced error, better reference generation, etc.). Examples of such flux, current, or model-based controllers include the MPC controller, PID controller, any model-based controllers that use a lookup table of currents, and the like. The related calculations for the PWA maps may be performed online or offline.

As also should be understood from the discussion throughout the present disclosure, various features from any of the disclosed motor systems and methods may be included in other ones of the disclosed motor systems and methods. For example, the motor system 100 of FIG. 1 may include the motor 115 in the form of any of a WFS motor, PM synchronous motor, hybrid synchronous motor, universal motor, induction motor, reluctance motor (synchronous or switched), or another motor type, and the motor controller 120 may further include or implement any combination of current-to-flux PWA maps (e.g., similar to maps 220, 225, 1610, 1615, 1810, or 1815), current-to-inductance PWA maps (e.g., similar to map 2320), MPLPT or MTPA reference generation (e.g., similar to blocks 905 or 1820), and/or MPC flux controllers (e.g., similar to MPC flux controller 1605 or 1805).

The underlying models for WFS motors and PM synchronous motors were described above, and the WFS motor model may also apply to the hybrid synchronous motor. Similar models may be used to describe or define other types of motors (e.g., universal motors, induction motors, reluctance motors (synchronous and switched), etc.), updated for the particulars of each motor type. These models may be used to generate, in similar ways as described above, one or more of: the current-to-flux PWA maps (e.g., similar to maps 220, 225, 1610, 1615, 1810, or 1815), MPLPT or MTPA reference generation maps (e.g., similar to blocks 905 or 1820), and/or MPC flux controllers (e.g., similar to MPC flux controller 1605 or 1805) for use in operation with such other types of motors. For example, a universal motor model can include: stator d-axis current, stator q-axis current, stator z-axis current (in the case of a star connection), rotor d-axis winding current (in the case of wound rotor machines and externally fed induction machines), rotor q-axis winding current (in the case of externally fed induction machines), rotor d-axis damper winding (in the case of squirrel cage induction machines and line start machines), rotor q-axis damper winding (in the case of squirrel cage induction machines and line start machines), and stator x-y-axis (in the case of multiphase machines, the machines have may have additional x-y axes depending on number of phases). Additionally, every current dimension can have a related flux and voltage. In general, the d-axis is aligned with the magnetic axis of the magnetic field. Stated another way, a universal motor model may include a D-axis, Q-axis, and Null-axis for all independent bodies within the system, each in electromagnetic communication through the D-axis, and the capability to contribute to torque via the Q-axis. Changes to the D-axis on one component results (A) in a change in stored electromagnetic energy that can be sensed/influenced on the D-axis of another component and (B) influences the torque that can be generated in the system. Changes to the Q-axis on one component results in a torque, but does not result to a change in magnetic field energy that can be detected/influenced by the other system components. Changes in the Null-axis are in the "null space" of the DQnull system: they do not influence common magnetic field energy or torque resulting from that field. Within this "null space", one or more other DQnull systems may exist. Damper bars are one such example: they have a current, and resulting magnetic field, that is not directly sensed by the main rotor or stator winding system, but which results in a counter-torque to eliminate ripple in the net torque that arises from slot-passing effects of the main RDQ currents/field.

In some examples, the motor controller 120, in any of its various configurations described herein (see, e.g., FIG. 2, 9A, 16, 18, or 23) is implemented as a set of instructions stored on a nontransitory computer readable medium, where the instructions are for execution by a processor. Further, the processor may be configured to (or may be connected to another device configured to) simulate a motor, power supply, and power switching network (simulating an arrangement similar to, for example, the arrangement in FIG. 2, 9A, 16, 18, or 23). Accordingly, the processor, through execution of the set of instructions, may be configured to monitor and control a motor where the motor is a simulated motor coupled to a simulated power supply via a simulated power switching network.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

Further Examples Having a Variety of Features

The disclosure may be further understood by way of the following examples:

Example 1: A method, apparatus, and non-transitory computer-readable medium for motor control comprises: determining, by an electronic controller, current values for a motor in a rotational reference frame, each current value associated with a dimension of a set of dimensions of the rotational reference frame; determining, based on the current values, a flux linkage or inductance value for each of the set of dimensions of the rotational reference frame using a piecewise affine map; determining, by the electronic controller, a target value for each of the set of dimensions of the rotational reference frame; and controlling, by the electronic controller, a power switching network coupled between a power supply and the motor based on the flux linkage or inductance values and the target values.

Example 2: The method, apparatus, and non-transitory computer-readable medium according to Example 1, wherein determining current values for the motor in a rotational reference frame includes: determining electrical operational characteristics of the motor in a stationary reference frame; determining a rotational position of the motor; and transforming the electrical operational characteristics and the rotational position to the current values for the motor in the rotational reference frame.

Example 3: The method, apparatus, and non-transitory computer-readable medium according to any of Examples 1 to 2, wherein the piecewise affine map includes a plurality of affine functions, each of the plurality of affine functions associated with a respective domain of a plurality of domains, and wherein determining, based on the current values, a flux linkage or inductance value for each dimension of the set of dimensions of the rotational reference frame using a piecewise affine map includes: identifying a first domain corresponding to the current values and selected from the plurality of domains, the first domain associated with a first affine function of the plurality of affine functions; and applying the current values to the first affine function to determine the flux linkage or inductance value for each dimension of the set of dimensions of the rotational reference frame.

Example 4: The method, apparatus, and non-transitory computer-readable medium according to Example 3, wherein each of the plurality of domains corresponds to a simplex that was provided by executing a domain decomposition algorithm on a data set of current and flux-linkage pairs for a plurality of operational points of the motor, or each of the plurality of domains corresponds to a simplex that was provided by executing a domain decomposition algorithm on a data set of current and inductance pairs for a plurality of operational points of the motor.

Example 5: The method, apparatus, and non-transitory computer-readable medium according to any of Examples 1 to 4, wherein determining a target value for each dimension of the set of dimensions of the rotational reference frame includes: determining a desired control parameter for the motor; transforming the desired control parameter to target current values for the motor in the rotational reference frame; and determining, based on the target current values, the target value for each dimension of the set of dimensions of the rotational reference frame using the piecewise affine map.

Example 6: The method, apparatus, and non-transitory computer-readable medium according to Example 5, wherein transforming the desired control parameter to the target current values for the motor in the rotational reference frame includes: determining, based on the desired control parameter, a target current value for each dimension of the set of dimensions of the rotational reference frame using a control parameter-to-current piecewise affine map.

Example 7: The method, apparatus, and non-transitory computer-readable medium according to Example 6, wherein the control parameter-to-current piecewise affine map includes a plurality of affine functions, each of the plurality of affine functions associated with a respective domain of a plurality of domains, and wherein determining, based on the desired control parameter, a target current value for each dimension of the set of dimensions of the rotational reference frame using a control parameter-to-current piecewise affine map includes: identifying a first domain corresponding to the desired control parameter and selected from the plurality of domains, the first domain associated with a first affine function of the plurality of affine functions; and applying the desired control parameter to the first affine function to determine the target current value for each dimension of the set of dimensions of the rotational reference frame.

Example 8: The method, apparatus, and non-transitory computer-readable medium according to any of Examples 5 to 7, wherein the desired control parameter is a target torque value for the motor.

Example 9: The method, apparatus, and non-transitory computer-readable medium according to any of Examples 1 to 8, wherein determining a target value for each dimension of the set of dimensions of the rotational reference frame includes: determining a desired control parameter for the motor; transforming the desired control parameter to target current values for the motor in the rotational reference frame using a control parameter-to-current piecewise affine map, the target current values including a target current value for each dimension of the set of dimensions of the rotational reference frame; and determining, based on the target current values, the target value for each dimension of the set of dimensions of the rotational reference frame.

Example 10: The method, apparatus, and non-transitory computer-readable medium according to any of Examples 1 to 9, wherein determining a target value for each dimension of the set of dimensions of the rotational reference frame includes: determining a desired control parameter for the motor; and transforming the desired control parameter to target values for the motor in the rotational reference frame using a control parameter-to-flux linkage piecewise affine map, the target values including a target flux linkage value for each dimension of the set of dimensions of the rotational reference frame.

Example 11: The method, apparatus, and non-transitory computer-readable medium according to any of Examples 1 to 10, wherein the determining, based on the current values, the flux linkage or inductance value for each dimension of the set of dimensions includes determining, based on the current values, a flux linkage value for each dimension of the set of dimensions; wherein the target values are target flux linkage values; and wherein controlling the power switching network based on the flux linkage values and the target flux linkage values includes: generating a voltage command for each dimension of the set of dimensions of the rotational reference frame based on a difference between the target flux linkage value and the flux linkage value for the dimension; transforming the voltage commands in the rotational reference frame to the stationary reference frame; generating a pulse width modulated control signal for each dimension of the stationary reference frame to control the power switching network to drive a stator of the motor; and generating a rotor control signal to control driving of a rotor field winding.

Example 12: The method, apparatus, and non-transitory computer-readable medium according to any of Examples 1 to 11, wherein the determining, based on the current values, the flux linkage or inductance value for each dimension of the set of dimensions includes determining, based on the current values, a flux linkage value for each dimension of the set of dimensions; wherein the target values are target flux linkage values; and wherein controlling the power switching network based on the flux linkage values and the target flux linkage values includes: generating control signals in the stationary reference frame to drive the motor based on a difference between the target flux linkage value and the flux linkage value for the dimension.

Example 13: The method, apparatus, and non-transitory computer-readable medium according to any of Examples 1 to 12, wherein controlling the power switching network based on the flux linkage or inductance values and the target flux linkage values includes: generating, based on a model predictive control algorithm, control signals to drive the motor based on the target values and the flux linkage or inductance values.

Example 14: The method, apparatus, and non-transitory computer-readable medium according to any of Examples 1 to 13, wherein generating the control signals based on the model predictive control algorithm includes solving linear state-space equations over a receding time window to select a next control parameter.

Example 15: The method, apparatus, and non-transitory computer-readable medium according to any of Examples 1 to 14, wherein generating the control signals based on the model predictive control algorithm includes accessing a second piecewise affine map defined by offline solving of the model predictive control algorithm using sample inputs.

Example 16: The method, apparatus, and non-transitory computer-readable medium according to any of Examples 1 to 15, wherein the motor is a wound field synchronous motor comprising at least three stator phases and at least one rotor field winding.

Example 17: The method, apparatus, and non-transitory computer-readable medium according to any of Examples 1 to 16, wherein the power switching network includes an inverter switch bridge including a plurality of power switching elements, the inverter switch bridge receiving DC power and outputting AC power to windings of the stator based on pulse width modulated control signals from the electronic controller.

Example 18: The method, apparatus, and non-transitory computer-readable medium according to any of Examples 1 to 17, further comprising: receiving, by a DC/DC converter, input DC power; and providing, by the DC/DC converter, output DC power to at least one rotor field winding in accordance with a pulse width modulated rotor control signal from the electronic controller.

Example 19: The method, apparatus, and non-transitory computer-readable medium according to any of Examples 1 to 18, wherein the piecewise affine map maps a set of input values to an output flux linkage or inductance value for each dimension of the set of dimensions, the set of input values including the current values and at least one additional motor characteristic.

Example 20: The method, apparatus, and non-transitory computer-readable medium according to any of Examples 1 to 19, wherein the motor is at least one selected from the group of a wound field synchronous motor, a hybrid synchronous motor, a permanent magnet synchronous motor, an induction motor, a universal motor, or a reluctance motor.

Example 21: A method, apparatus, and non-transitory computer-readable medium comprises: obtaining, by an electronic controller, a data set of current-flux linkage pairs for operational points of an electric motor; applying, by the electronic controller, a domain decomposition algorithm to the data set to generate current simplices and flux linkage simplices; and storing, by the electronic controller, the current simplices and flux linkage simplices in a memory.

Example 22: The method, apparatus, and non-transitory computer-readable medium according to Example 21, further comprising: generating a current-to-flux linkage map, using the current simplices and the flux linkage simplices, to map current values of the current simplices to respective flux linkage values of the flux linkage simplices to provide a one-to-one relationship between the current values and the flux linkage values.

Example 23: The method, apparatus, and non-transitory computer-readable medium according to Example 22, further comprising: transmitting the current-to-flux linkage map to a motor controller including an electronic processor and an electronic memory.

Example 24: The method, apparatus, and non-transitory computer-readable medium according to any of Examples 22 to 23, wherein the current-to-flux linkage map is at least one selected from the group of: a piecewise affine map including a plurality of linear functions, each linear function corresponding to respective current simplices of the current simplices, and a quadratic map including at least one quadratic function.

Example 25: The method, apparatus, and non-transitory computer-readable medium according to any of Examples 22 to 24, further comprising: generating a flux linkage-to-current map, using the current simplices and the flux linkage simplices, to map flux linkage values of the flux linkage simplices to respective current values of the current simplices to provide a one-to-one relationship between the flux linkage values and the current values, wherein the flux linkage-to-current map is an inverse of the current-to-flux linkage map.

Example 27: The method, apparatus, and non-transitory computer-readable medium according to any of Examples 22 to 26, further comprising: determining an error value for each of a plurality of points of the current-to-flux linkage map; selecting a point from the plurality of points based on the determined error values; adding the point to the data set of current-flux linkage pairs for operational points of the electric motor to generate an updated data set; applying the domain decomposition algorithm to the updated data set to generate an updated set of current simplices and an updated set of flux linkage simplices; and generating an updated current-to-flux linkage map, using the updated set of current simplices and the updated set of flux linkage simplices, to map current values of the updated set of current simplices to respective flux linkage values of the updated set of flux linkage simplices to provide a one-to-one relationship between the current values and the flux linkage values.

Example 28: The method, apparatus, and non-transitory computer-readable medium according to any of Examples 22 to 27, further comprising: determining an error value for each of a plurality of points of the current-to-flux linkage map; selecting a point from the plurality of points based on the determined error values; removing the point to the data set of current-flux linkage pairs for operational points of the electric motor to generate an updated data set; applying the domain decomposition algorithm to the updated data set to generate an updated set of current simplices and an updated set of flux linkage simplices; and generating an updated current-to-flux linkage map, using the updated set of current simplices and the updated set of flux linkage simplices, to map current values of the updated set of current simplices to respective flux linkage values of the updated set of flux linkage simplices to provide a one-to-one relationship between the current values and the flux linkage values.

Example 29: The method, apparatus, and non-transitory computer-readable medium according to any of Examples 22 to 28, wherein the electric motor is at least one selected from the group of a wound field synchronous motor, a hybrid synchronous motor, a permanent magnet synchronous motor, an induction motor, a universal motor, or a reluctance motor.

Example 30: A method, apparatus, and non-transitory computer-readable medium for motor control comprises: determining, by an electronic controller, current values for a motor in a rotational reference frame, each current value associated with a dimension of a set of dimensions of the rotational reference frame; determining, by the electronic controller and based on a desired control parameter, a target motor control parameter value for each dimension of the set of dimensions of the rotational reference frame using a first piecewise affine map; and controlling, by the electronic controller, a power switching network based on the current values and the target motor control parameter values.

Example 31: The method, apparatus, and non-transitory computer-readable medium according to Example 30, wherein determining current values for the motor in a rotational reference frame includes: determining electrical operational characteristics of the motor in a stationary reference frame; determining a rotational position of the motor; and transforming the electrical operational characteristics and the rotational position to the current values for the motor in the rotational reference frame.

Example 32: The method, apparatus, and non-transitory computer-readable medium according to any of Examples 30 to 32, further comprising: determining, based on the current values, a flux linkage value for each dimension of the set of dimensions of the rotational reference frame using a second piecewise affine map, wherein the second piecewise affine map includes a plurality of affine functions, each of the plurality of affine functions associated with a respective domain of a plurality of domains; wherein determining, based on the current values, a flux linkage value for each dimension of the set of dimensions of the rotational reference frame using a second piecewise affine map includes: identifying a first domain corresponding to the current values and selected from the plurality of domains, the first domain associated with a first affine function of the plurality of affine functions, and applying the current values to the first affine function to determine the flux linkage value for each dimension of the set of dimensions of the rotational reference frame; and wherein controlling the power switching network based on the current values includes controlling the power switching network based on the flux linkage values determined from the current values using the second piecewise affine map.

Example 33: The method, apparatus, and non-transitory computer-readable medium according to Example 32, wherein each of the plurality of domains corresponds to a simplex that was provided by executing a domain decomposition algorithm on a data set of current and flux-linkage pairs for a plurality of operational points of the motor.

Example 34: The method, apparatus, and non-transitory computer-readable medium according to any of Examples 30 to 33, wherein the first piecewise affine map is a control parameter-to-target motor control parameter piecewise affine map.

Example 35: The method, apparatus, and non-transitory computer-readable medium according to any of Example 34, wherein the target motor control parameter values are current values or flux linkage values.

Example 36: The method, apparatus, and non-transitory computer-readable medium according to any of Example 35, wherein the first piecewise affine map includes a plurality of affine functions, each of the plurality of affine functions associated with a respective domain of a plurality of domains, and wherein determining, based on the desired control parameter, a target motor control parameter value for each dimension of the set of dimensions of the rotational reference frame using a first piecewise affine map includes: identifying a first domain corresponding to the desired control parameter and selected from the plurality of domains, the first domain associated with a first affine function of the plurality of affine functions; and applying the desired control parameter to the first affine function to determine the target motor control parameter value for each dimension of the set of dimensions of the rotational reference frame.

Example 37: The method, apparatus, and non-transitory computer-readable medium according to any of Example 35, wherein the desired control parameter is a target torque value for the motor.

Example 38: The method, apparatus, and non-transitory computer-readable medium according to any of Examples 30 to 37, wherein the first piecewise affine map is generated based on: a subset of pareto-optimal frontier points defining a convex pareto frontier, the pareto-optimal frontier points being a subset of datapoints including a current component, a flux component, a torque component, and a power loss component.

Example 39: The method, apparatus, and non-transitory computer-readable medium according to any of Examples 30 to 38, wherein the first piecewise affine map is a torque-to-current linkage piecewise affine map, and wherein determining, based on a desired control parameter, a target motor control parameter value for each dimension of the set of dimensions of the rotational reference frame using the first piecewise affine map includes: using the torque-to-current piecewise affine map to translate a desired torque to a target current value for each dimension of the set of dimensions of the rotational reference frame; and using a current-to-flux linkage piecewise affine map to translate the target current values to the target motor control parameter values, where the target motor control parameter values are flux linkage values.

Example 40: The method, apparatus, and non-transitory computer-readable medium according to any of Examples 30 to 39, wherein controlling the power switching network based on the current values and the target motor control parameter values includes: generating a voltage command for each dimension of the set of dimensions of the rotational reference frame based on a difference between the target motor control parameter value and a motor parameter indicated by the current value for the dimension; transforming the voltage commands in the rotational reference frame to the stationary reference frame; generating a pulse width modulated control signal for each dimension of the stationary reference frame to control the power switching network to drive a stator of the motor; and generating a rotor control signal to control driving of a rotor field winding.

Example 41: The method, apparatus, and non-transitory computer-readable medium according to any of Examples 30 to 40, wherein controlling the power switching network based on the current values and the target motor control parameter values includes: generating control signals in the stationary reference frame to drive the motor based on a difference between the target motor control parameter value and a motor parameter indicated by the current value for the dimension.

Example 42: The method, apparatus, and non-transitory computer-readable medium according to any of Examples 30 to 41, wherein controlling the power switching network based on the current values and the target motor control parameter values includes: generating, based on a model predictive control algorithm, control signals to drive the motor based on the target motor control parameter values and the current values.

Example 43: The method, apparatus, and non-transitory computer-readable medium according to Example 42, wherein generating the control signals based on the model predictive control algorithm includes solving linear state-space equations over a receding time window to select a next control parameter.

Example 44: The method, apparatus, and non-transitory computer-readable medium according to Example 42, wherein generating the control signals based on the model predictive control algorithm includes accessing a second piecewise affine map defined by offline solving of the model predictive control algorithm using sample inputs.

Example 45: The method, apparatus, and non-transitory computer-readable medium according to any of Examples 30 to 44, wherein the motor is a wound field synchronous motor comprising at least three stator phases and at least one rotor field winding.

Example 46: The method, apparatus, and non-transitory computer-readable medium according to any of Examples 30 to 45, wherein the power switching network includes an inverter switch bridge including a plurality of power switching elements, the inverter switch bridge configured to receive DC power and output AC power to windings of the stator based on pulse width modulated control signals from the electronic controller.

Example 47: The method, apparatus, and non-transitory computer-readable medium according to any of Examples 30 to 46, further comprising: receiving, by a DC/DC converter, input DC power; and providing, by the DC/DC converter, output DC power to at least one rotor field winding in accordance with a pulse width modulated rotor control signal from the electronic controller.

Example 48: The method, apparatus, and non-transitory computer-readable medium according to any of Examples 30 to 47, wherein the motor is at least one selected from the group of a wound field synchronous motor, a hybrid synchronous motor, a permanent magnet synchronous motor, an induction motor, a universal motor, or a reluctance motor.

Example 49: A method, apparatus, and non-transitory computer-readable medium for motor control comprises: determining, by an electronic controller, current values for a motor in a rotational reference frame, each current value associated with a dimension of a set of dimensions of the rotational reference frame; determining, by the electronic controller and based on a desired control parameter, a target motor control parameter value for each dimension of the set of dimensions of the rotational reference frame; and controlling, by the electronic controller, a power switching network based on the current values and the target motor control parameter values by using a piecewise affine map that was defined by offline solving of a model predictive control algorithm using sample inputs.

Example 50: The method, apparatus, and non-transitory computer-readable medium according to Example 43, further comprising determining, based on the current values, a flux linkage value for each dimension of the set of dimensions of the rotational reference frame using a flux linkage piecewise affine map, wherein the controlling, by the electronic controller, the power switching network is further based on the flux linkage values.

Example 51: The method, apparatus, and non-transitory computer-readable medium according to any of Examples 49 to 50, wherein the piecewise affine map includes a plurality of affine functions, each of the plurality of affine functions associated with a respective domain of a plurality of domains, and wherein controlling, by the electronic controller, the power switching network based on the current values and the target motor control parameter values by using a piecewise affine map, includes: identifying a first domain corresponding to flux values identified based on the current values and selected from the plurality of domains, the first domain associated with a first affine function of the plurality of affine functions; and applying the flux values to the first affine function to determine a voltage command for each dimension of the set of dimensions of the rotational reference frame.

Example 52: The method, apparatus, and non-transitory computer-readable medium according to any of Examples 49 to 51, wherein the flux linkage piecewise affine map includes a plurality of affine functions, each of the plurality of affine functions associated with a respective domain of a plurality of domains, and wherein determining, by the electronic controller and based on the current values, the flux linkage value for each dimension of the set of dimensions of the rotational reference frame using the flux linkage piecewise affine map, includes: identifying a first domain corresponding to the current values and selected from the plurality of domains, the first domain associated with a first affine function of the plurality of affine functions; and applying the current values to the first affine function to determine the flux linkage value for each dimension of the set of dimensions of the rotational reference frame.

Example 53: The method, apparatus, and non-transitory computer-readable medium according to Example 52, wherein each of the plurality of domains corresponds to a simplex that was provided by executing a domain decomposition algorithm on a data set of current and flux-linkage pairs for a plurality of operational points of the motor.

Example 54: The method, apparatus, and non-transitory computer-readable medium according to any of Examples 49 to 53, wherein determining, based on the desired control parameter, the target motor control parameter value for each dimension of the set of dimensions of the rotational reference frame, includes using a control parameter-to-current piecewise affine map or a control parameter-to-flux linkage piecewise affine map.

Example 55: The method, apparatus, and non-transitory computer-readable medium according to Example 54, wherein the control parameter-to-current piecewise affine map or the control parameter-to-flux linkage piecewise affine map defines a minimum power loss per torque (MPLPT) function.

Example 56: The method, apparatus, and non-transitory computer-readable medium according to any of Examples 49 to 55, wherein the constrained finite time optimal control is a model predictive control algorithm that, for each of a plurality of sampling time periods, provides a minimal-cost path from a start state to an end state.

Example 57: The method, apparatus, and non-transitory computer-readable medium according to any of Examples 49 to 56, wherein the motor is at least one selected from the group of a wound field synchronous motor, a hybrid synchronous motor, a permanent magnet synchronous motor, an induction motor, a universal motor, or a reluctance motor.

Example 58: The method, apparatus, and non-transitory computer-readable medium according to any of Examples 1 to 10 and 13 to 20, wherein the electronic controller is configured to determine, based on the current values, the inductance value for each dimension of the set of dimensions of the rotational reference frame using the piecewise affine map; wherein the target values are current values; and wherein, to control the power switching network based on the inductance values and the target current values, the electronic controller is configured to: generate control signals in the stationary reference frame to drive the motor based on a difference between the current value and the target current value for each dimension of the set of dimensions and on an inverse of the inductance values.

What is claimed is:

1. A motor system comprising:
    a power switching network configured to be coupled to a power supply and to a motor;
    an electronic controller configured to:
        determine current values for the motor in a rotational reference frame, each current value associated with a dimension of a set of dimensions of the rotational reference frame;
        determine, based on the current values, a flux linkage or inductance value for each dimension of the set of dimensions of the rotational reference frame using a piecewise affine map;
        determine a target value for each dimension of the set of dimensions of the rotational reference frame; and
        control the power switching network based on the flux linkage or inductance values and the target values.

2. The motor system of claim 1, wherein, to determine current values for the motor in a rotational reference frame, the electronic controller is configured to:
    determine electrical operational characteristics of the motor in a stationary reference frame;
    determine a rotational position of the motor; and
    transform the electrical operational characteristics and the rotational position to the current values for the motor in the rotational reference frame.

3. The motor system of claim 1,
    wherein the piecewise affine map includes a plurality of affine functions, each of the plurality of affine functions associated with a respective domain of a plurality of domains, and
    wherein, to determine, based on the current values, a flux linkage or inductance value for each dimension of the set of dimensions of the rotational reference frame using a piecewise affine map, the electronic controller is configured to:
        identify a first domain corresponding to the current values and selected from the plurality of domains, the first domain associated with a first affine function of the plurality of affine functions; and
        apply the current values to the first affine function to determine the flux linkage or inductance value for each dimension of the set of dimensions of the rotational reference frame.

4. The motor system of claim 3, wherein
    each of the plurality of domains corresponds to a simplex that was provided by executing a domain decomposition algorithm on a data set of current and flux-linkage pairs for a plurality of operational points of the motor or
    each of the plurality of domains corresponds to a simplex that was provided by executing a domain decomposition algorithm on a data set of current and inductance pairs for a plurality of operational points of the motor.

5. The motor system of claim 1, wherein, to determine a target value for each dimension of the set of dimensions of the rotational reference frame, the electronic controller is configured to:
    determine a desired control parameter for the motor;
    transform the desired control parameter to target current values for the motor in the rotational reference frame; and
    determine, based on the target current values, the target value for each dimension of the set of dimensions of the rotational reference frame using the piecewise affine map.

6. The motor system of claim 5, wherein, to transform the desired control parameter to the target current values for the motor in the rotational reference frame, the electronic controller is further configured to:
    determine, based on the desired control parameter, a target current value for each dimension of the set of dimensions of the rotational reference frame using a control parameter-to-current piecewise affine map.

7. The motor system of claim 6,
    wherein the control parameter-to-current piecewise affine map includes a plurality of affine functions, each of the plurality of affine functions associated with a respective domain of a plurality of domains, and
    wherein, to determine, based on the desired control parameter, a target current value for each dimension of the set of dimensions of the rotational reference frame using a control parameter-to-current piecewise affine map, the electronic controller is configured to:
        identify a first domain corresponding to the desired control parameter and selected from the plurality of domains, the first domain associated with a first affine function of the plurality of affine functions; and
        apply the desired control parameter to the first affine function to determine the target current value for each dimension of the set of dimensions of the rotational reference frame.

8. The motor system of claim 6, wherein the desired control parameter is a target torque value for the motor.

9. The motor system of claim 1, wherein, to determine a target value for each dimension of the set of dimensions of the rotational reference frame, the electronic controller is configured to:
  determine a desired control parameter for the motor;
  transform the desired control parameter to target current values for the motor in the rotational reference frame using a control parameter-to-current piecewise affine map, the target current values including a target current value for each dimension of the set of dimensions of the rotational reference frame; and
  determine, based on the target current values, the target value for each dimension of the set of dimensions of the rotational reference frame.

10. The motor system of claim 1, wherein, to determine a target value for each dimension of the set of dimensions of the rotational reference frame, the electronic controller is configured to:
  determine a desired control parameter for the motor; and
  transform the desired control parameter to target values for the motor in the rotational reference frame using a control parameter-to-flux linkage piecewise affine map, the target values including a target flux linkage value for each dimension of the set of dimensions of the rotational reference frame.

11. The motor system of claim 1,
  wherein the electronic controller is configured to determine, based on the current values, the flux linkage value for each dimension of the set of dimensions of the rotational reference frame using the piecewise affine map;
  wherein the target values are target flux linkage values; and
  wherein, to control the power switching network based on the flux linkage values and the target flux linkage values, the electronic controller is configured to:
  generate a voltage command for each dimension of the set of dimensions of the rotational reference frame based on a difference between the target flux linkage value and the flux linkage value for the dimension
  transform the voltage commands in the rotational reference frame to the stationary reference frame;
  generate a pulse width modulated control signal for each dimension of the stationary reference frame to control the power switching network to drive a stator of the motor; and
  generate a rotor control signal to control driving of a rotor field winding.

12. The motor system of claim 1,
  wherein the electronic controller is configured to determine, based on the current values, the flux linkage value for each dimension of the set of dimensions of the rotational reference frame using the piecewise affine map;
  wherein the target values are target flux linkage values; and
  wherein, to control the power switching network based on the flux linkage values and the target flux linkage values, the electronic controller is configured to:
  generate control signals in the stationary reference frame to drive the motor based on a difference between the target flux linkage value and the flux linkage value for each dimension of the set of dimensions.

13. The motor system of claim 1,
  wherein the electronic controller is configured to determine, based on the current values, the inductance value for each dimension of the set of dimensions of the rotational reference frame using the piecewise affine map;
  wherein the target values are current values; and
  wherein, to control the power switching network based on the inductance values and the target current values, the electronic controller is configured to:
  generate control signals in the stationary reference frame to drive the motor based on a difference between the current value and the target current value for each dimension of the set of dimensions and on an inverse of the inductance values.

14. The motor system of claim 1, wherein, to control the power switching network based on the flux linkage or inductance values and the target values, the electronic controller is configured to:
  generate, based on a model predictive control algorithm, control signals to drive the motor based on the target values and the flux linkage or inductance values.

15. The motor system of claim 14, wherein, to generate the control signals based on the model predictive control algorithm, the electronic controller is configured to solve linear state-space equations over a receding time window to select a next control parameter.

16. The motor system of claim 14, wherein, to generate the control signals based on the model predictive control algorithm, the electronic controller is configured to access a second piecewise affine map defined by offline solving of the model predictive control algorithm using sample inputs.

17. The motor system of claim 1, wherein the motor is a wound field synchronous motor comprising at least three stator phases and at least one rotor field winding.

18. The motor system of claim 1, wherein the power switching network includes an inverter switch bridge including a plurality of power switching elements, the inverter switch bridge configured to receive DC power and output AC power to windings of the stator based on pulse width modulated control signals from the electronic controller.

19. The motor system of claim 1, further comprising a DC/DC converter configured to receive input DC power and to provide output DC power to at least one rotor field winding in accordance with a pulse width modulated rotor control signal from the electronic controller.

20. The motor system of claim 1, wherein the piecewise affine map maps a set of input values to an output flux linkage or inductance value for each dimension of the set of dimensions, the set of input values including the current values and at least one additional motor characteristic.

21. The motor system of claim 1, wherein the motor is at least one selected from the group of a wound field synchronous motor, a hybrid synchronous motor, a permanent magnet synchronous motor, an induction motor, a universal motor, or a reluctance motor.

22. A method of controlling a motor, the method comprising:
  determining, by an electronic controller, current values for a motor in a rotational reference frame, each current value associated with a dimension of a set of dimensions of the rotational reference frame;
  determining, based on the current values, a flux linkage or inductance value for each of the set of dimensions of the rotational reference frame using a piecewise affine map;
  determining, by the electronic controller, a target value for each of the set of dimensions of the rotational reference frame; and
  controlling, by the electronic controller, a power switching network coupled between a power supply and the motor based on the flux linkage or inductance values and the target values.

23. The method of claim 22, wherein determining current values for the motor in a rotational reference frame includes:
  determining electrical operational characteristics of the motor in a stationary reference frame;
  determining a rotational position of the motor; and
  transforming the electrical operational characteristics and the rotational position to the current values for the motor in the rotational reference frame.

24. The method of claim 22,
  wherein the piecewise affine map includes a plurality of affine functions, each of the plurality of affine functions associated with a respective domain of a plurality of domains, and
  wherein determining, based on the current values, a flux linkage or inductance value for each dimension of the set of dimensions of the rotational reference frame using a piecewise affine map includes:
    identifying a first domain corresponding to the current values and selected from the plurality of domains, the first domain associated with a first affine function of the plurality of affine functions; and
    applying the current values to the first affine function to determine the flux linkage or inductance value for each dimension of the set of dimensions of the rotational reference frame.

25. The method of claim 24, wherein
  each of the plurality of domains corresponds to a simplex that was provided by executing a domain decomposition algorithm on a data set of current and flux-linkage pairs for a plurality of operational points of the motor, or
  each of the plurality of domains corresponds to a simplex that was provided by executing a domain decomposition algorithm on a data set of current and inductance pairs for a plurality of operational points of the motor.

26. The method of claim 22, wherein determining a target value for each dimension of the set of dimensions of the rotational reference frame includes:
  determining a desired control parameter for the motor;
  transforming the desired control parameter to target current values for the motor in the rotational reference frame; and
  determining, based on the target current values, the target value for each dimension of the set of dimensions of the rotational reference frame using the piecewise affine map.

27. The method of claim 24, wherein transforming the desired control parameter to the target current values for the motor in the rotational reference frame includes:
  determining, based on the desired control parameter, a target current value for each dimension of the set of dimensions of the rotational reference frame using a control parameter-to-current piecewise affine map.

28. The method of claim 27, wherein the control parameter-to-current piecewise affine map includes a plurality of affine functions, each of the plurality of affine functions associated with a respective domain of a plurality of domains, and
  wherein determining, based on the desired control parameter, a target current value for each dimension of the set of dimensions of the rotational reference frame using a control parameter-to-current piecewise affine map includes:
    identifying a first domain corresponding to the desired control parameter and selected from the plurality of domains, the first domain associated with a first affine function of the plurality of affine functions; and
    applying the desired control parameter to the first affine function to determine the target current value for each dimension of the set of dimensions of the rotational reference frame.

29. The method of claim 27, wherein the desired control parameter is a target torque value for the motor.

30. The method of claim 22, wherein determining a target flux linkage value for each dimension of the set of dimensions of the rotational reference frame includes:
  determining a desired control parameter for the motor;
  transforming the desired control parameter to target current values for the motor in the rotational reference frame using a control parameter-to-current piecewise affine map, the target current values including a target current value for each dimension of the set of dimensions of the rotational reference frame; and
  determining, based on the target current values, the target value for each dimension of the set of dimensions of the rotational reference frame.

31. The method of claim 22, wherein determining a target value for each dimension of the set of dimensions of the rotational reference frame includes:
  determining a desired control parameter for the motor; and
  transforming the desired control parameter to target values for the motor in the rotational reference frame using a control parameter-to-flux linkage piecewise affine map, the target values including a target flux linkage value for each dimension of the set of dimensions of the rotational reference frame.

32. The method of claim 22,
  wherein the determining, based on the current values, the flux linkage or inductance value for each dimension of the set of dimensions includes determining, based on the current values, the flux linkage value for each dimension of the set of dimensions;
  wherein the target values are target flux linkage values; and
  wherein controlling the power switching network based on the flux linkage values and the target flux linkage values includes:
    generating a voltage command for each dimension of the set of dimensions of the rotational reference frame based on a difference between the target flux linkage value and the flux linkage value for the dimension
    transforming the voltage commands in the rotational reference frame to the stationary reference frame;
    generating a pulse width modulated control signal for each dimension of the stationary reference frame to control the power switching network to drive a stator of the motor; and
    generating a rotor control signal to control driving of a rotor field winding.

33. The method of claim 22,
  wherein the determining, based on the current values, the flux linkage or inductance value for each dimension of the set of dimensions includes determining, based on the current values, the flux linkage value for each dimension of the set of dimensions;
  wherein the target values are target flux linkage values; and wherein controlling the power switching network based on the flux linkage values and the target flux linkage values includes:
generating control signals in the stationary reference frame to drive the motor based on a difference between the target flux linkage value and the flux linkage value for the dimension.

34. The method of claim 22,
wherein the determining, based on the current values, the flux linkage or inductance value for each dimension of the set of dimensions includes determining, based on the current values, the inductance value for each dimension of the set of dimensions;
wherein the target values are current values; and
wherein controlling the power switching network based on the inductance values and the target current value includes:
generating control signals in the stationary reference frame to drive the motor based on a difference between the current value and the target current value for each dimension of the set of dimensions and on an inverse of the inductance values.

35. The method of claim 22, wherein controlling the power switching network based on the flux linkage or inductance values and the target values includes:
generating, based on a model predictive control algorithm, control signals to drive the motor based on the target values and the flux linkage or inductance values.

36. The method of claim 22, wherein generating the control signals based on the model predictive control algorithm includes solving linear state-space equations over a receding time window to select a next control parameter.

37. The method of claim 22, wherein generating the control signals based on the model predictive control algorithm includes accessing a second piecewise affine map defined by offline solving of the model predictive control algorithm using sample inputs.

38. The method of claim 22, wherein the motor is a wound field synchronous motor comprising at least three stator phases and at least one rotor field winding.

39. The method of claim 22, wherein the power switching network includes an inverter switch bridge including a plurality of power switching elements, the inverter switch bridge receiving DC power and outputting AC power to windings of the stator based on pulse width modulated control signals from the electronic controller.

40. The method of claim 22, further comprising:
receiving, by a DC/DC converter, input DC power; and
providing, by the DC/DC converter, output DC power to at least one rotor field winding in accordance with a pulse width modulated rotor control signal from the electronic controller.

41. The method of claim 22, wherein the piecewise affine map maps a set of input values to an output flux linkage or inductance value for each dimension of the set of dimensions, the set of input values including the current values and at least one additional motor characteristic.

42. The method of claim 22, wherein the motor is at least one selected from the group of a wound field synchronous motor, a hybrid synchronous motor, a permanent magnet synchronous motor, an induction motor, a universal motor, or a reluctance motor.

43. A non-transitory computer-readable medium storing computer-executable instructions, the instructions for causing a processor to:
determine current values for a motor in a rotational reference frame, each current value associated with a dimension of a set of dimensions of the rotational reference frame;
determine, based on the current values, a flux linkage or inductance value for each dimension of the set of dimensions of the rotational reference frame using a piecewise affine map;
determine a target value for each dimension of the set of dimensions of the rotational reference frame; and
control a power switching network coupled to the motor and a power supply based on the flux linkage or inductance values and the target values.

44. The non-transitory computer-readable medium of claim 43, wherein, to determine current values for the motor in a rotational reference frame, the instructions are for further causing a processor to:
determine electrical operational characteristics of the motor in a stationary reference frame;
determine a rotational position of the motor; and
transform the electrical operational characteristics and the rotational position to the current values for the motor in the rotational reference frame.

45. The non-transitory computer-readable medium of claim 43,
wherein the piecewise affine map includes a plurality of affine functions, each of the plurality of affine functions associated with a respective domain of a plurality of domains, and
wherein, to determine, based on the current values, a flux linkage or inductance value for each dimension of the set of dimensions of the rotational reference frame using a piecewise affine map, the instructions are for further causing a processor to:
identify a first domain corresponding to the current values and selected from the plurality of domains, the first domain associated with a first affine function of the plurality of affine functions; and
apply the current values to the first affine function to determine the flux linkage or inductance value for each dimension of the set of dimensions of the rotational reference frame.

46. The non-transitory computer-readable medium of claim 43, wherein, to determine a target value for each dimension of the set of dimensions of the rotational reference frame, the instructions are for further causing a processor to:
determine a desired control parameter for the motor;
transform the desired control parameter to target current values for the motor in the rotational reference frame; and
determine, based on the target current values, the target value for each dimension of the set of dimensions of the rotational reference frame using the piecewise affine map.

47. The non-transitory computer-readable medium of claim 43, wherein, to determine a target flux linkage value for each dimension of the set of dimensions of the rotational reference frame, the instructions are for further causing a processor to:
determine a desired control parameter for the motor;
transform the desired control parameter to target current values for the motor in the rotational reference frame using a control parameter-to-current piecewise affine map, the target current values including a target current value for each dimension of the set of dimensions of the rotational reference frame; and determine, based on the target current values, the target value for each dimension of the set of dimensions of the rotational reference frame.

* * * * *